(12) United States Patent
Chang

(10) Patent No.: US 9,703,082 B1
(45) Date of Patent: Jul. 11, 2017

(54) IMAGING ZOOM LENS SYSTEM

(71) Applicant: Tan Cian Technology Co., Ltd., Taichung (TW)

(72) Inventor: Shih-Yuan Chang, Jhubei (TW)

(73) Assignee: Tan Cian Technology Co., Ltd., Taichung (TW)

( * ) Notice: Subject to any disclaimer, the term of this patent is extended or adjusted under 35 U.S.C. 154(b) by 0 days.

(21) Appl. No.: 15/200,652

(22) Filed: Jul. 1, 2016

(30) Foreign Application Priority Data

Jan. 11, 2016 (TW) .............................. 105100652 A

(51) Int. Cl.
*G02B 15/14* (2006.01)
*G02B 15/16* (2006.01)
*G02B 13/00* (2006.01)
*G02B 5/20* (2006.01)

(52) U.S. Cl.
CPC ............. *G02B 15/16* (2013.01); *G02B 5/208* (2013.01); *G02B 13/009* (2013.01)

(58) Field of Classification Search
CPC ...... G02B 13/009; G02B 15/14; G02B 15/16; G02B 15/163
USPC .......................................... 359/676, 683, 689
See application file for complete search history.

(56) References Cited

U.S. PATENT DOCUMENTS 6,735,021 B2 * 5/2004 Enomoto ............... G02B 15/16
359/684

\* cited by examiner

*Primary Examiner* — William Choi
(74) *Attorney, Agent, or Firm* — Trop Pruner & Hu, P.C.

(57) ABSTRACT

An imaging zoom lens system includes a first lens group, a second lens group and a third lens group in sequence along an optical axis of the imaging zoom lens. Through designs of structural relationships among the first to third lens groups and relevant optical parameters, the imaging zoom lens system is able to increase a focusing speed at a telephoto end to approach a focusing speed at a wide angle end.

9 Claims, 64 Drawing Sheets first embodiment system focal length=4.96mm(wide angle end), 8.89mm(intermediate position), 12.92mm(telephoto end)
F-number=2.0(wide angle end), 4.0(intermediate position), 5.3(telephoto end)

| lens element | surface | radius of curvature(mm) | surface spacing(mm) (wide angle end)-(intermediate position)-(telephoto end) | refractive power | Abbe number(Abbe) |
|---|---|---|---|---|---|
| aperture stop | | | 0.489 | | |
| first lens element 1 | object-side surface 11 | 3.0441 | | 1.544 | 56 |
| | image-side surface 12 | -90.0000 | 0.030 | | |
| second lens element 2 | object-side surface 21 | 90.0000 | 0.336 | 1.544 | 56 |
| | image-side surface 22 | -9.6763 | 0.167 | | |
| third lens element 3 | object-side surface 31 | -14.0534 | 0.220 | 1.642 | 22.4 |
| | image-side surface 32 | 5.3238 | 0.462 - 1.940 - 2.900 | | |
| fourth lens element 4 | object-side surface 41 | -7.0571 | 1.409 | 1.535 | 56.6 |
| | image-side surface 42 | -1.8581 | 2.095 - 0.842 - 0.197 | | |
| fifth lens element 5 | object-side surface 51 | -2.3078 | 0.571 | 1.544 | 56 |
| | image-side surface 52 | 12.5124 | 0.072 - 2.618 - 4.771 | | |
| optical filter 8 | object-side surface 81 | ∞ | 0.210 | 1.517 | 64.2 |
| | image-side surface 82 | ∞ | 0.440 | | |

FIG.3 first embodiment

| lens element | surface | K | A4 | A6 | A8 | A10 | A12 | A14 |
|---|---|---|---|---|---|---|---|---|
| first lens element 1 | object-side surface 11 | -2.9407 | -7.871E-04 | -4.118E-03 | -6.012E-03 | 1.954E-03 | 6.866E-04 | -1.487E-03 |
| | image-side surface 12 | 90.0000 | -3.478E-02 | 1.391E-02 | 1.042E-03 | -5.145E-03 | -3.856E-03 | 1.309E-03 |
| second lens element 2 | object-side surface 21 | -90.0000 | 5.299E-03 | 1.072E-02 | -3.291E-03 | -3.377E-03 | -1.300E-03 | -9.012E-04 |
| | image-side surface 22 | -90.0000 | 2.222E-02 | -4.235E-02 | 4.172E-03 | 4.901E-03 | -1.551E-03 | -1.068E-03 |
| third lens element 3 | object-side surface 31 | 51.6799 | -4.577E-02 | 1.492E-04 | 5.636E-03 | 4.829E-03 | -2.074E-03 | 7.011E-05 |
| | image-side surface 32 | 12.2207 | -6.728E-02 | 2.740E-02 | 2.839E-03 | -4.605E-03 | 5.281E-04 | 2.600E-04 |
| fourth lens element 4 | object-side surface 41 | 28.1204 | -3.582E-02 | 2.064E-03 | -1.447E-02 | 1.020E-02 | -4.198E-03 | -2.115E-04 |
| | image-side surface 42 | 0.1286 | 9.045E-03 | -4.146E-03 | 2.897E-03 | -8.729E-04 | 8.434E-05 | 1.521E-05 |
| fifth lens element 5 | object-side surface 51 | -0.2718 | 5.916E-03 | -4.308E-04 | -4.140E-06 | 1.981E-04 | -6.549E-05 | 6.088E-06 |
| | image-side surface 52 | -53.3832 | -8.447E-03 | 9.239E-04 | -1.260E-04 | 1.521E-05 | -2.173E-06 | 1.216E-07 |

FIG.4

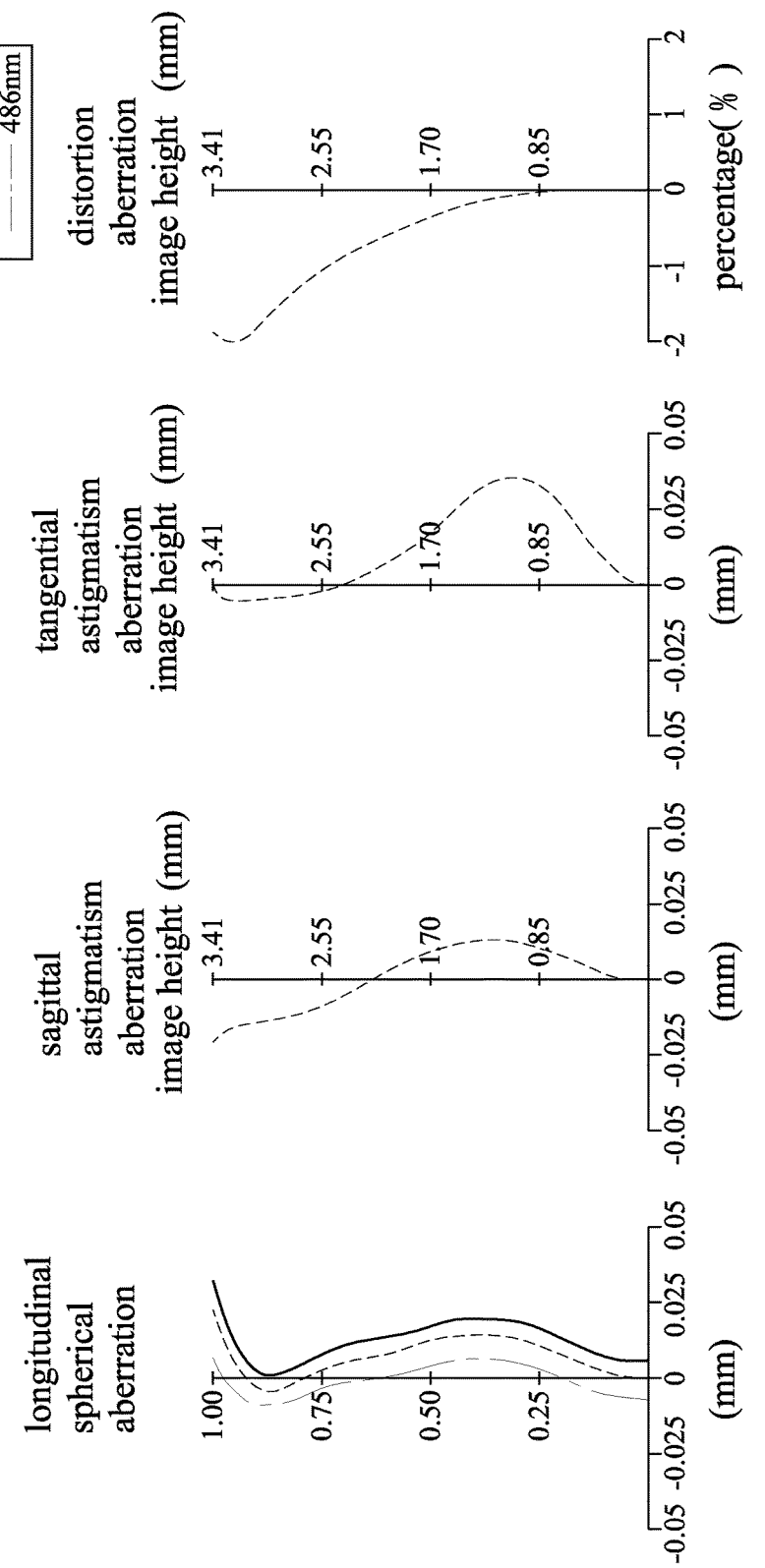

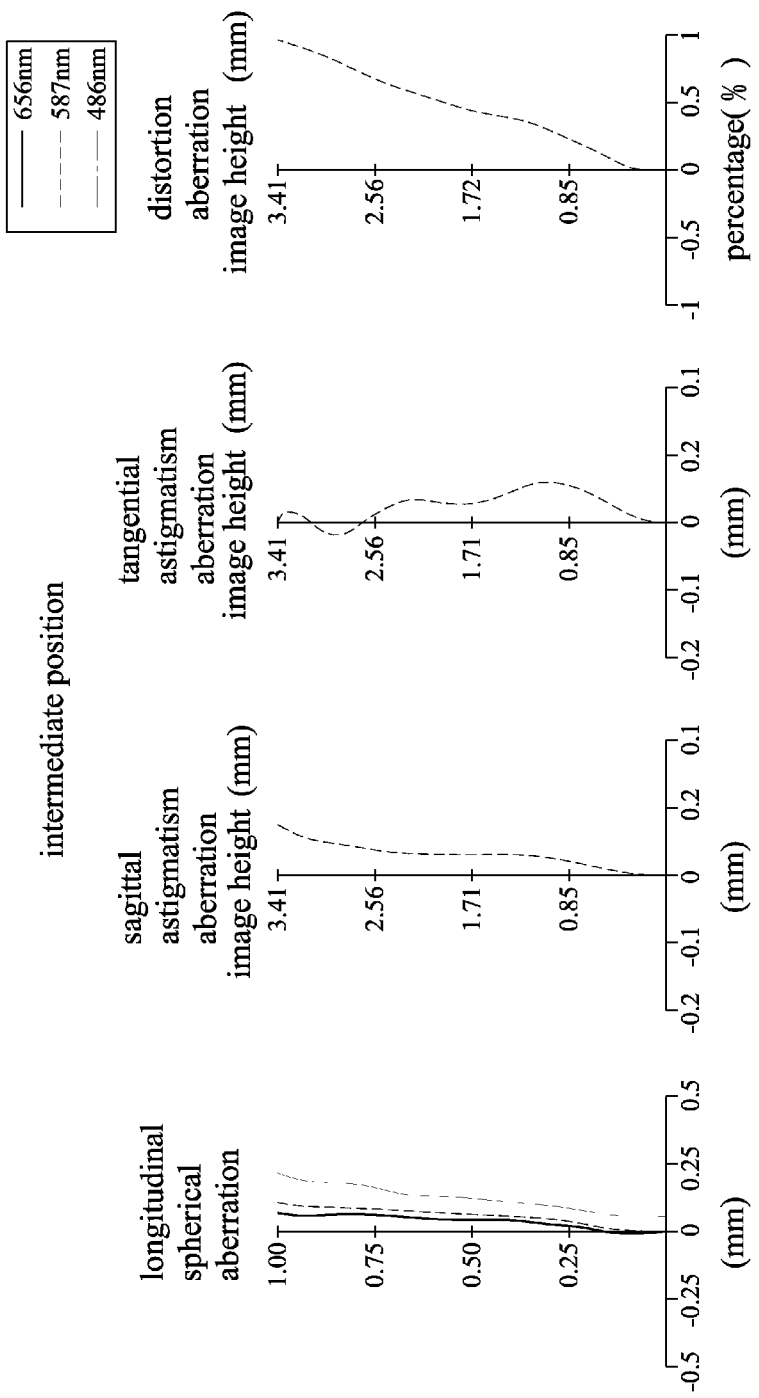

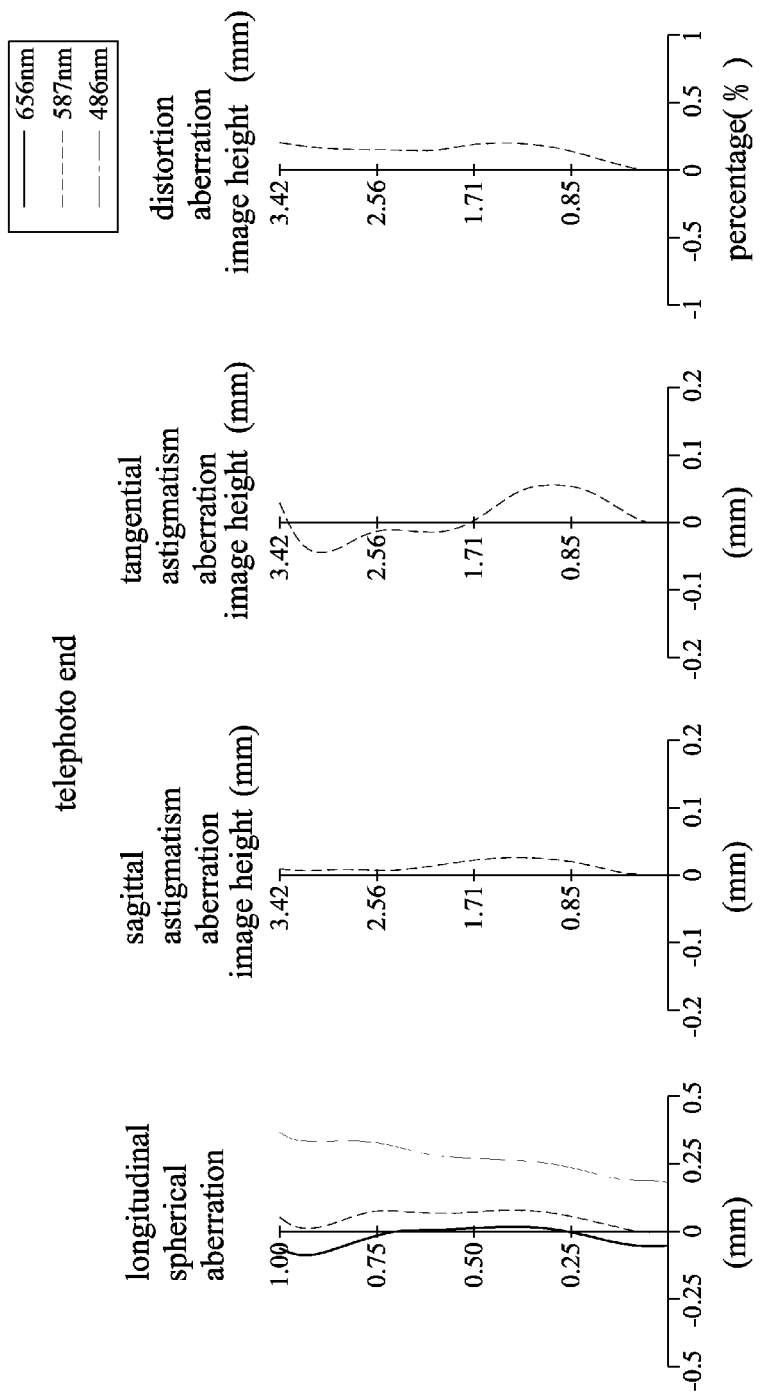

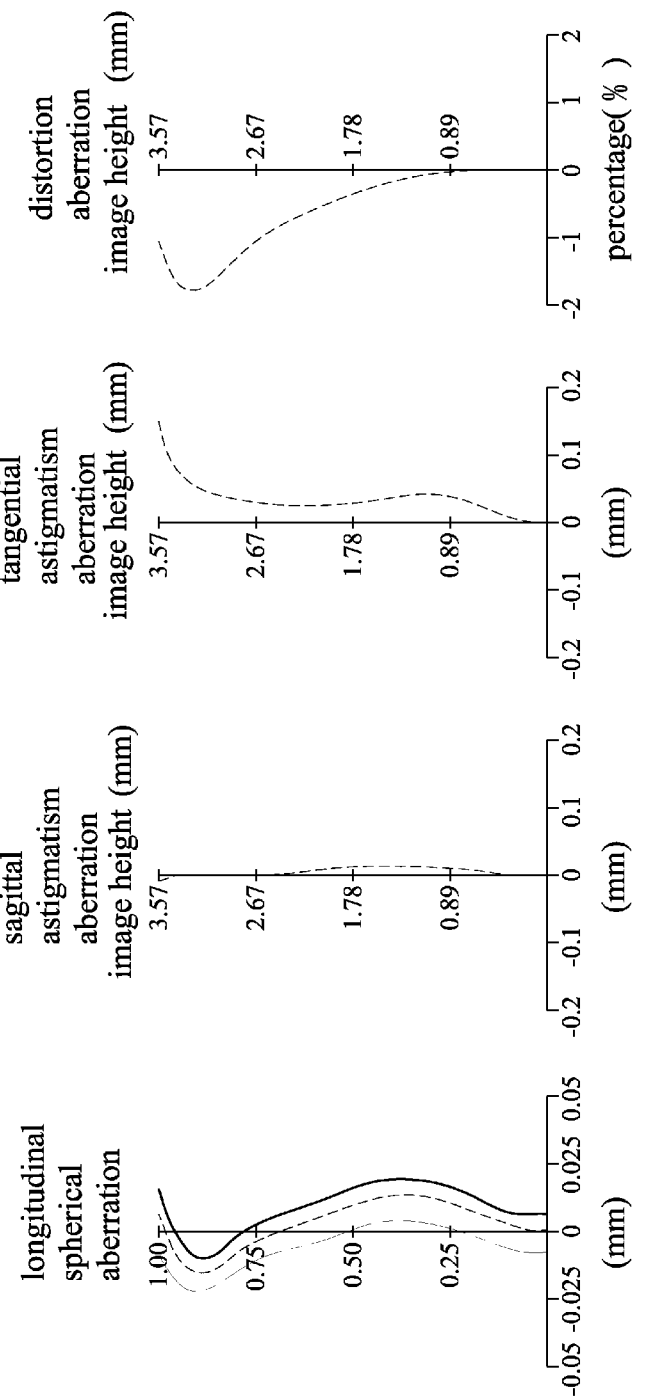

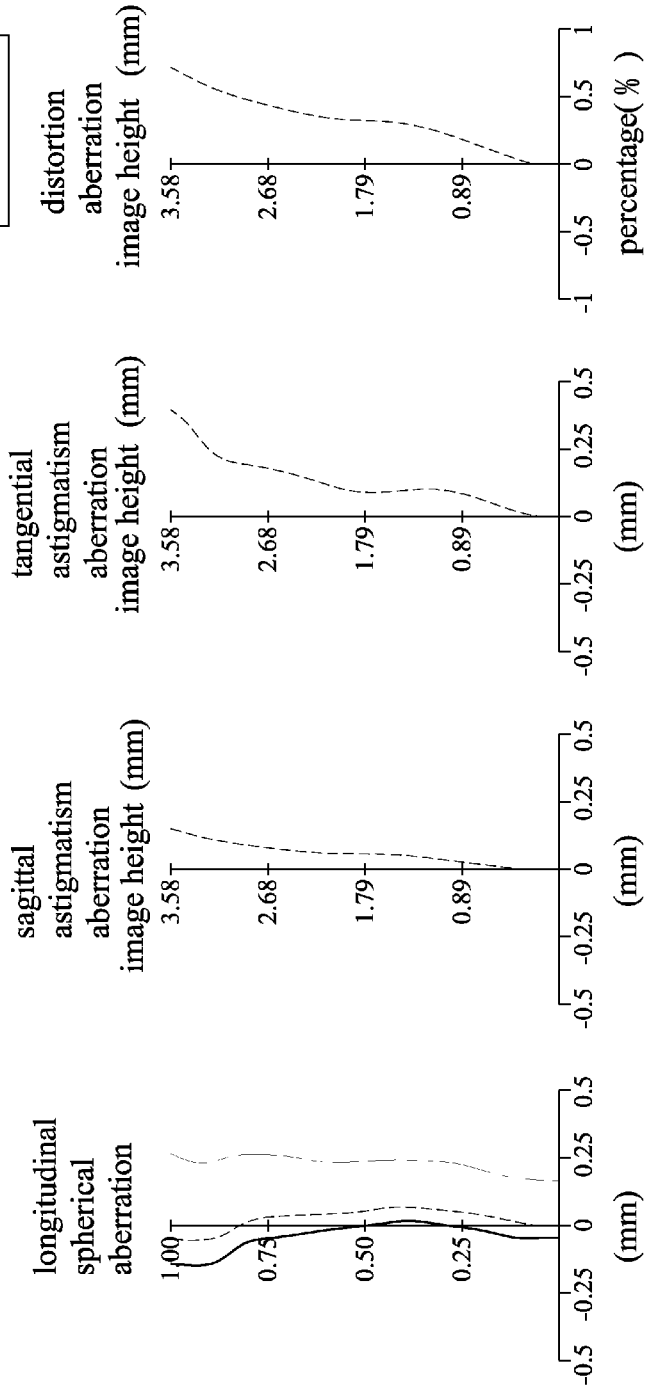

FIG.9 second embodiment system focal length=4.99mm(wide angle end), 7.21mm(intermediate position), 13.01mm(telephoto end)
F-number=2.0(wide angle end), 3.0(intermediate position), 5.3(telephoto end)

| lens element | surface | radius of curvature(mm) | surface spacing(mm) (wide angle end)-(intermediate position)-(telephoto end) | refractive power | Abbe number(Abbe) |
|---|---|---|---|---|---|
| aperture stop | | | | | |
| first lens element 1 | object-side surface 11 | 2.9847 | 0.629 | 1.544 | 56 |
| | image-side surface 12 | -9.3914 | 0.262 | | |
| second lens element 2 | object-side surface 21 | -7.2316 | 0.220 | 1.642 | 22.4 |
| | image-side surface 22 | 9.4451 | 0.477 - 1.568 - 3.267 | | |
| third lens element 3 | object-side surface 31 | -5.8820 | 1.412 | 1.544 | 56 |
| | image-side surface 32 | -1.8603 | 2.202 - 1.315 - 0.15 | | |
| fourth lens element 4 | object-side surface 41 | -2.3501 | 0.575 | 1.544 | 56 |
| | image-side surface 42 | 17.7469 | 0.073 - 1.541 - 3.122 | | |
| optical filter 8 | object-side surface 81 | ∞ | 0.210 | 1.517 | 64.2 |
| | image-side surface 82 | ∞ | 0.440 | | | second embodiment

| lens element | surface | K | A4 | A6 | A8 | A10 | A12 | A14 |
|---|---|---|---|---|---|---|---|---|
| first lens element 1 | object-side surface 11 | -0.5359 | -3.068E-03 | -6.274E-03 | 1.518E-05 | -3.797E-03 | -2.029E-04 | -4.958E-04 |
| | image-side surface 12 | 12.8479 | -1.075E-02 | -6.753E-03 | -5.371E-03 | -8.460E-04 | -2.575E-04 | 1.319E-04 |
| second lens element 2 | object-side surface 21 | -17.9626 | -5.473E-03 | 5.745E-03 | -5.106E-03 | 5.837E-04 | 1.919E-03 | 1.444E-06 |
| | image-side surface 22 | 37.7470 | 5.176E-04 | 5.703E-03 | -2.212E-03 | -3.344E-04 | 8.006E-04 | 8.466E-06 |
| third lens element 3 | object-side surface 31 | 20.1460 | -2.868E-02 | -6.292E-03 | 3.730E-04 | -1.532E-03 | -3.368E-04 | -5.215E-06 |
| | image-side surface 32 | 0.1040 | 6.895E-03 | -1.996E-03 | 9.183E-04 | -8.393E-05 | -3.902E-05 | 1.323E-05 |
| fourth lens element 4 | object-side surface 41 | -0.9179 | 3.685E-03 | -6.932E-04 | -8.462E-05 | 3.035E-06 | 4.339E-06 | -8.112E-07 |
| | image-side surface 42 | 25.1499 | -4.993E-03 | -1.427E-04 | 4.059E-05 | -1.287E-05 | 1.197E-06 | -3.807E-08 |

FIG.10

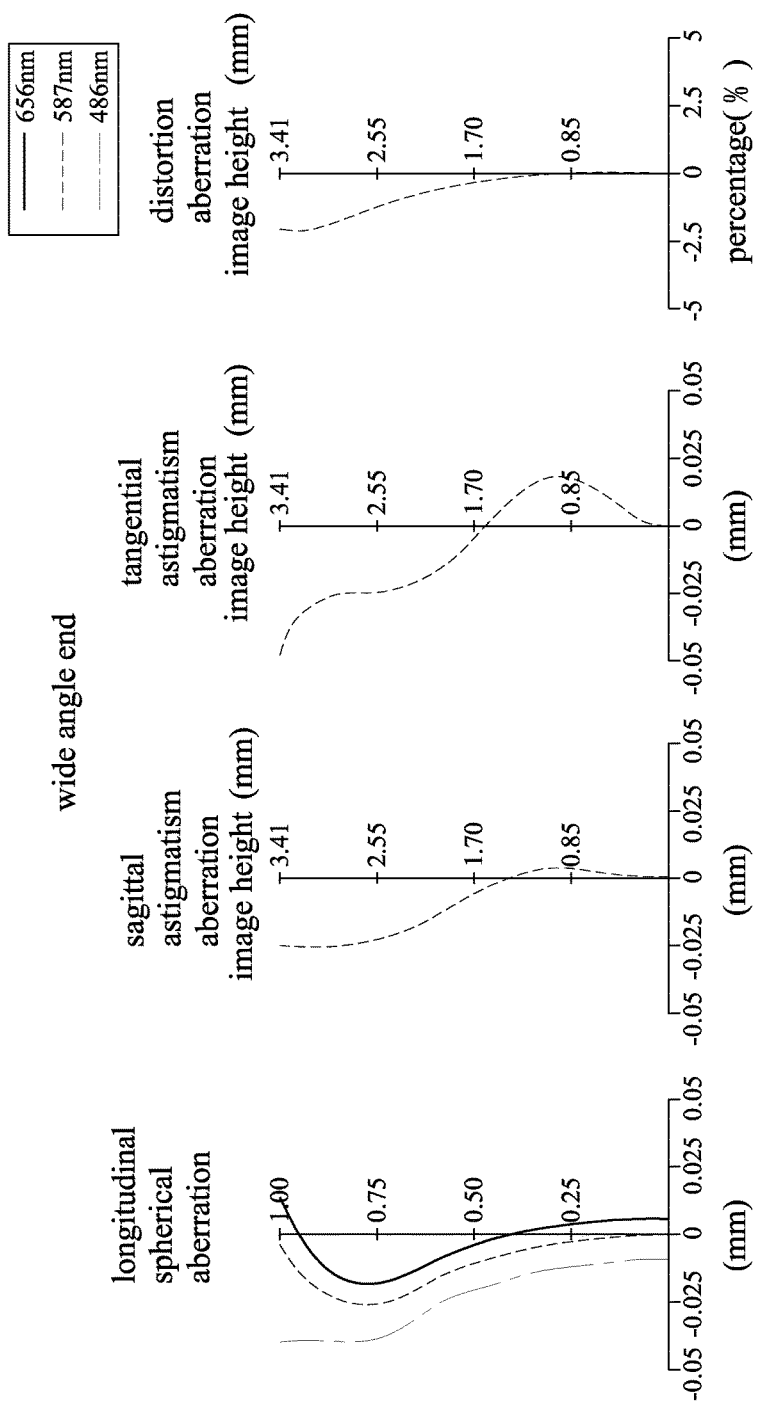

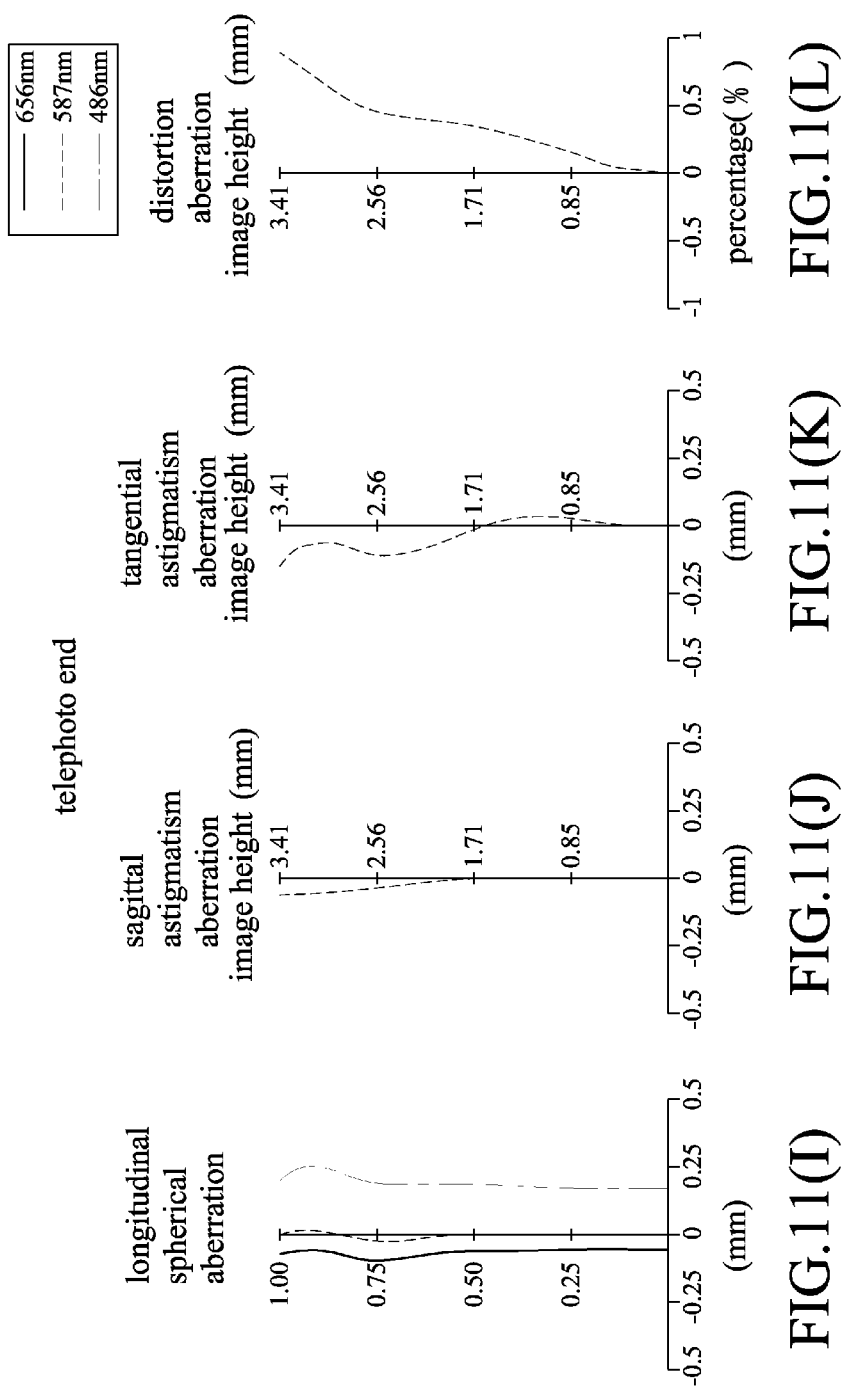

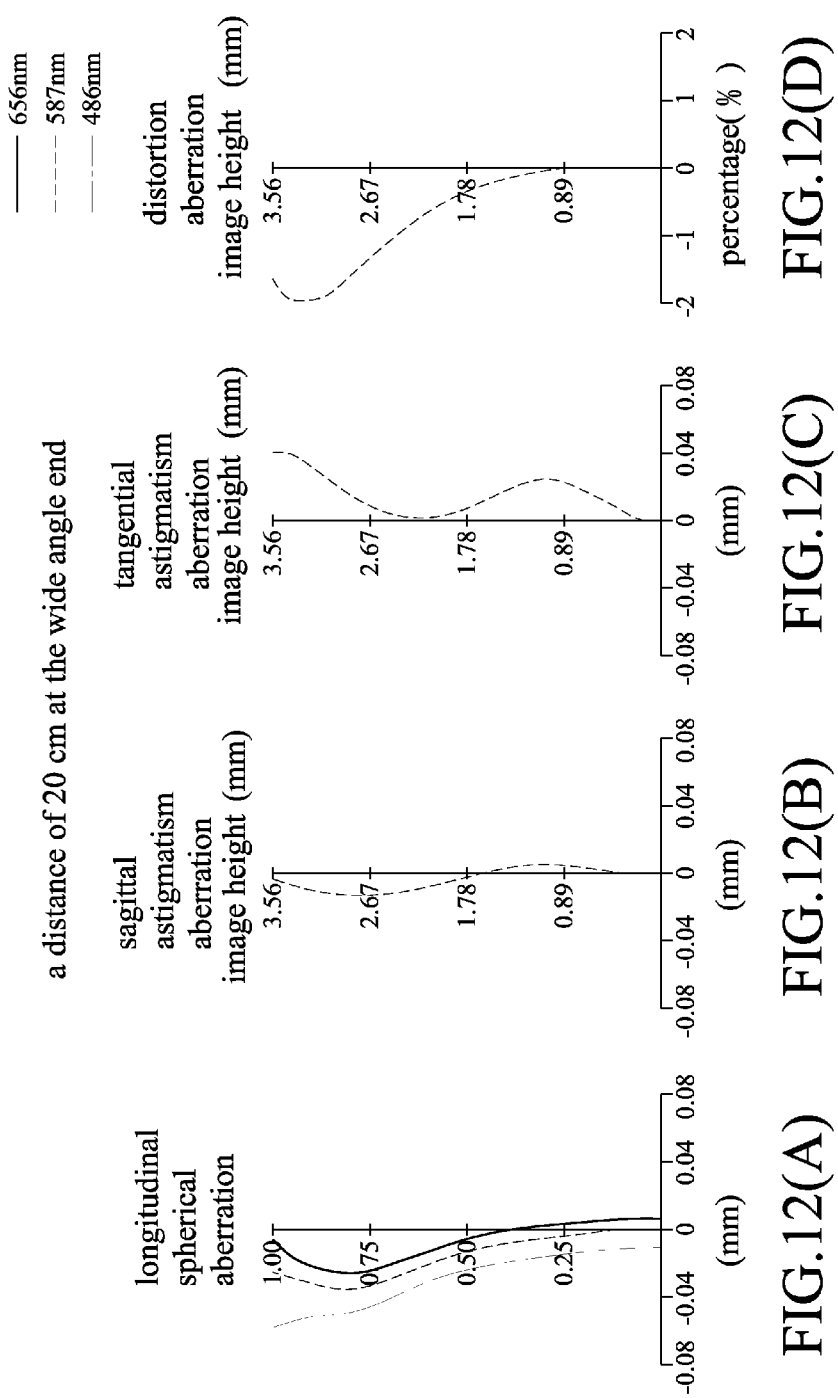

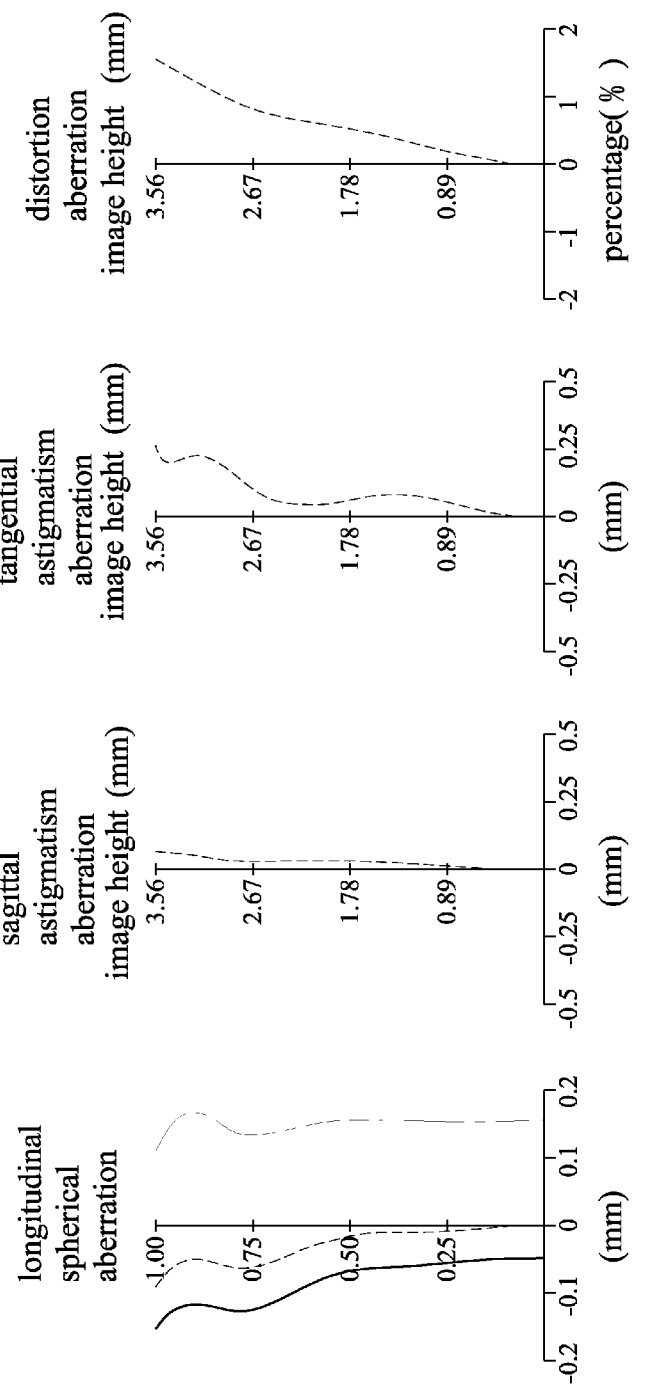

| third embodiment | | | | |
|---|---|---|---|---|
| system focal length=4.94mm(wide angle end), 7.284mm(intermediate position), 12.979mm(telephoto end) F-number=2.0(wide angle end), 3.0(intermediate position), 5.3(telephoto end) | | | | |
| lens element | surface | radius of curvature(mm) | surface spacing(mm) (wide angle end)-(intermediate position)-(telephoto end) | refractive power | Abbe number(Abbe) |
| aperture stop | | | | | |
| first lens element 1 | object-side surface 11 | 3.6389 | 0.487 | 1.538 | 53 |
| | image-side surface 12 | -6.3952 | 0.030 | | |
| second lens element 2 | object-side surface 21 | -14.8894 | 0.309 | 1.535 | 56 |
| | image-side surface 22 | 90.0000 | 0.052 | | |
| third lens element 3 | object-side surface 31 | 51.8899 | 0.261 | 1.535 | 56 |
| | image-side surface 32 | -11.4671 | 0.030 | | |
| fourth lens element 4 | object-side surface 41 | -10.0879 | 0.220 | 1.645 | 23 |
| | image-side surface 42 | 7.1012 | 0.446 - 1.364 - 2.598 | | |
| fifth lens element 5 | object-side surface 51 | -6.8592 | 1.366 | 1.535 | 56 |
| | image-side surface 52 | -1.8281 | 2.017 - 1.229 - 0.306 | | |
| sixth lens element 6 | object-side surface 61 | -2.01E+00 | 0.565 | 1.545 | 56.1 |
| | image-side surface 62 | 1.38E+01 | 0.068 - 1.527 - 4.6 | | |
| optical filter 8 | object-side surface 81 | ∞ | 0.210 | 1.517 | 64.2 |
| | image-side surface 82 | ∞ | 0.440 | | |

FIG.15 third embodiment

| lens element | surface | K | A4 | A6 | A8 | A10 | A12 | A14 |
|---|---|---|---|---|---|---|---|---|
| first lens element 1 | object-side surface 11 | -3.7901 | -2.209E-03 | -1.710E-03 | 2.972E-05 | 1.142E-03 | 2.081E-04 | -3.418E-04 |
| | image-side surface 12 | -12.5972 | 2.473E-03 | 6.766E-03 | -3.729E-04 | -1.227E-03 | -2.867E-04 | 1.252E-04 |
| second lens element 2 | object-side surface 21 | 88.3064 | 2.051E-02 | -8.112E-04 | -3.309E-03 | -1.948E-03 | -9.345E-04 | -1.300E-04 |
| | image-side surface 22 | -90.0000 | -3.577E-02 | -2.473E-02 | -4.597E-03 | -2.288E-04 | 4.508E-04 | 4.095E-04 |
| third lens element 3 | object-side surface 31 | -90.0000 | -4.078E-02 | -9.366E-03 | -1.234E-02 | -5.909E-03 | -8.340E-05 | 2.549E-03 |
| | image-side surface 32 | 80.2531 | -1.623E-02 | -1.672E-02 | -2.586E-03 | -1.517E-04 | 4.631E-04 | 4.074E-04 |
| fourth lens element 4 | object-side surface 41 | 61.5080 | -4.889E-02 | 1.417E-02 | 5.842E-03 | 2.379E-03 | 3.246E-04 | -8.954E-04 |
| | image-side surface 42 | -74.5087 | -2.508E-02 | 1.422E-02 | 9.956E-03 | -5.588E-03 | -1.805E-03 | 4.004E-04 |
| fifth lens element 5 | object-side surface 51 | 26.8209 | -3.534E-02 | -3.397E-03 | -7.261E-03 | 4.233E-03 | -1.975E-03 | -3.040E-04 |
| | image-side surface 52 | 0.0438 | 6.468E-03 | -8.293E-04 | -2.693E-04 | -2.386E-04 | 3.153E-04 | -8.747E-05 |
| sixth lens element 6 | object-side surface 61 | -0.5023 | 1.064E-02 | -2.997E-03 | 3.982E-04 | 6.905E-05 | -2.999E-05 | 1.362E-06 |
| | image-side surface 62 | -12.6394 | -8.348E-03 | -9.098E-05 | 1.312E-04 | -2.796E-05 | 1.983E-06 | -4.004E-08 |

FIG.16

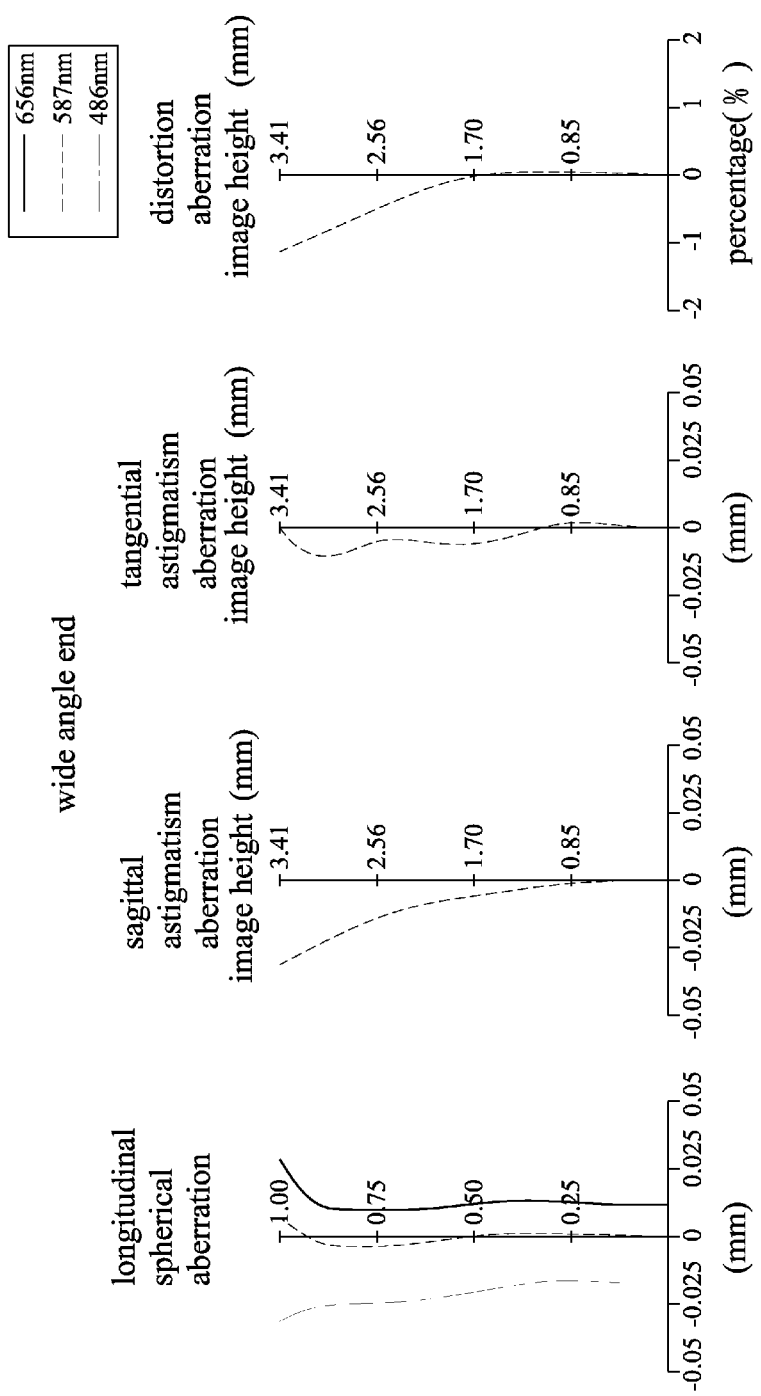

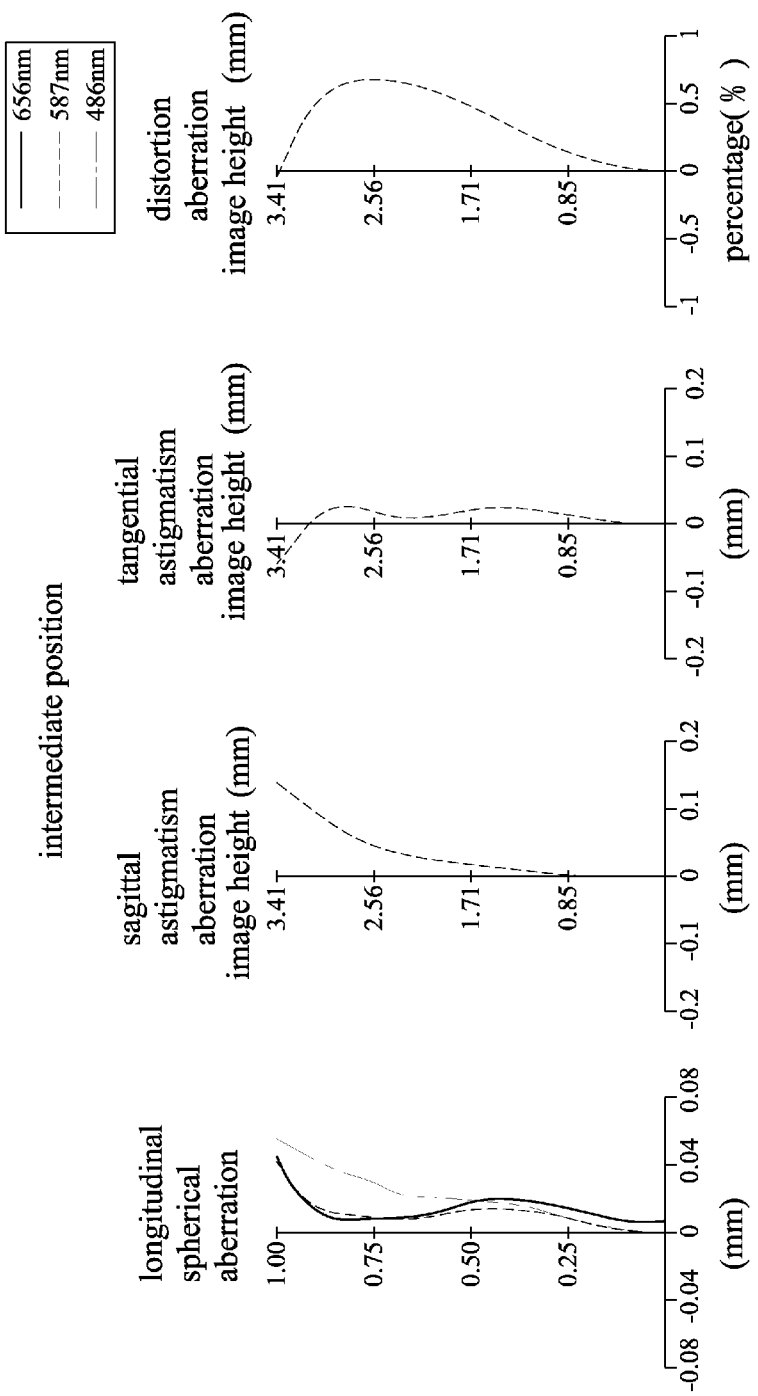

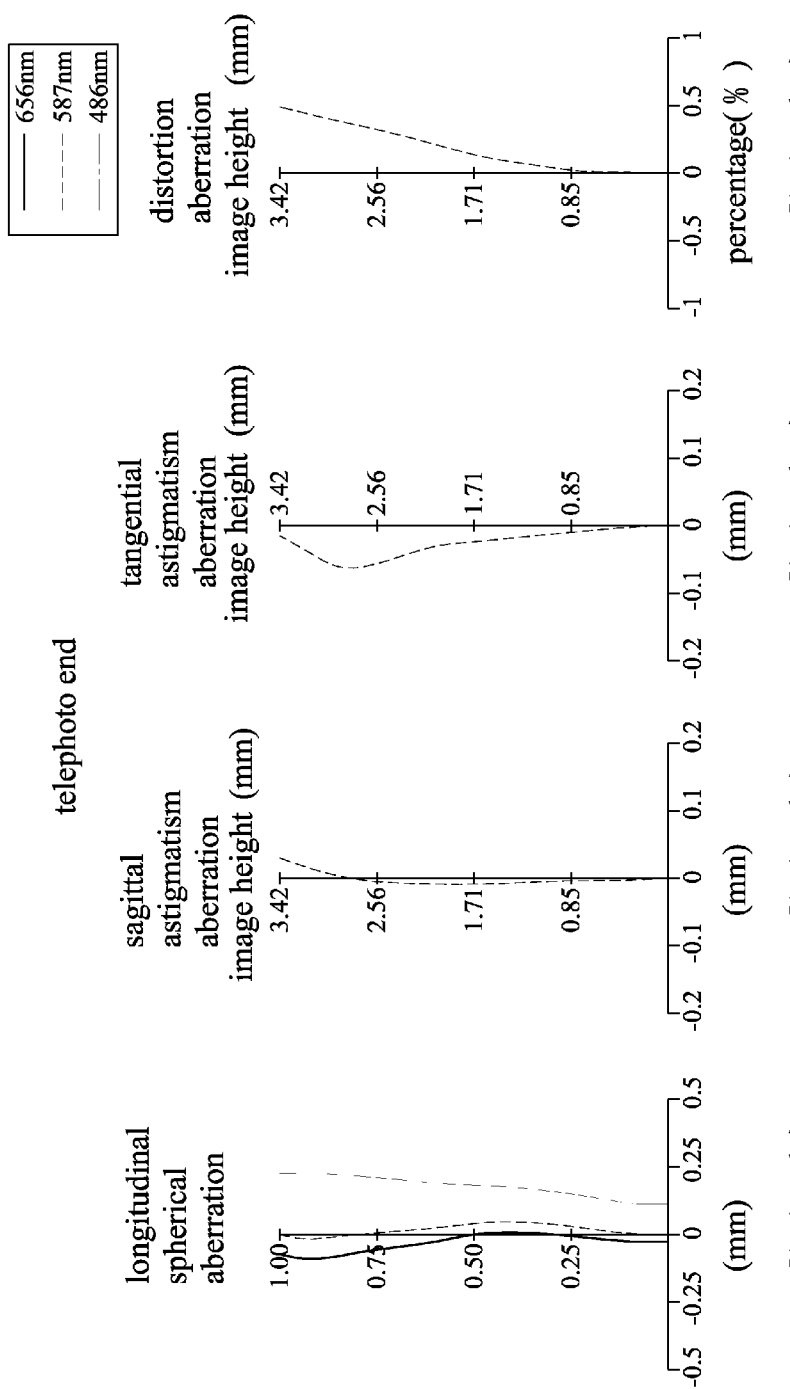

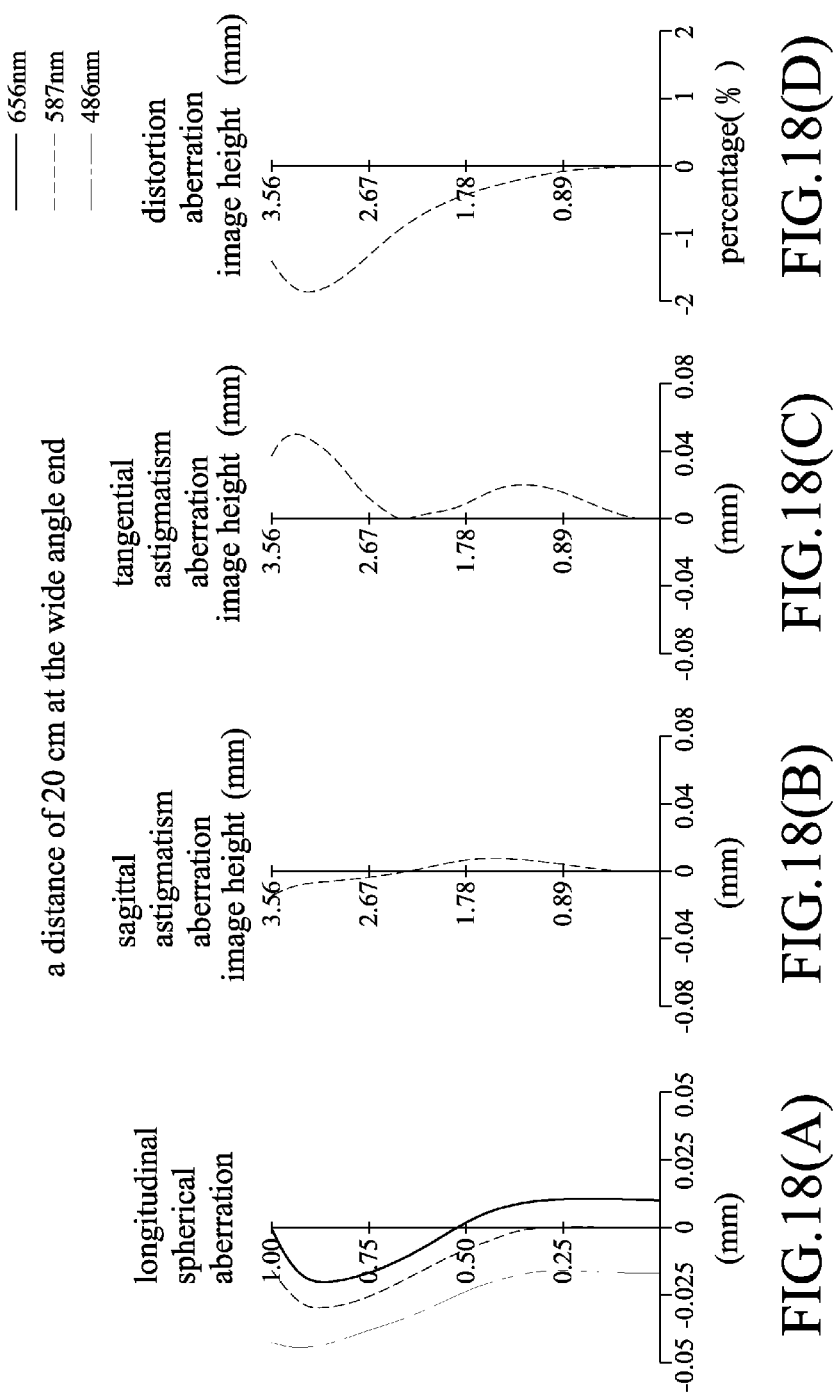

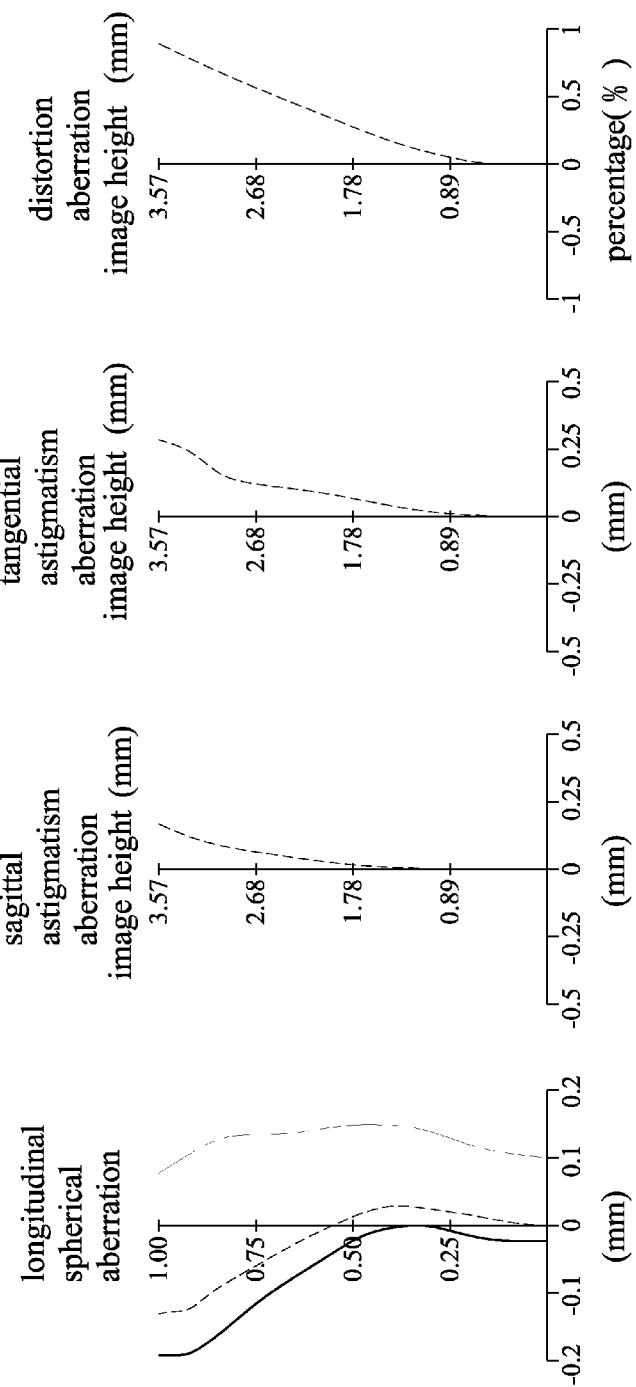

FIG.21 fourth embodiment system focal length=4.897mm(wide angle end), 6.996mm(intermediate position), 12.552mm(telephoto end)

F-number=2.0(wide angle end), 2.9(intermediate position), 5.2(telephoto end)

| lens element | surface | radius of curvature(mm) | surface spacing(mm) (wide angle end)-(intermediate position)-(telephoto end) | refractive power | Abbe number(Abbe) |
|---|---|---|---|---|---|
| aperture stop | | | | | |
| first lens element 1 | object-side surface 11 | 2.7884 | 0.485 | 1.545 | 56.1 |
| | image-side surface 12 | 13.2178 | 0.166 | | |
| second lens element 2 | object-side surface 21 | 5.2404 | 0.289 | 1.545 | 56.1 |
| | image-side surface 22 | 15.2827 | 0.080 | | |
| third lens element 3 | object-side surface 31 | -65.9467 | 0.220 | 1.645 | 23 |
| | image-side surface 32 | 4.4143 | 0.445 - 1.285 - 2.92 | | |
| fourth lens element 4 | object-side surface 41 | -6.5006 | 0.230 | 1.545 | 56.1 |
| | image-side surface 42 | -25.4630 | 0.030 | | |
| fifth lens element 5 | object-side surface 51 | 17.4222 | 0.549 | 1.567 | 37.8 |
| | image-side surface 52 | -13.9451 | 0.096 | | |
| sixth lens element 6 | object-side surface 61 | -1.02E+01 | 0.556 | 1.582 | 33.2 |
| | image-side surface 62 | -2.17E+00 | 2.200 - 1.387 - 0.351 | | |
| seventh lens element 7 | object-side surface 71 | -2.37E+00 | 0.454 | 1.645 | 23 |
| | image-side surface 72 | 4.61E+01 | 0.050 - 1.491 - 4.6 | | |
| optical filter 8 | object-side surface 81 | ∞ | 0.210 | 1.517 | 64.2 |
| | image-side surface 82 | ∞ | 0.440 | | | fourth embodiment

| lens element | surface | K | A4 | A6 | A8 | A10 | A12 | A14 |
|---|---|---|---|---|---|---|---|---|
| first lens element 1 | object-side surface 11 | 1.0385 | -1.630E-03 | 2.809E-03 | -9.419E-04 | 4.993E-05 | 2.836E-04 | 1.171E-06 |
| | image-side surface 12 | -90.0000 | -2.869E-04 | 3.304E-03 | 1.354E-03 | -1.071E-03 | -8.986E-04 | 1.473E-04 |
| second lens element 2 | object-side surface 21 | -37.6344 | 1.914E-03 | -2.478E-03 | -4.065E-03 | -1.982E-03 | -1.379E-03 | -1.704E-03 |
| | image-side surface 22 | -83.5274 | -5.938E-03 | -6.873E-03 | -2.169E-03 | -2.243E-03 | -1.320E-03 | 3.375E-04 |
| third lens element 3 | object-side surface 31 | 90.0000 | -1.455E-02 | 9.143E-05 | 7.479E-04 | 2.540E-03 | 1.859E-03 | 1.695E-04 |
| | image-side surface 32 | -13.0344 | -1.748E-03 | 1.849E-03 | 3.858E-03 | 9.353E-04 | 1.145E-03 | -2.086E-11 |
| fourth lens element 4 | object-side surface 41 | 23.3542 | -5.553E-02 | 4.463E-03 | -9.201E-03 | -2.694E-03 | 9.355E-04 | -1.043E-04 |
| | image-side surface 42 | 90.0000 | -1.276E-02 | -8.499E-03 | -1.875E-03 | -1.037E-03 | -1.101E-04 | 3.189E-04 |
| fifth lens element 5 | object-side surface 51 | 90.0000 | 7.231E-03 | 2.900E-03 | 7.386E-04 | 1.786E-04 | 2.236E-06 | -2.331E-05 |
| | image-side surface 52 | 75.7044 | -1.602E-02 | -3.797E-04 | 3.564E-04 | -2.583E-05 | -9.972E-06 | 1.080E-05 |
| sixth lens element 6 | object-side surface 61 | 41.2395 | 6.003E-03 | -1.740E-03 | -8.192E-04 | 5.331E-05 | 5.771E-05 | 1.109E-05 |
| | image-side surface 62 | -2.1211 | -1.710E-03 | -5.472E-04 | 1.503E-03 | 3.187E-04 | 6.203E-05 | 2.161E-05 |
| seventh lens element 7 | object-side surface 71 | -3.4661 | -1.515E-02 | -6.708E-04 | 3.090E-04 | 1.549E-05 | 1.781E-06 | -5.710E-07 |
| | image-side surface 72 | 90.0000 | -5.197E-03 | -2.730E-04 | 3.260E-05 | 4.287E-07 | -2.454E-07 | 5.197E-09 |

FIG.22

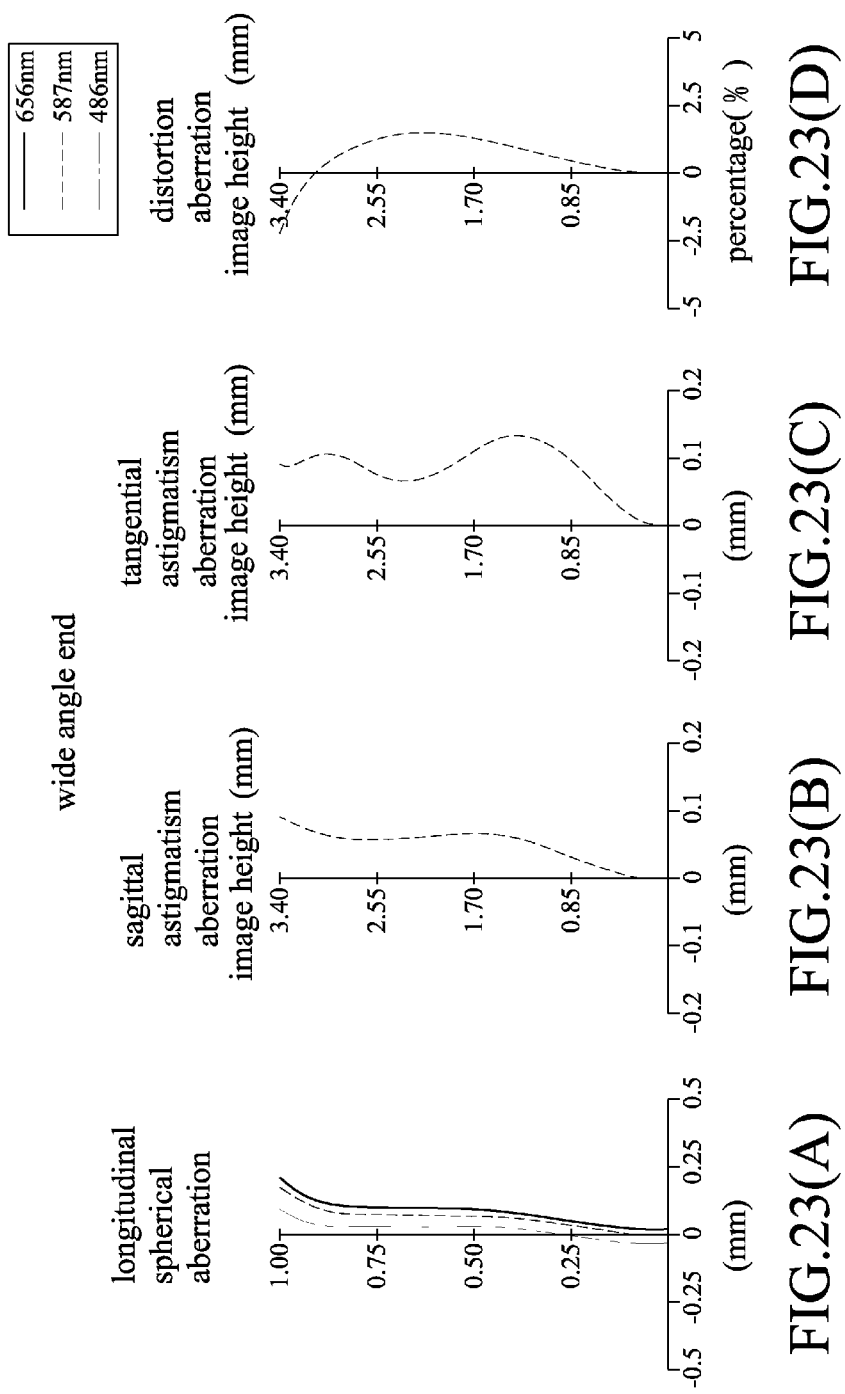

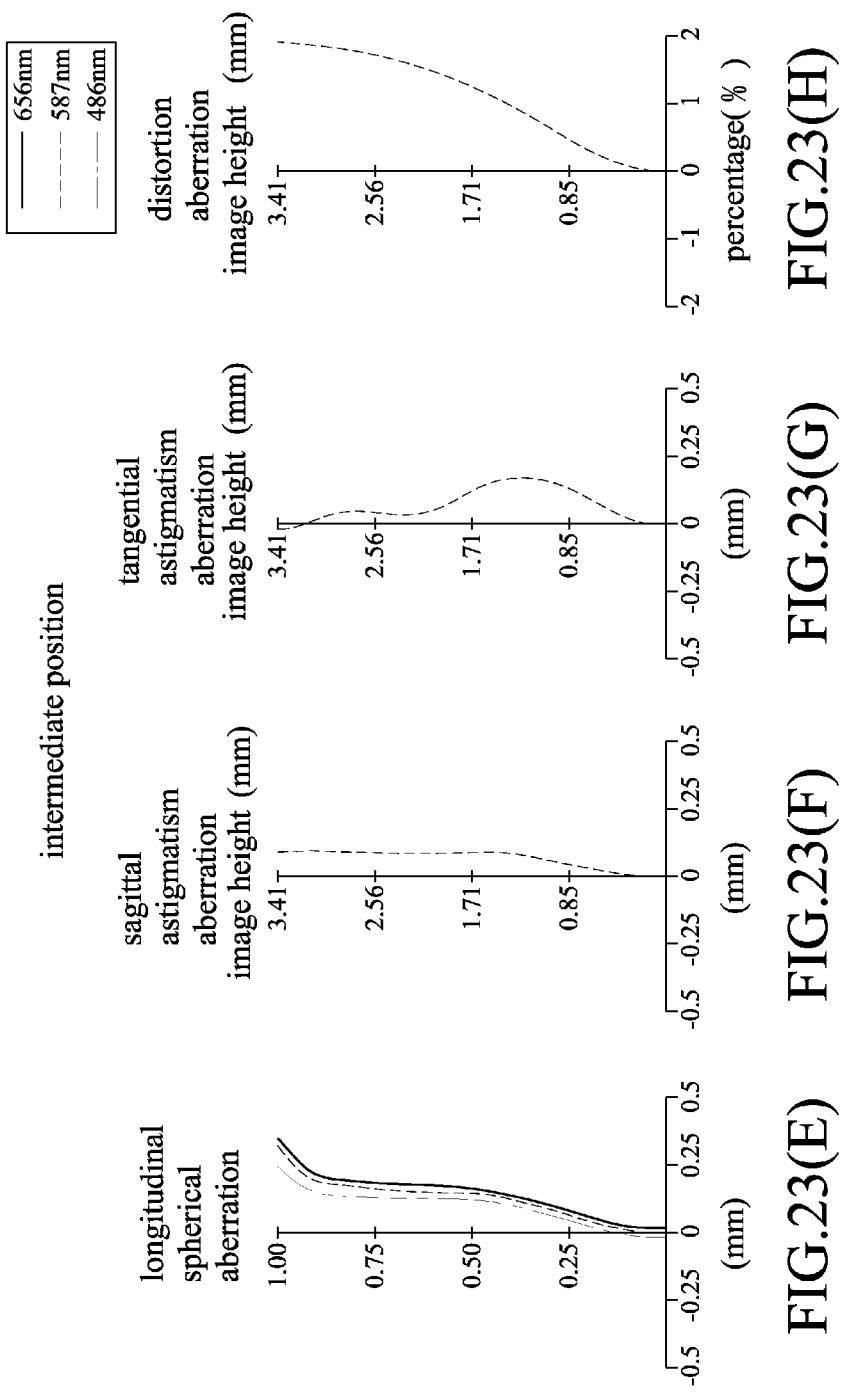

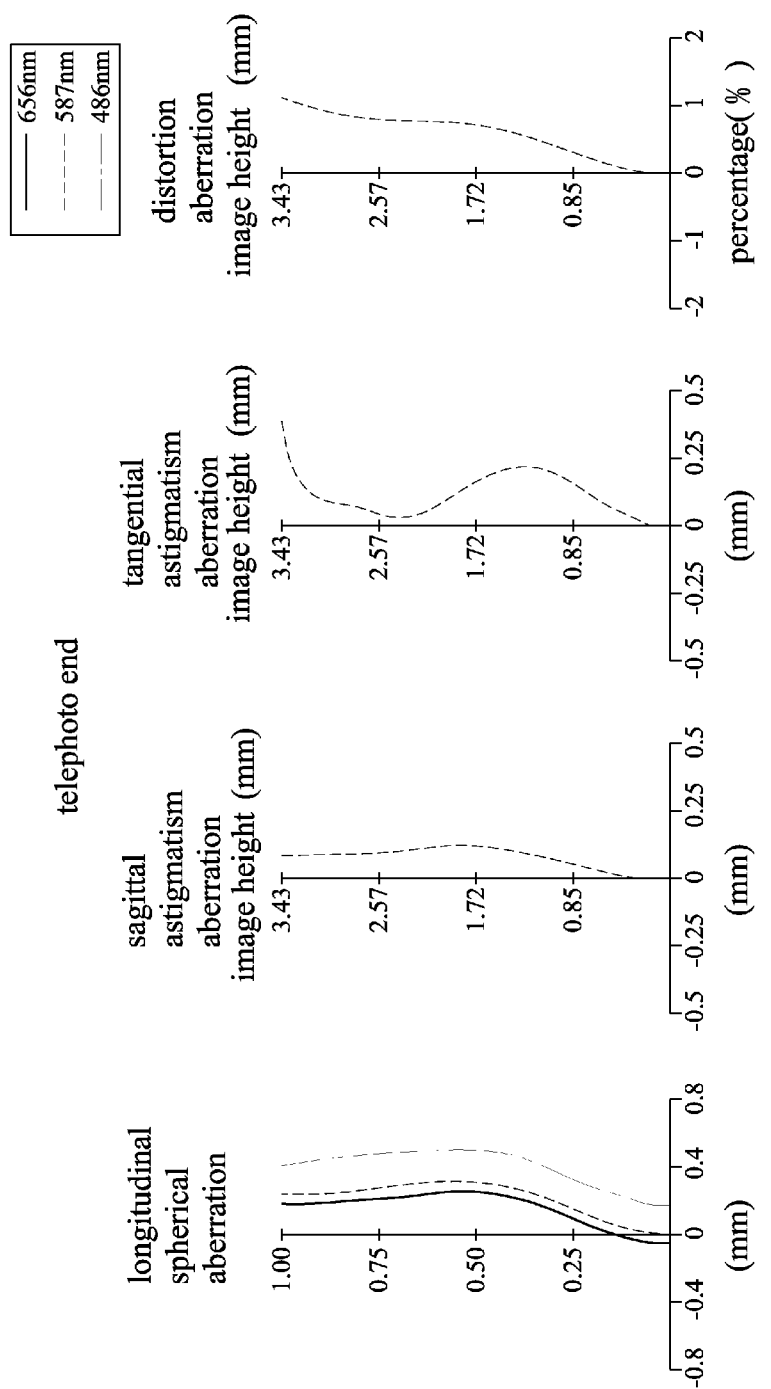

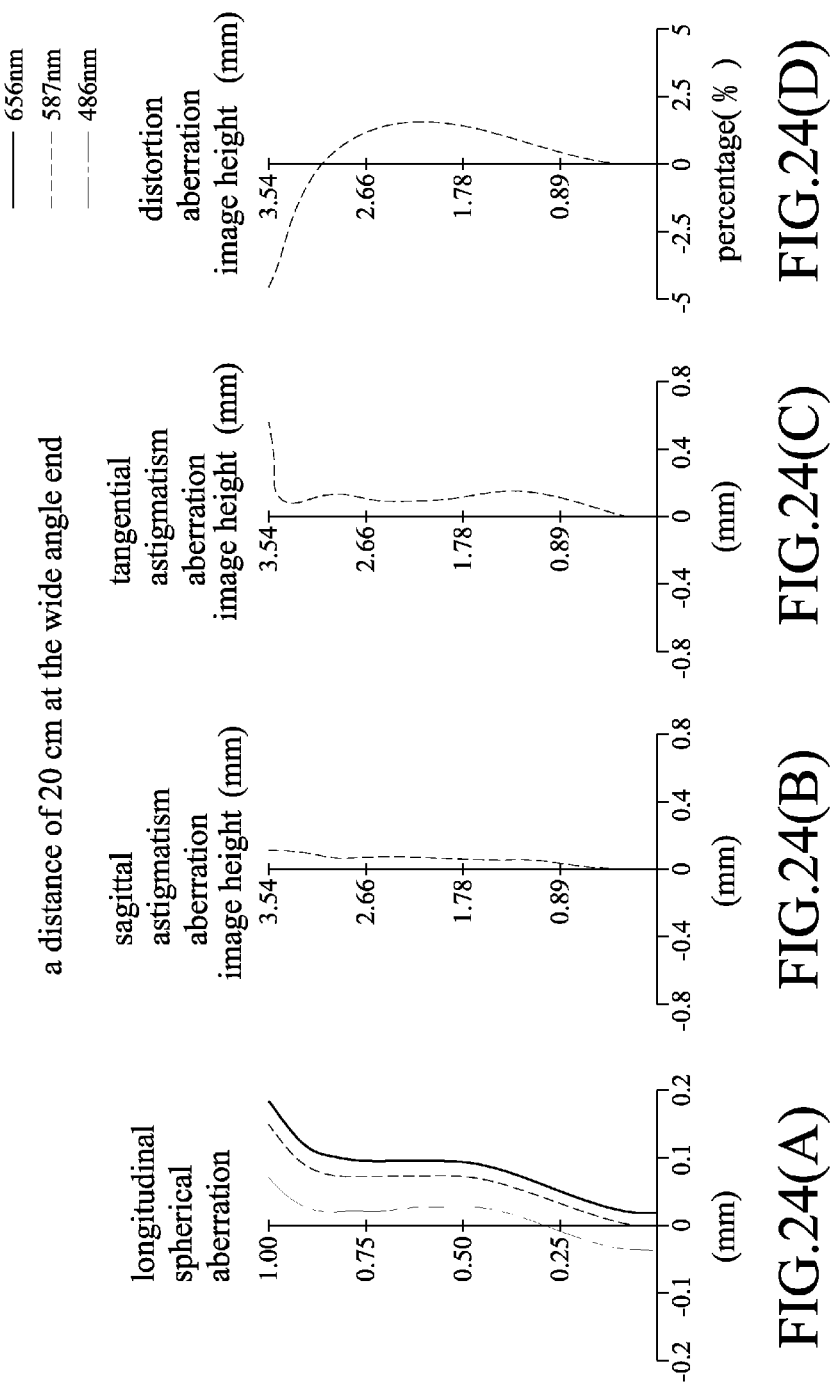

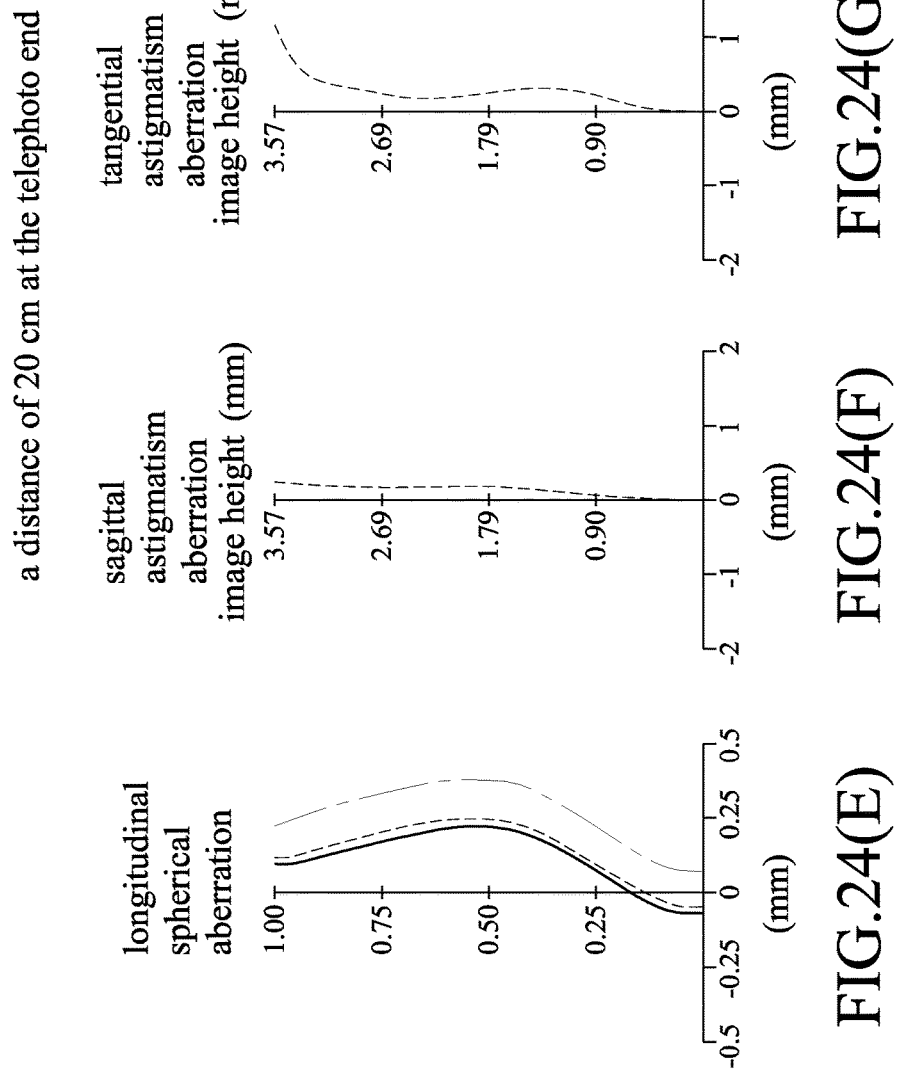

fifth embodiment system focal length=5.831mm(wide angle end), 9.317mm(intermediate position), 15.791mm(telephoto end)
F.-number=2.0(wide angle end), 3.2(intermediate position), 5.4(telephoto end)

| lens element | surface | radius of curvature(mm) | surface spacing(mm) (wide angle end)-(intermediate position)-(telephoto end) | refractive power | Abbe number(Abbe) |
|---|---|---|---|---|---|
| aperture stop | | | | | |
| first lens element 1 | object-side surface 11 | 3.6056 | 0.528 | 1.557 | 42.4 |
| | image-side surface 12 | -12.1986 | 0.062 | | |
| second lens element 2 | object-side surface 21 | -90.0000 | 0.220 | 1.594 | 31.8 |
| | image-side surface 22 | 12.7642 | 0.075 | | |
| third lens element 3 | object-side surface 31 | 10.6160 | 0.412 | 1.535 | 56 |
| | image-side surface 32 | -14.6930 | 0.067 | | |
| fourth lens element 4 | object-side surface 41 | -41.7255 | 0.220 | 1.639 | 23.7 |
| | image-side surface 42 | 4.0291 | 0.394 - 2.283 - 4.151 | | |
| fifth lens element 5 | object-side surface 51 | -14.7935 | 0.300 | 1.545 | 56.1 |
| | image-side surface 52 | -7.8341 | 0.167 | | |
| sixth lens element 6 | object-side surface 61 | -6.07E+00 | 1.325 | 1.541 | 51 |
| | image-side surface 62 | -2.20E+00 | 2.350 - 1.178 - 0.05 | | |
| seventh lens element 7 | object-side surface 71 | -2.55E+00 | 0.574 | 1.545 | 56.1 |
| | image-side surface 72 | 1.57E+01 | 0.104 - 1.943 - 4.7 | | |
| optical filter 8 | object-side surface 81 | ∞ | 0.210 | 1.517 | 64.2 |
| | image-side surface 82 | ∞ | 0.490 | | |

FIG.27 fifth embodiment

| lens element | surface | K | A4 | A6 | A8 | A10 | A12 | A14 |
|---|---|---|---|---|---|---|---|---|
| first lens element 1 | object-side surface 11 | -1.4260 | -5.708E-04 | 8.039E-04 | 4.939E-04 | 5.516E-04 | 9.918E-05 | -8.917E-05 |
|  | image-side surface 12 | -45.6276 | 6.975E-03 | 4.074E-03 | 7.627E-04 | -1.042E-04 | -2.663E-05 | -7.616E-05 |
| second lens element 2 | object-side surface 21 | 90.0000 | 8.549E-03 | 3.090E-04 | -9.027E-04 | -2.378E-04 | -4.551E-04 | 1.548E-04 |
|  | image-side surface 22 | -26.2983 | -9.589E-03 | -3.118E-03 | 7.816E-04 | 6.632E-05 | 1.123E-04 | 2.464E-04 |
| third lens element 3 | object-side surface 31 | -53.0199 | -7.965E-03 | 1.647E-04 | -2.302E-03 | -1.129E-03 | -3.277E-04 | -1.741E-04 |
|  | image-side surface 32 | -17.8751 | -1.488E-02 | -1.048E-02 | -2.813E-03 | -1.833E-04 | 1.783E-04 | -3.298E-05 |
| fourth lens element 4 | object-side surface 41 | 37.9112 | -2.345E-02 | -2.759E-04 | 1.228E-03 | 3.876E-04 | 5.005E-04 | 6.471E-05 |
|  | image-side surface 42 | -11.7247 | 2.972E-03 | 4.525E-03 | 8.152E-04 | 5.157E-04 | -1.977E-04 | 2.810E-07 |
| fifth lens element 5 | object-side surface 51 | 44.3235 | -2.856E-02 | -7.819E-03 | 1.709E-04 | 1.254E-04 | -2.738E-04 | 8.315E-05 |
|  | image-side surface 52 | -60.5878 | -1.968E-02 | 1.676E-03 | -1.085E-03 | 1.789E-03 | 1.165E-04 | -2.302E-05 |
| sixth lens element 6 | object-side surface 61 | -3.4930 | 5.475E-03 | 6.881E-04 | 2.412E-04 | -1.270E-05 | -1.398E-05 | 1.635E-06 |
|  | image-side surface 62 | -0.7915 | -2.241E-03 | -8.812E-04 | -2.322E-05 | -4.655E-06 | 5.794E-06 | -9.178E-09 |
| seventh lens element 7 | object-side surface 71 | -1.8633 | 1.436E-04 | -2.654E-03 | 4.539E-04 | -1.892E-05 | -1.147E-06 | -1.051E-07 |
|  | image-side surface 72 | 18.1020 | -1.990E-03 | -1.852E-03 | 3.850E-04 | -4.328E-05 | 2.593E-06 | -6.957E-08 |

FIG.28

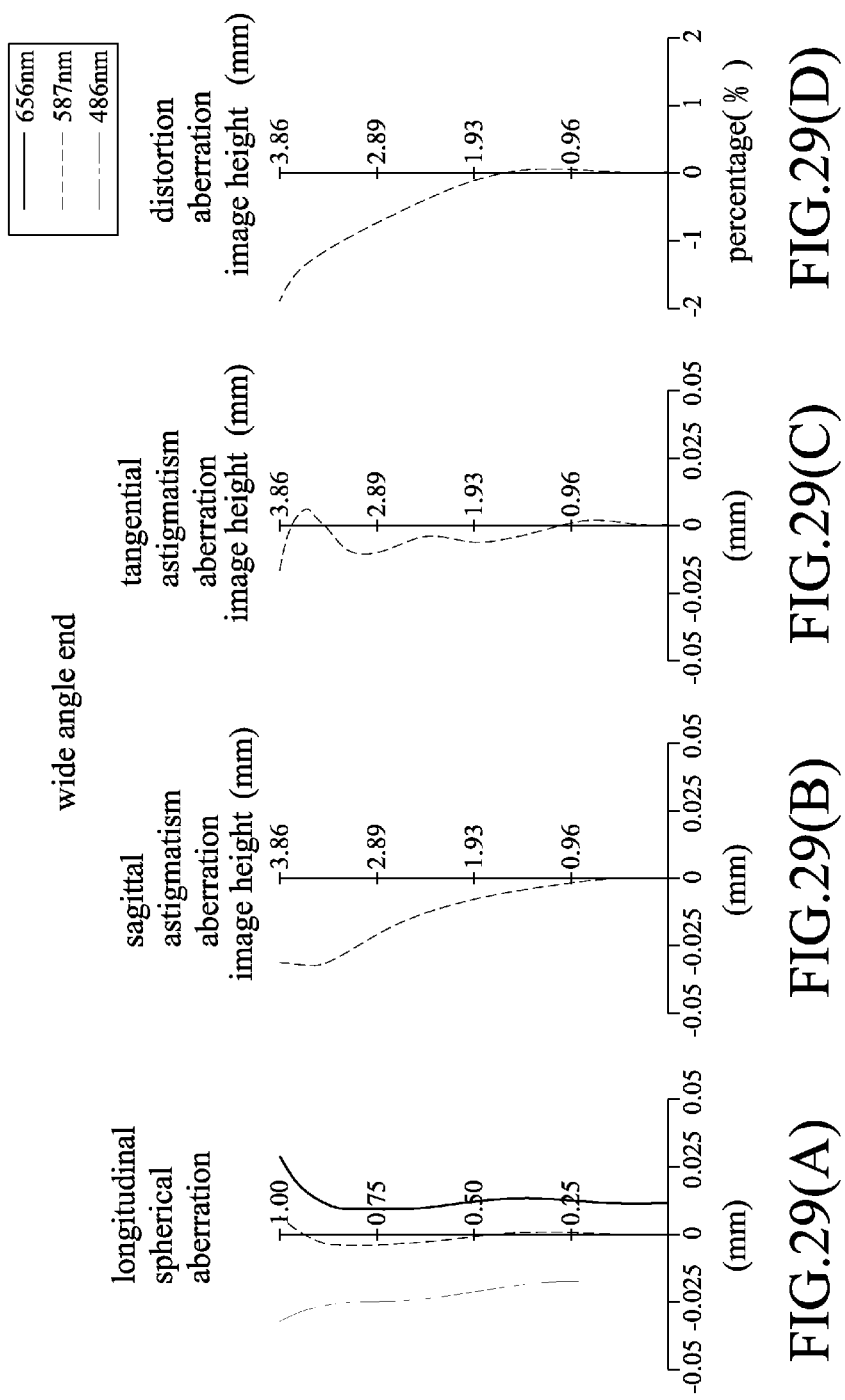

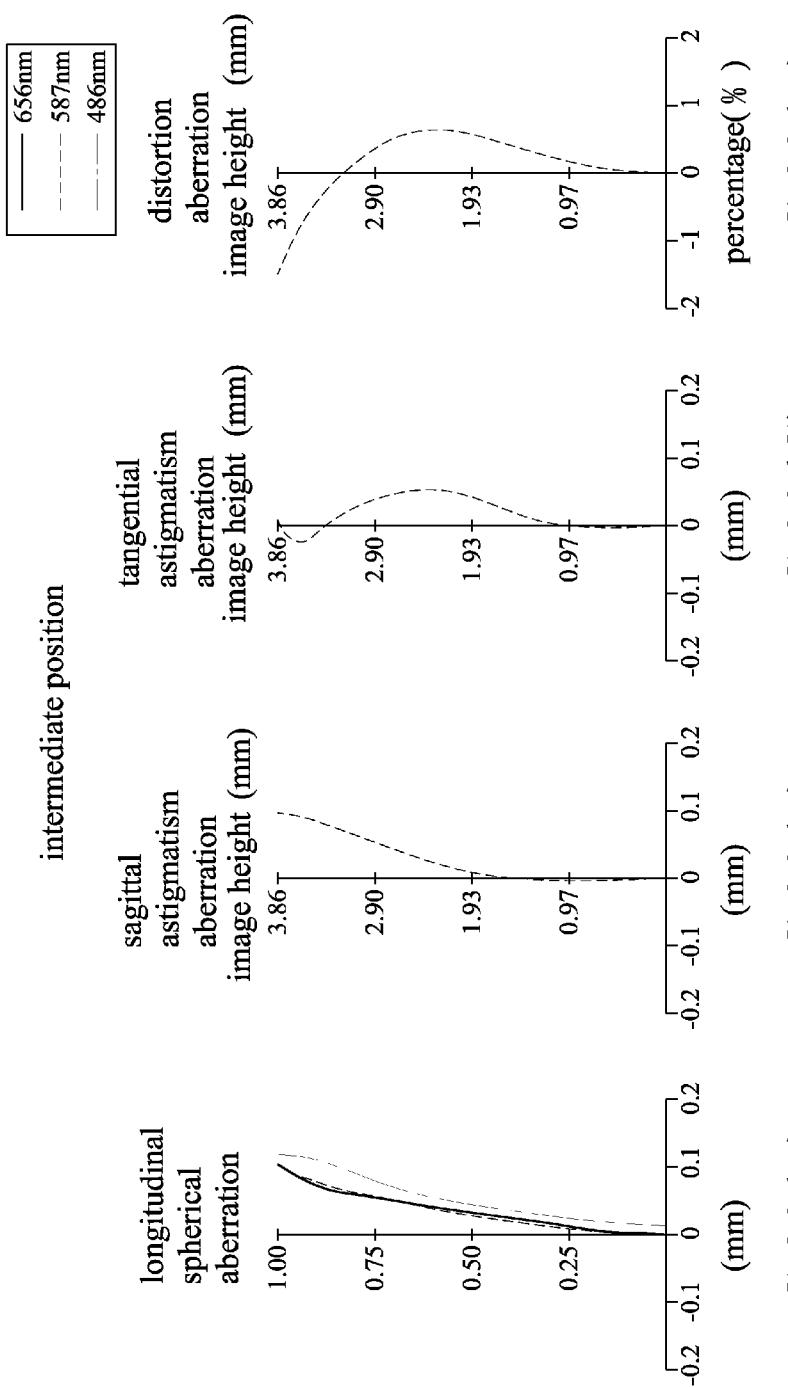

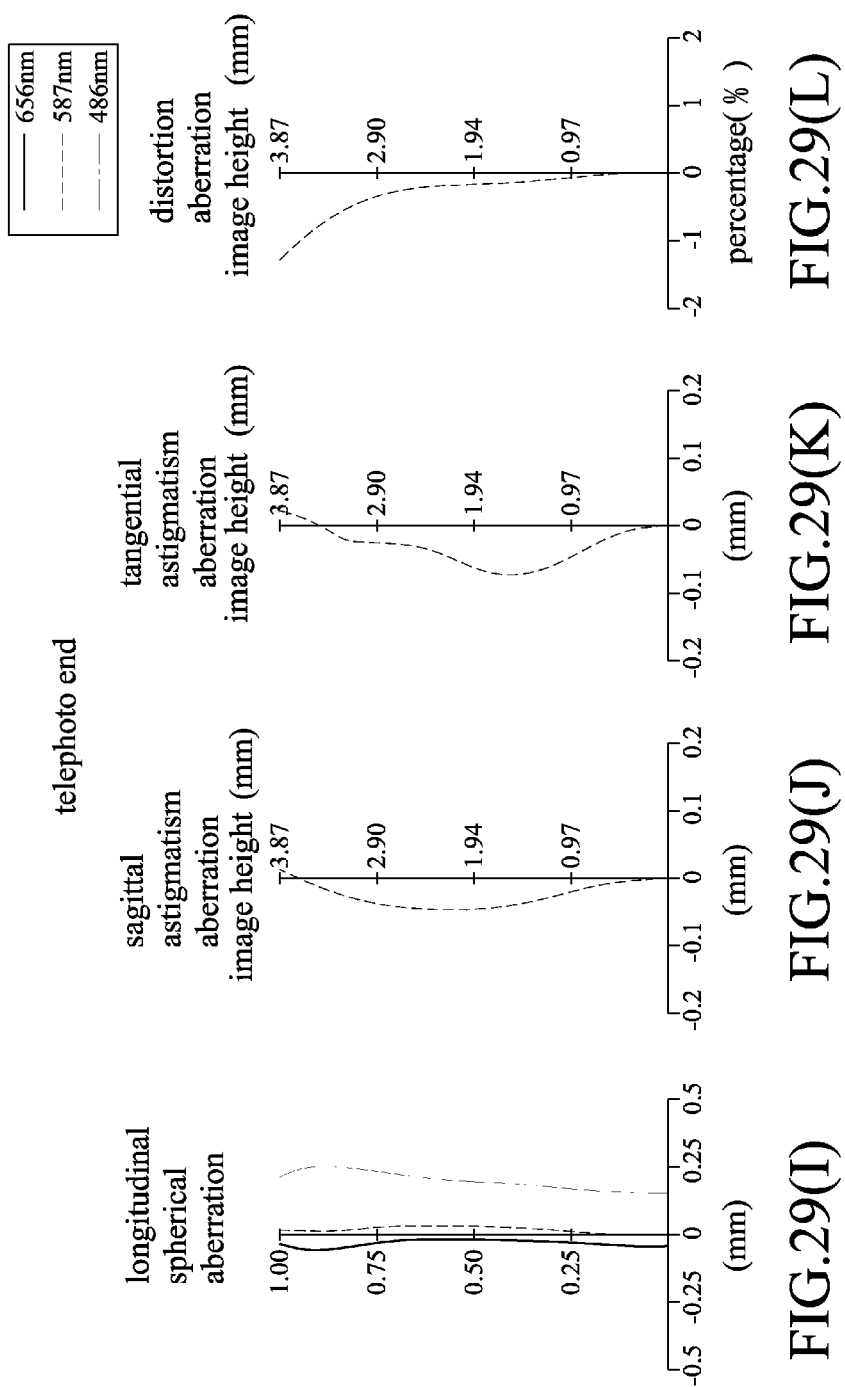

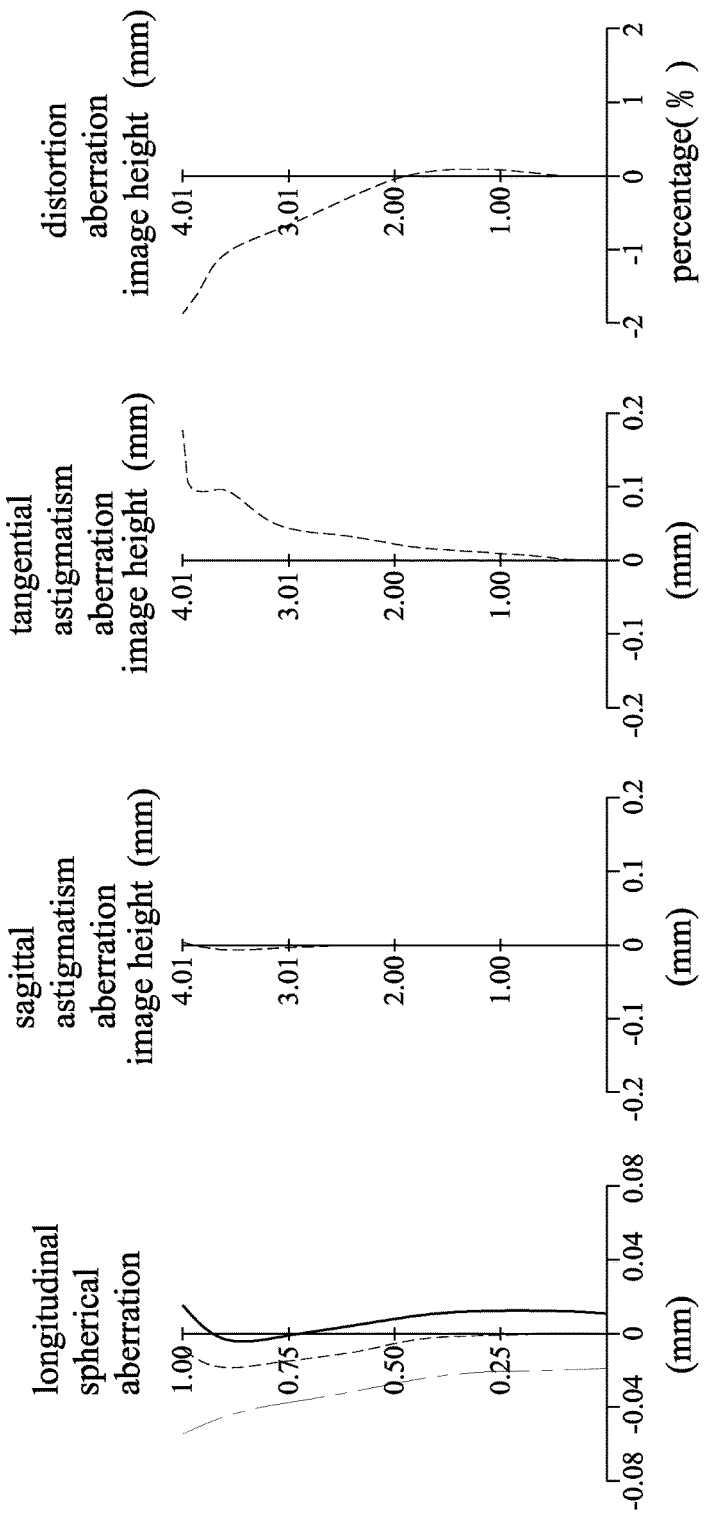

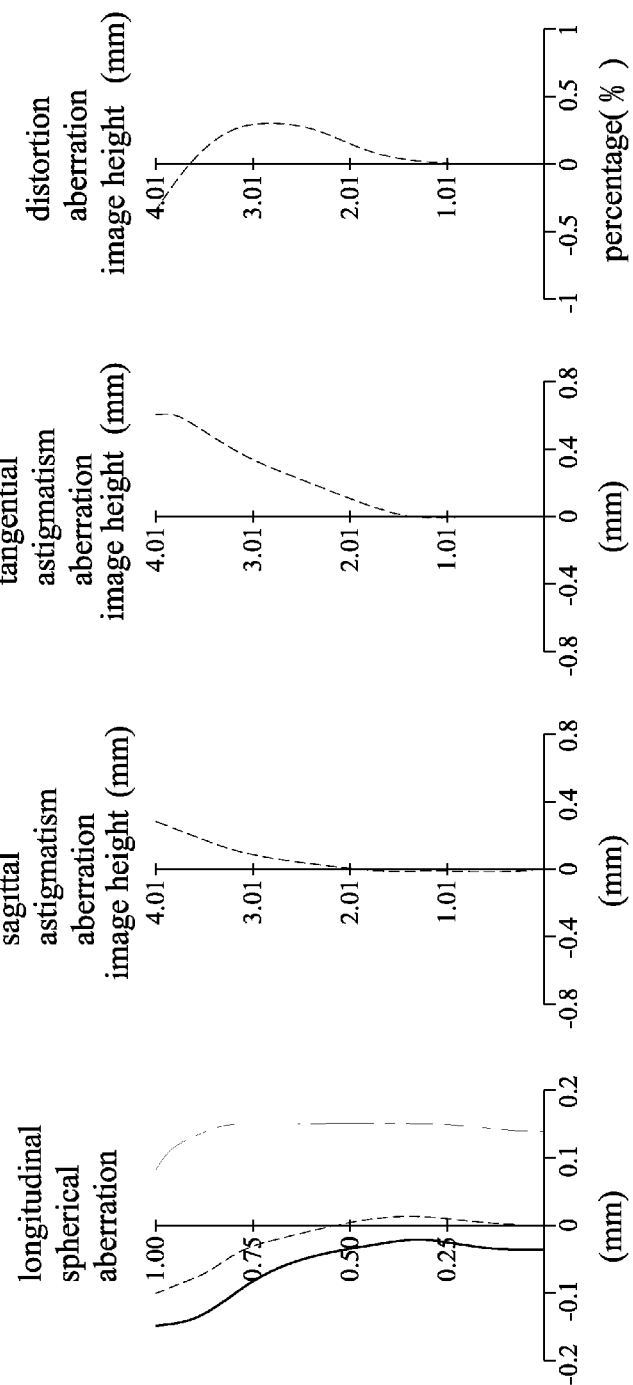

sixth embodiment system focal length=5.009mm(wide angle end), 7.839mm(intermediate position), 13.755mm(telephoto end)
F-number=2.0(wide angle end), 3.2(intermediate position), 5.3(telephoto end)

| lens element | surface | radius of curvature(mm) | surface spacing(mm) (wide angle end)-(intermediate position)-(telephoto end) | refractive power | Abbe number(Abbe) |
|---|---|---|---|---|---|
| aperture stop | | | | | |
| first lens element 1 | object-side surface 11 | 4.2190 | 0.402 | 1.566 | 41.5 |
| | image-side surface 12 | 12.4282 | 0.491 | | |
| second lens element 2 | object-side surface 21 | 10.4652 | 0.396 | 1.544 | 56 |
| | image-side surface 22 | -9.7634 | 0.102 | | |
| third lens element 3 | object-side surface 31 | -6.8735 | 0.269 | 1.642 | 22.4 |
| | image-side surface 32 | 59.6257 | 0.290 - 1.698 - 3.382 | | |
| fourth lens element 4 | object-side surface 41 | 90.0000 | 0.417 | 1.544 | 56 |
| | image-side surface 42 | -10.9269 | 0.129 | | |
| fifth lens element 5 | object-side surface 51 | -4.2361 | 1.445 | 1.548 | 53.1 |
| | image-side surface 52 | -1.8312 | 1.911 - 1.001 - 0.050 | | |
| sixth lens element 6 | object-side surface 61 | -2.50E+00 | 0.637 | 1.573 | 38.4 |
| | image-side surface 62 | 9.72E+00 | 0.165 - 1.863 - 4.579 | | |
| optical filter 8 | object-side surface 81 | ∞ | 0.210 | 1.517 | 64.2 |
| | image-side surface 82 | ∞ | 0.490 | | |

FIG.33 sixth embodiment

| lens element | surface | K | A4 | A6 | A8 | A10 | A12 | A14 |
|---|---|---|---|---|---|---|---|---|
| first lens element 1 | object-side surface 11 | 0.6313 | 2.061E-03 | 5.483E-03 | 8.954E-04 | 3.348E-04 | 1.195E-04 | 6.061E-05 |
| | image-side surface 12 | 90.0000 | 4.174E-03 | 5.728E-03 | 1.943E-03 | 9.724E-05 | -3.243E-05 | 1.311E-04 |
| second lens element 2 | object-side surface 21 | 34.2216 | 3.788E-03 | 1.785E-03 | -7.798E-04 | -3.956E-04 | -4.275E-04 | -2.136E-04 |
| | image-side surface 22 | 54.0567 | -1.193E-03 | -7.967E-03 | -1.599E-03 | -2.965E-04 | 1.423E-04 | 1.231E-04 |
| third lens element 3 | object-side surface 31 | 25.6871 | -1.425E-02 | 7.945E-04 | 3.979E-05 | 8.517E-04 | 1.039E-03 | 1.549E-05 |
| | image-side surface 32 | -90.0000 | -1.789E-02 | 3.585E-03 | 2.400E-03 | 3.111E-04 | -1.891E-04 | -2.021E-05 |
| fourth lens element 4 | object-side surface 41 | -90.0000 | -2.621E-02 | -6.487E-03 | -4.269E-03 | -9.003E-05 | 1.667E-04 | -2.210E-04 |
| | image-side surface 42 | -47.8538 | -4.418E-03 | -4.424E-03 | -1.164E-03 | -2.000E-04 | 4.731E-05 | 9.652E-06 |
| fifth lens element 5 | object-side surface 51 | 0.9650 | -1.466E-03 | 1.438E-03 | 3.417E-04 | 1.673E-05 | -7.265E-06 | 1.552E-07 |
| | image-side surface 52 | -0.8327 | 3.085E-04 | -1.903E-03 | -1.108E-04 | 9.525E-06 | 4.222E-06 | 8.019E-07 |
| sixth lens element 6 | object-side surface 61 | -1.4629 | 2.975E-03 | -2.111E-03 | -3.121E-05 | 3.142E-05 | 1.468E-06 | -8.880E-07 |
| | image-side surface 62 | -2.2235 | -3.564E-03 | -7.662E-04 | 9.148E-05 | -3.695E-06 | -1.518E-07 | 1.048E-08 |

FIG.34

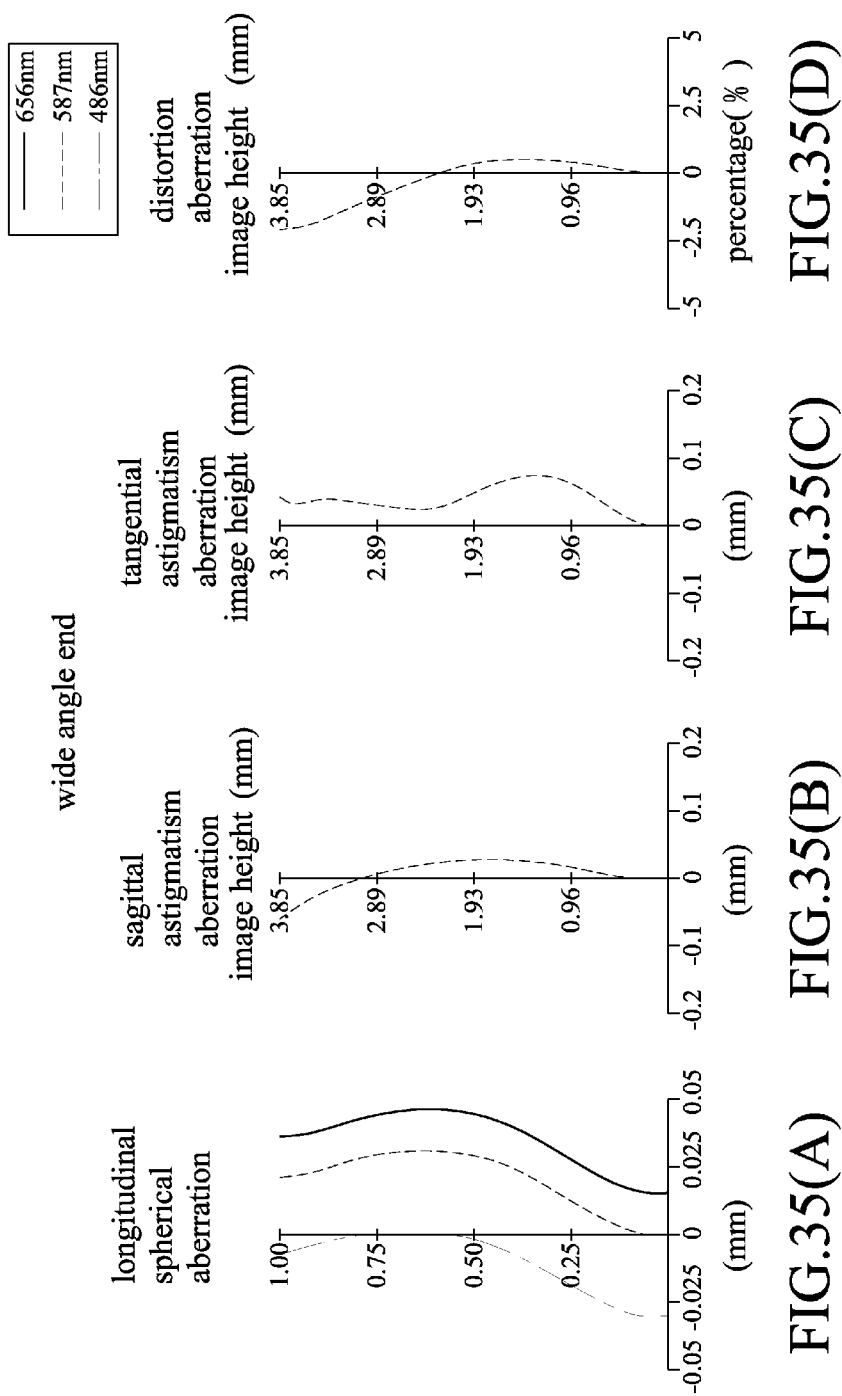

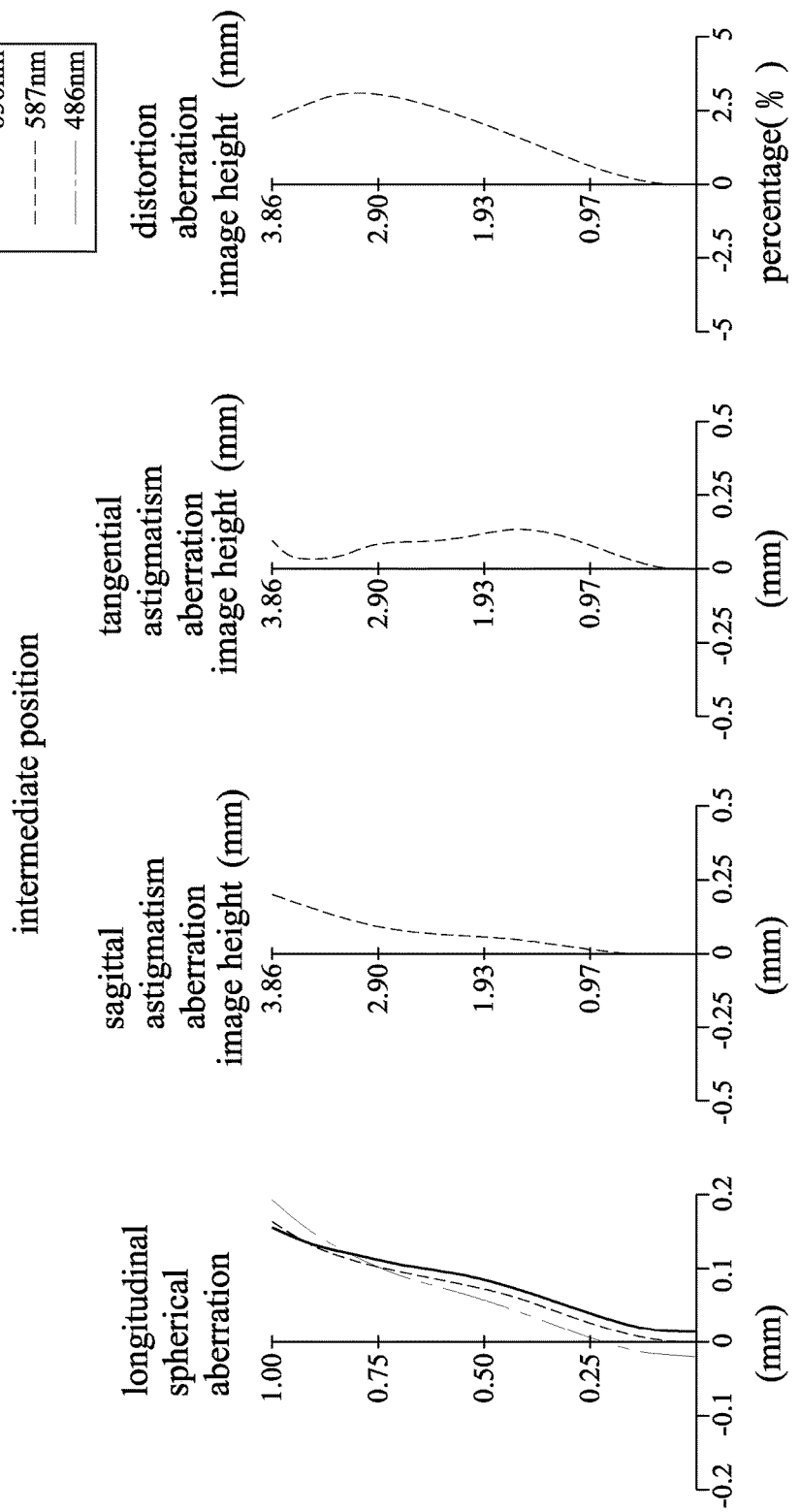

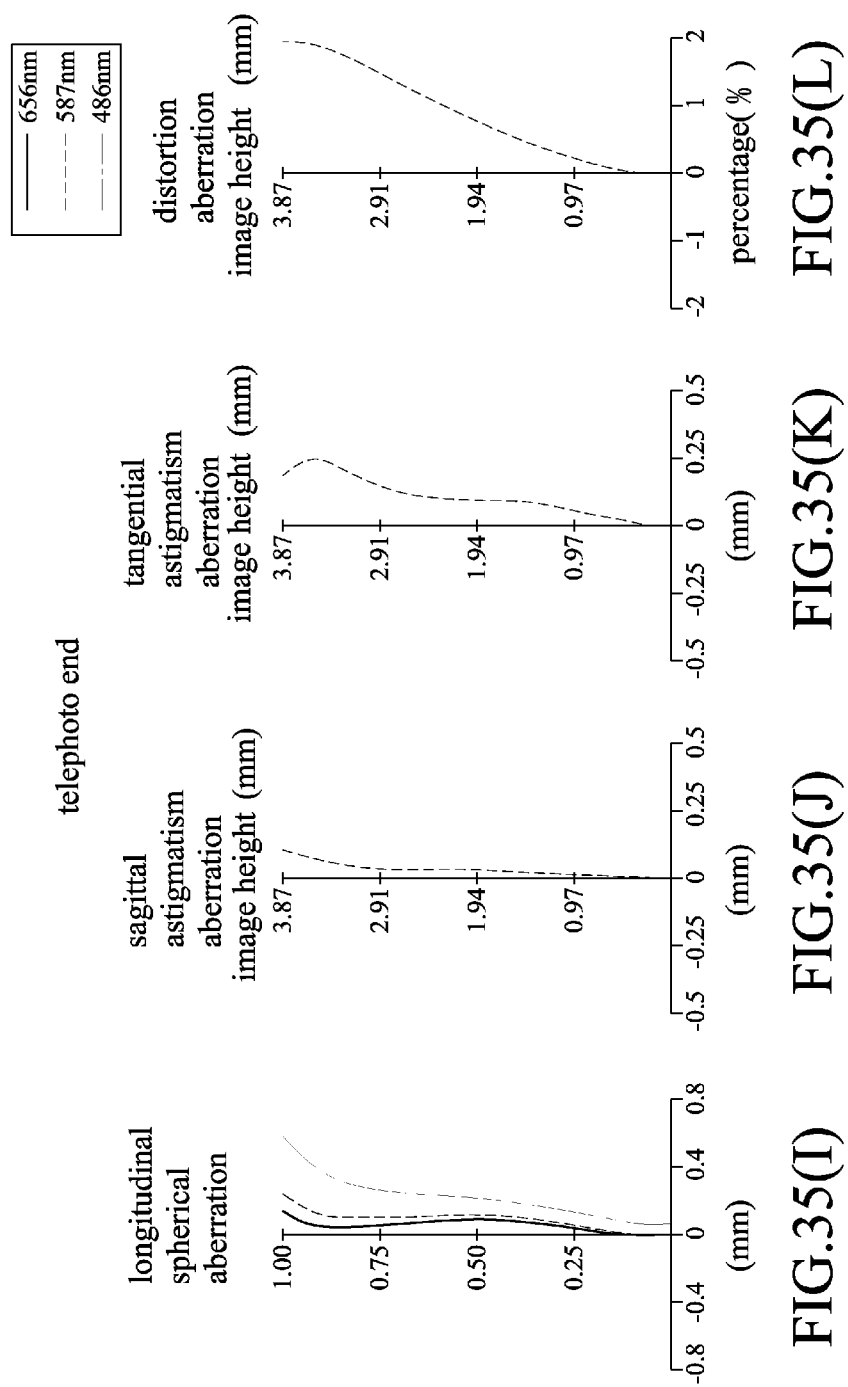

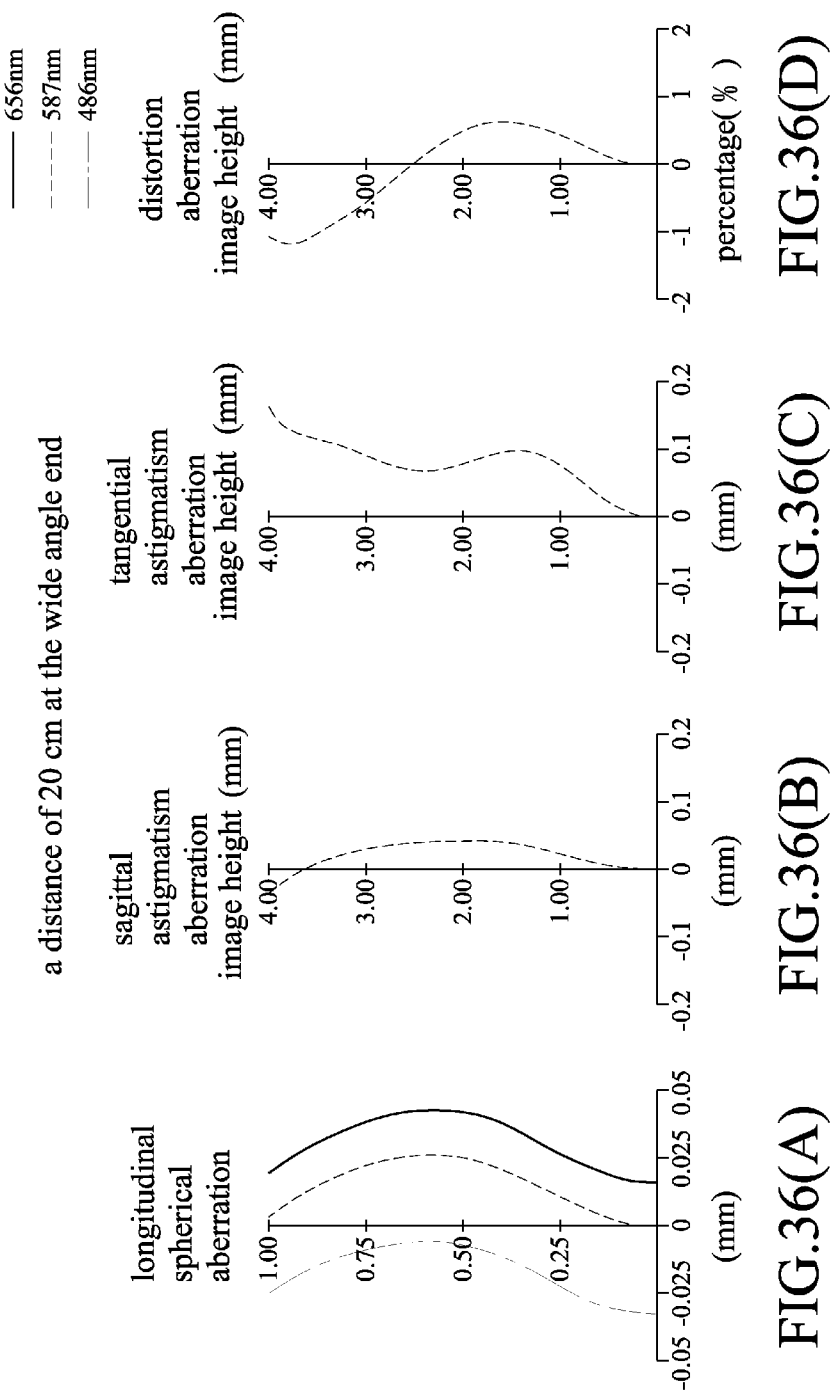

| seventh embodiment | | | | |
|---|---|---|---|---|
| system focal length=5.621mm(wide angle end), 9.025mm(intermediate position), 14.413mm(telephoto end) F-number=2.0(wide angle end), 3.2(intermediate position), 5.3(telephoto end) | | | | |
| lens element | surface | radius of curvature(mm) | surface spacing(mm) (wide angle end)-(intermediate position)-(telephoto end) | refractive power | Abbe number(Abbe) |
| aperture stop | | | | | |
| first lens element 1 | object-side surface 11 | 2.6495 | 0.570 | 1.548 | 53.2 |
| | image-side surface 12 | 15.3444 | 0.613 | | |
| second lens element 2 | object-side surface 21 | -6.8677 | 0.220 | 1.642 | 22.4 |
| | image-side surface 22 | 15.0395 | 0.324 - 1.943 - 3.808 | | |
| third lens element 3 | object-side surface 31 | 27.8970 | 0.520 | 1.545 | 56.1 |
| | image-side surface 32 | -11.0841 | 0.167 | | |
| fourth lens element 4 | object-side surface 41 | -5.7711 | 1.370 | 1.545 | 56.1 |
| | image-side surface 42 | -2.1320 | 2.114 - 0.983 - 0.04 | | |
| fifth lens element 5 | object-side surface 51 | -3.3840 | 0.663 | 1.545 | 56.1 |
| | image-side surface 52 | 7.1629 | 0.207 - 2.526 - 6.039 | | |
| optical filter 8 | object-side surface 81 | ∞ | 0.210 | 1.517 | 64.2 |
| | image-side surface 82 | ∞ | 0.440 | | |

FIG.39

| lens element | surface | K | A4 | A6 | A8 | A10 | A12 | A14 |
|---|---|---|---|---|---|---|---|---|
| first lens element 1 | object-side surface 11 | 0.5569 | 2.008E-03 | 1.320E-03 | -4.639E-05 | -9.606E-07 | 1.468E-05 | 2.976E-05 |
| | image-side surface 12 | 18.1450 | 8.160E-04 | -2.156E-04 | -2.391E-04 | 2.119E-06 | 6.833E-05 | -2.171E-05 |
| second lens element 2 | object-side surface 21 | 19.9793 | -6.336E-03 | 3.367E-03 | 9.654E-04 | 3.453E-05 | 1.138E-05 | 1.059E-06 |
| | image-side surface 22 | 90.0000 | -8.310E-03 | 3.200E-03 | 1.045E-03 | -3.793E-06 | -7.722E-05 | -1.369E-06 |
| third lens element 3 | object-side surface 31 | -90.0000 | -1.859E-02 | -5.184E-03 | -1.703E-03 | 1.119E-04 | -1.280E-05 | -7.513E-05 |
| | image-side surface 32 | -53.9247 | -5.172E-03 | -2.045E-03 | -4.524E-04 | -1.072E-04 | -3.798E-06 | 6.816E-06 |
| fourth lens element 4 | object-side surface 41 | 0.8210 | -3.419E-04 | 6.407E-04 | 9.789E-05 | 1.516E-05 | -1.219E-06 | -2.488E-07 |
| | image-side surface 42 | -0.8236 | -7.163E-04 | -1.516E-03 | 3.529E-05 | -6.781E-06 | 2.959E-07 | 6.138E-07 |
| fifth lens element 5 | object-side surface 51 | -0.7354 | 7.829E-04 | -1.303E-04 | -1.099E-04 | 2.003E-05 | 4.605E-07 | -2.257E-07 |
| | image-side surface 52 | -14.7747 | -3.544E-03 | -2.665E-04 | 5.977E-05 | -6.752E-06 | 4.012E-07 | -1.110E-08 | seventh embodiment

FIG. 40

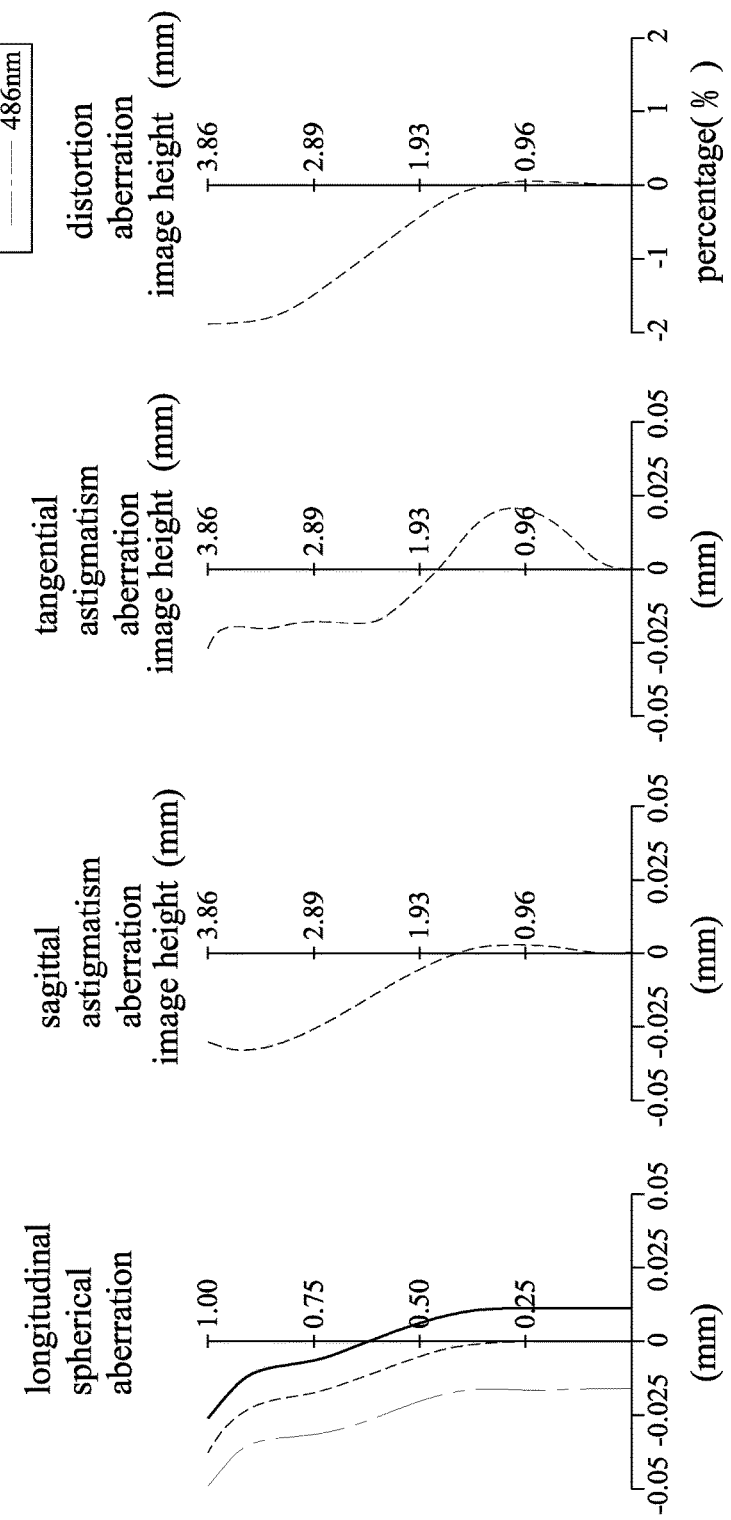

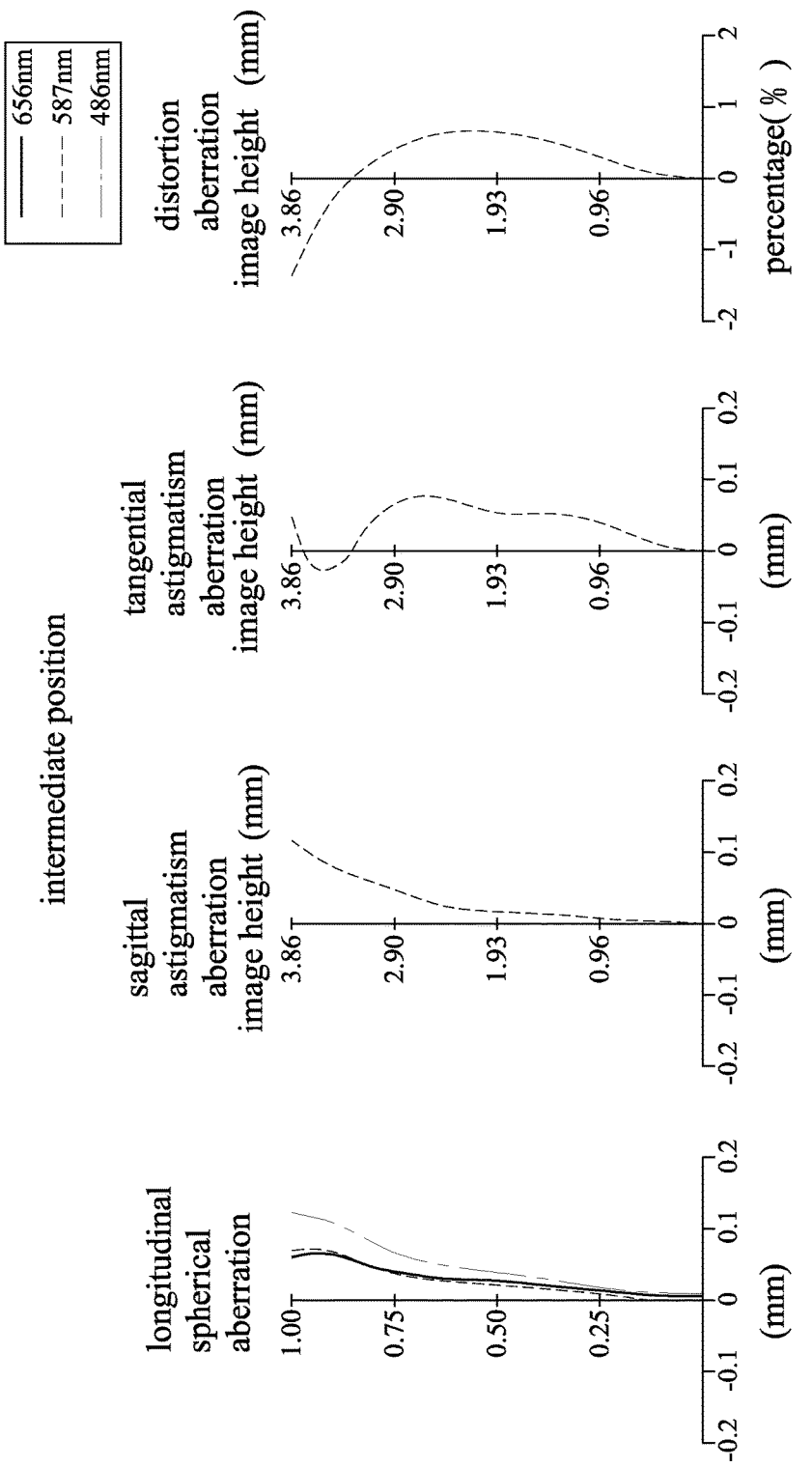

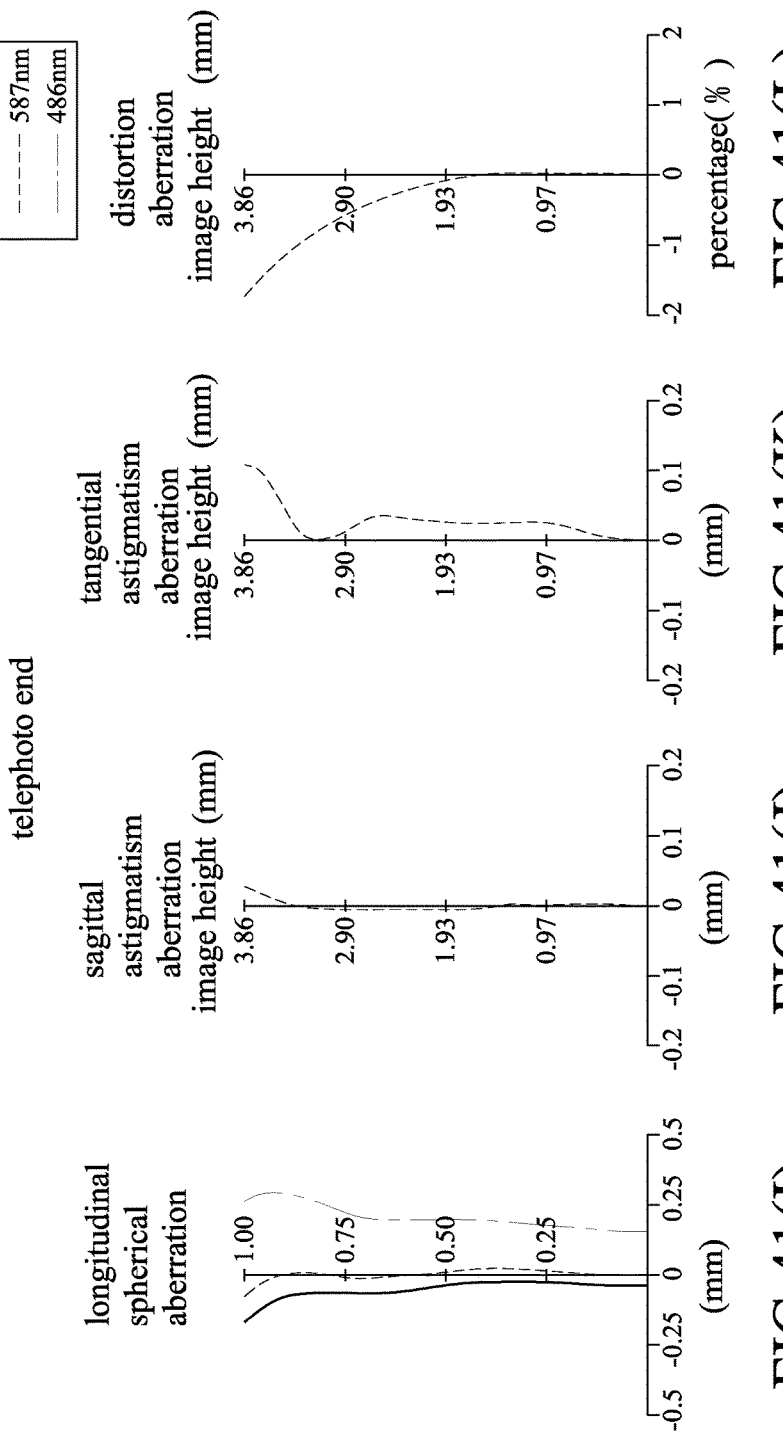

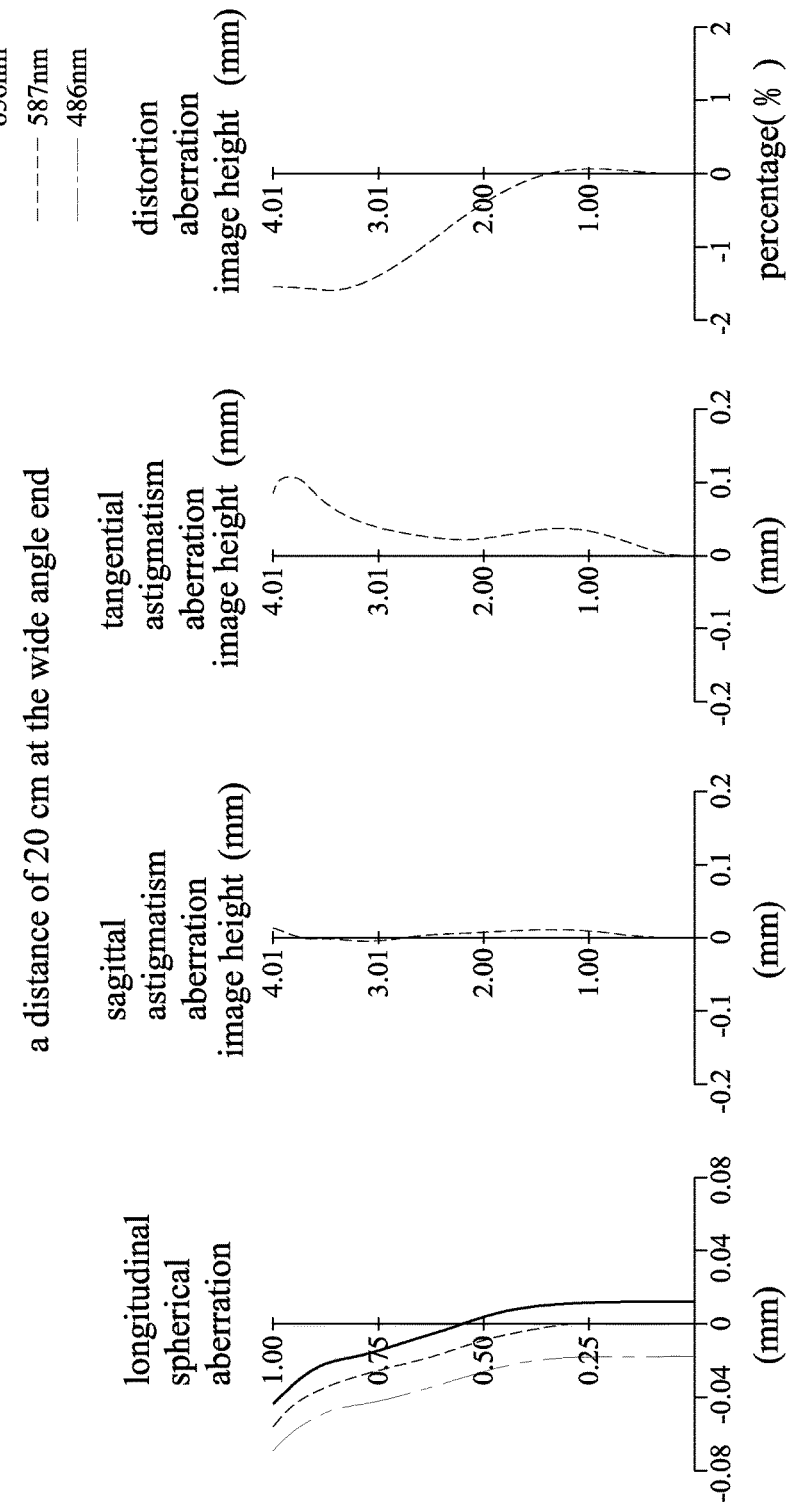

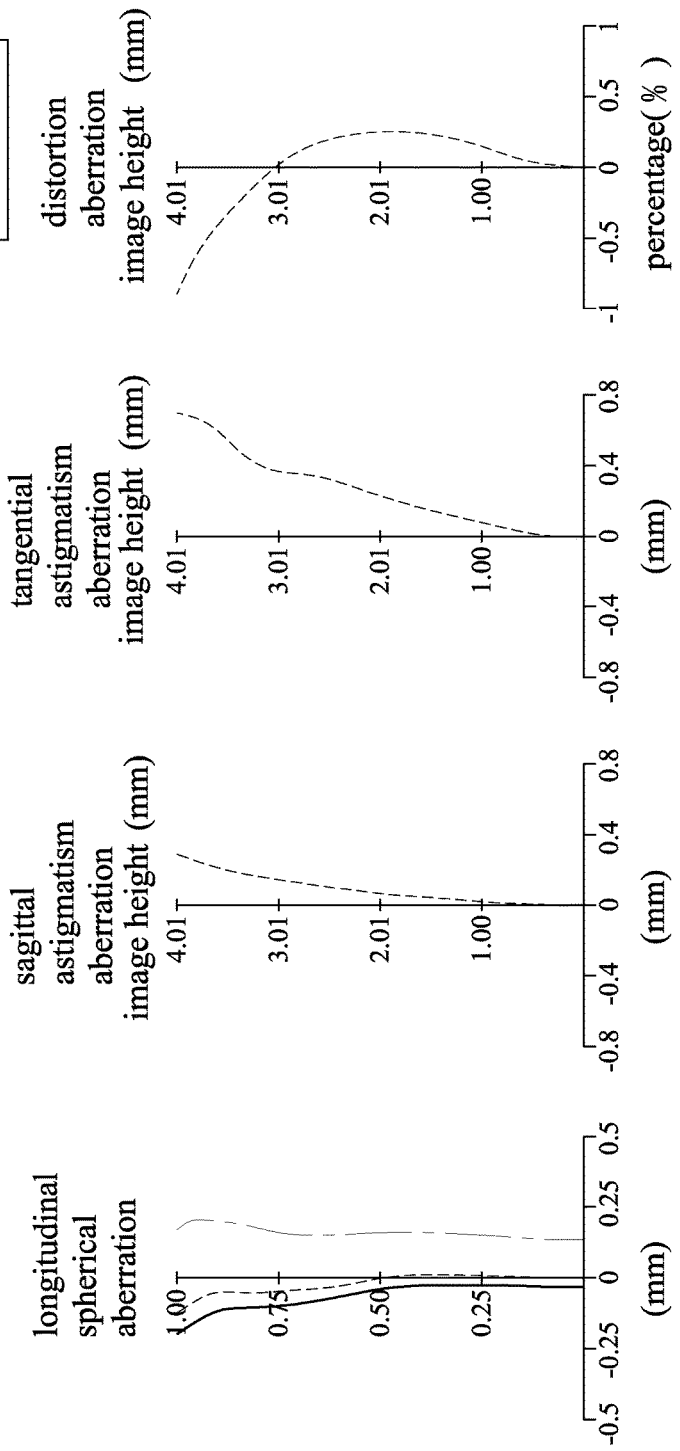

| | ΔT | ΔW | fw | ft | ΔT/ΔW | ft/fw |
|---|---|---|---|---|---|---|
| first embodiment | 0.129 | 0.079 | 4.9558 | 12.9875 | 1.6227 | 2.621 |
| second embodiment | 0.142 | 0.082 | 4.9883 | 13.0122 | 1.7270 | 2.609 |
| third embodiment | 0.113 | 0.075 | 4.9402 | 12.9785 | 1.5099 | 2.627 |
| fourth embodiment | 0.132 | 0.082 | 4.8969 | 12.5516 | 1.6037 | 2.563 |
| fifth embodiment | 0.221 | 0.115 | 5.8311 | 15.7905 | 1.9254 | 2.708 |
| sixth embodiment | 0.147 | 0.093 | 5.0085 | 13.7548 | 1.5774 | 2.746 |
| seventh embodiment | 0.175 | 0.109 | 5.6314 | 15.3659 | 1.6042 | 2.729 |

FIG.43

IMAGING ZOOM LENS SYSTEM

CROSS-REFERENCE TO RELATED APPLICATION

This application claims priority to Taiwanese Patent Application No. 105100652, filed on Jan. 11, 2016.

FIELD

The disclosure relates to an imaging zoom lens system.

BACKGROUND

In recent years, with the prevalence of portable electronic devices, such as mobile phones and digital cameras, technological development of imaging modules having an optical lens, a module holder unit and a sensor has thrived. Generally, the optical lens of such imaging modules is designed to be an imaging zoom lens that allows a user to change a focal length thereof in a predetermined range for satisfying photographing requirements of the user. In addition, the imaging zoom lens can magnify a distant object for taking a close-up photograph when zooming at a telephoto end, and can have an enlarged field of view when zooming at a wide angle end.

Since a focusing range of travel of the imaging zoom lens from infinity to a close-up photographing distance is proportional to a system focal length of the imaging zoom lens, the imaging zoom lens at the telephoto end, which has a maximum system focal length, leads to a maximum focusing range of travel from infinity to the close-up photographing distance, thereby causing a slow focusing speed. Hence, it is a goal in industry to increase the focusing speed at the telephoto end to approach the focusing speed at the wide angle end.

SUMMARY

An object of the disclosure is to provide an imaging zoom lens system to increase a focusing speed at a telephoto end to approach a focusing speed at a wide angle end.

According to the disclosure, an imaging zoom lens system includes a first lens group, a second lens group and a third lens group in sequence from an object side to an image side along an optical axis of the imaging zoom lens system. The first lens group has a positive effective focal length and an aperture stop. The second lens group has a positive effective focal length. The third lens group has a negative effective focal length. The first and second lens groups are permitted to move in synchronization with each other along the optical axis when the imaging zoom lens system performs focusing. The imaging zoom lens system satisfies:

$1.01 < \Delta T/\Delta W < 3.00$; and $1.50 < ft/fw < 5.00$ where $\Delta T$ represents a focusing range of travel of the first and second lens groups along the optical axis when the imaging zoom lens system performs focusing from infinity to a close-up photographing distance at a telephoto end, $\Delta W$ represents a focusing range of travel of the first and second lens groups along the optical axis when the imaging zoom lens system performs focusing from infinity to the close-up photographing distance at a wide angle end, ft represents a system focal length of the imaging zoom lens system at the telephoto end, and fw represents a system focal length of said imaging zoom lens system at the wide angle end.

BRIEF DESCRIPTION OF THE DRAWINGS

Other features and advantages of the disclosure will become apparent in the following detailed description of the embodiments with reference to the accompanying drawings, of which:

FIG. 3 shows values of some optical data corresponding to the imaging zoom lens system of the first embodiment;

FIG. 4 shows values of some conic constants and aspherical coefficients corresponding to the imaging zoom lens system of the first embodiment;

FIGS. 5(A) to 5(D) show different optical characteristics of the imaging zoom lens system of the first embodiment at the wide angle end;

FIGS. 5(E) to 5(H) show different optical characteristics of the imaging zoom lens system of the first embodiment at an intermediate position between the wide angle and telephoto ends;

FIGS. 5(I) to 5(L) show different optical characteristics of the imaging zoom lens system of the first embodiment at the telephoto end;

FIGS. 6(A) to 6(D) show different optical characteristics of the imaging zoom lens system of the first embodiment focusing at a distance of 20 cm at the wide angle end;

FIGS. 6(E) to 6(H) show different optical characteristics of the imaging zoom lens system of the first embodiment focusing at a distance of 20 cm at the telephoto end;

FIG. 9 shows values of some optical data corresponding to the imaging zoom lens system of the second embodiment;

FIG. 10 shows values of some conic constants and aspherical coefficients corresponding to the imaging zoom lens system of the second embodiment;

FIGS. 11(A) to 11(D) show different optical characteristics of the imaging zoom lens system of the second embodiment at the wide angle end;

FIGS. 11(I) to 11(L) show different optical characteristics of the imaging zoom lens system of the second embodiment at the telephoto end;

FIGS. 12(A) to 12(D) show different optical characteristics of the imaging zoom lens system of the second embodiment focusing at a distance of 20 cm at the wide angle end;

FIGS. 12(E) to 12(H) show different optical characteristics of the imaging zoom lens system of the second embodiment focusing at a distance of 20 cm at the telephoto end;

FIG. 15 shows values of some optical data corresponding to the imaging zoom lens system of the third embodiment;

FIG. 16 shows values of some conic constants and aspherical coefficients corresponding to the imaging zoom lens system of the third embodiment;

FIGS. 17(A) to 17(D) show different optical characteristics of the imaging zoom lens system of the third embodiment at the wide angle end;

FIGS. 17(E) to 17(H) show different optical characteristics of the imaging zoom lens system of the third embodiment at an intermediate position between the wide angle and telephoto ends;

FIGS. 17(I) to 17(L) show different optical characteristics of the imaging zoom lens system of the third embodiment at the telephoto end;

FIGS. 18(A) to 18(D) show different optical characteristics of the imaging zoom lens system of the third embodiment focusing at a distance of 20 cm at the wide angle end;

FIGS. 18(E) to 18(H) show different optical characteristics of the imaging zoom lens system of the third embodiment focusing at a distance of 20 cm at the telephoto end;

FIG. 21 shows values of some optical data corresponding to the imaging zoom lens system of the fourth embodiment;

FIG. 22 shows values of some conic constants and aspherical coefficients corresponding to the imaging zoom lens system of the fourth embodiment;

FIGS. 23(A) to 23(D) show different optical characteristics of the imaging zoom lens system of the fourth embodiment at the wide angle end;

FIGS. 23(E) to 23(H) show different optical characteristics of the imaging zoom lens system of the fourth embodiment at an intermediate position between the wide angle and telephoto ends;

FIGS. 23(I) to 23(L) show different optical characteristics of the imaging zoom lens system of the fourth embodiment at the telephoto end;

FIGS. 24(A) to 24(D) show different optical characteristics of the imaging zoom lens system of the fourth embodiment focusing at a distance of 20 cm at the wide angle end;

FIGS. 24(E) to 24(H) show different optical characteristics of the imaging zoom lens system of the fourth embodiment focusing at a distance of 20 cm at the telephoto end;

FIG. 27 shows values of some optical data corresponding to the imaging zoom lens system of the fifth embodiment;

FIG. 28 shows values of some conic constants and aspherical coefficients corresponding to the imaging zoom lens system of the fifth embodiment;

FIGS. 29(A) to 29(D) show different optical characteristics of the imaging zoom lens system of the fifth embodiment at the wide angle end;

FIGS. 29(E) to 29(H) show different optical characteristics of the imaging zoom lens system of the fifth embodiment at an intermediate position between the wide angle and telephoto ends;

FIGS. 29(I) to 29(L) show different optical characteristics of the imaging zoom lens system of the fifth embodiment at the telephoto end;

FIGS. 30(A) to 30(D) show different optical characteristics of the imaging zoom lens system of the fifth embodiment focusing at a distance of 20 cm at the wide angle end;

FIGS. 30(E) to 30(H) show different optical characteristics of the imaging zoom lens system of the fifth embodiment focusing at a distance of 20 cm at the telephoto end;

FIG. 33 shows values of some optical data corresponding to the imaging zoom lens system of the sixth embodiment;

FIG. 34 shows values of some conic constants and aspherical coefficients corresponding to the imaging zoom lens system of the sixth embodiment;

FIGS. 35(A) to 35(D) show different optical characteristics of the imaging zoom lens system of the sixth embodiment at the wide angle end;

FIGS. 35(E) to 35(H) show different optical characteristics of the imaging zoom lens system of the sixth embodiment at an intermediate position between the wide angle and telephoto ends;

FIGS. 35(I) to 35(L) show different optical characteristics of the imaging zoom lens system of the sixth embodiment at the telephoto end;

FIGS. 36(A) to 36(D) show different optical characteristics of the imaging zoom lens system of the sixth embodiment focusing at a distance of 20 cm at the wide angle end;

FIG. 39 shows values of some optical data corresponding to the imaging zoom lens system of the seventh embodiment;

FIG. 40 shows values of some conic constants and aspherical coefficients corresponding to the imaging zoom lens system of the seventh embodiment;

FIGS. 41(A) to 41(D) show different optical characteristics of the imaging zoom lens system of the seventh embodiment at the wide angle end;

FIGS. 41(E) to 41(H) show different optical characteristics of the imaging zoom lens system of the seventh embodiment at an intermediate position between the wide angle and telephoto ends;

FIGS. 41(I) to 41(L) show different optical characteristics of the imaging zoom lens system of the seventh embodiment at the telephoto end;

FIGS. 42(A) to 42(D) show different optical characteristics of the imaging zoom lens system of the seventh embodiment focusing at a distance of 20 cm at the wide angle end;

FIGS. 42(E) to 42(H) show different optical characteristics of the imaging zoom lens system of the seventh embodiment focusing at a distance of 20 cm at the telephoto end; and FIG. 43 is a table that lists values of relationships among some lens parameters corresponding to the imaging lenses system of the first to seventh embodiments.

DETAILED DESCRIPTION

Figure 1:
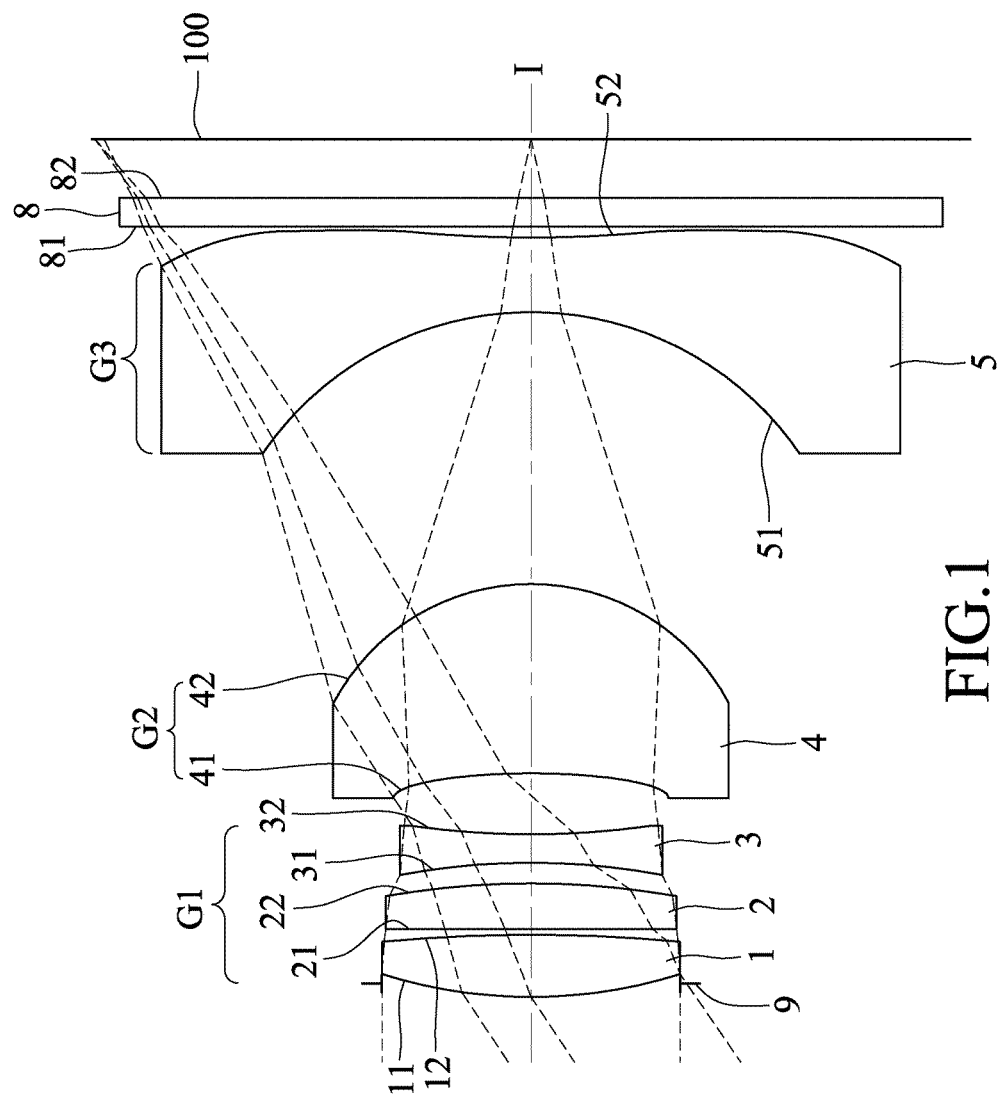
FIG. 1 is a schematic diagram that illustrates an imaging zoom lens system of a first embodiment according to the disclosure at a wide angle end.

Before the disclosure is described in greater detail, it should be noted that like elements are denoted by the same reference numerals throughout the disclosure.

Figure 2:
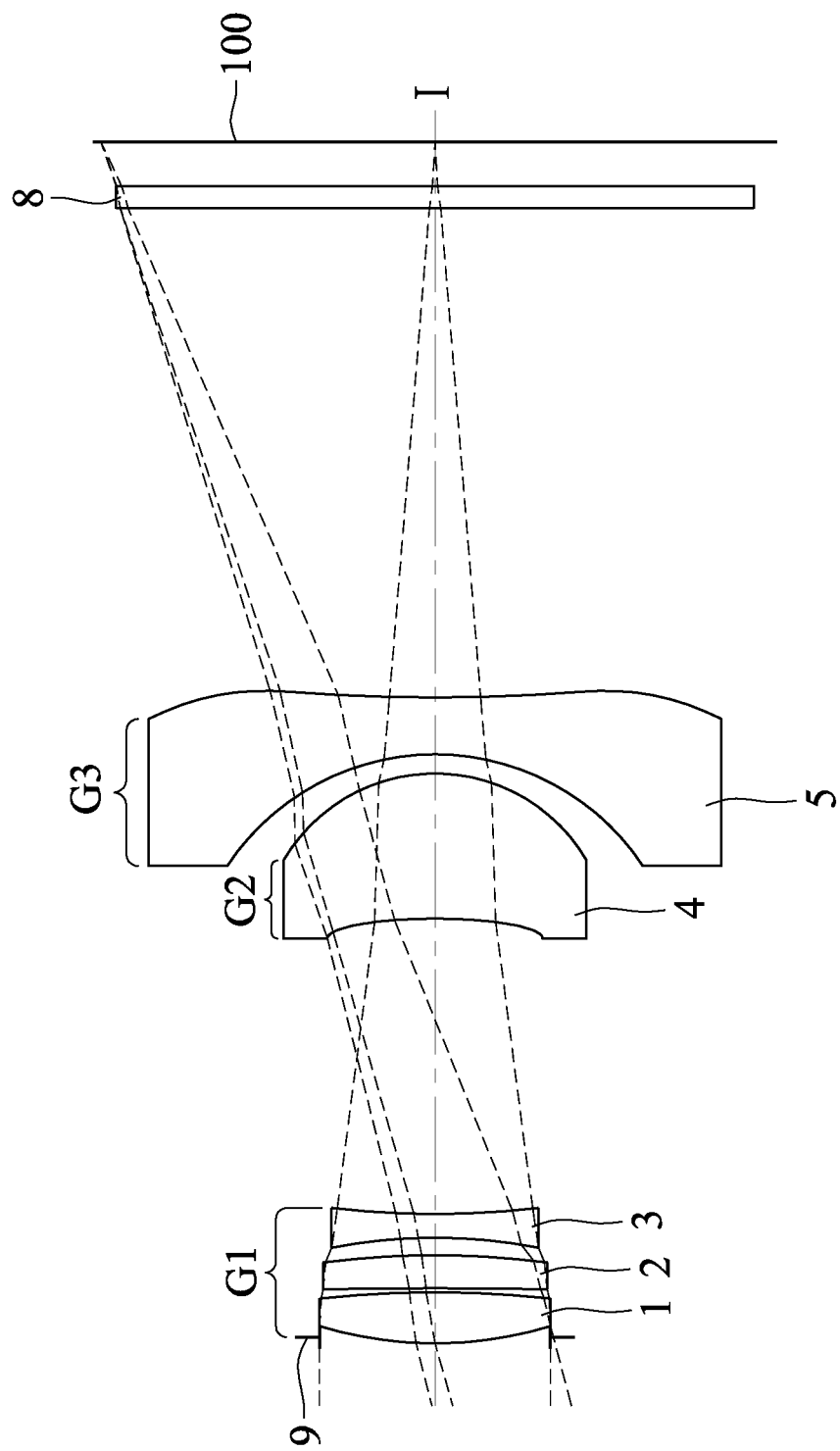
FIG. 2 is a schematic diagram that illustrates the imaging zoom lens system of the first embodiment at a telephoto end.

FIGS. 1 and 2 illustrate an imaging zoom lens system of a first embodiment according to the present disclosure at a wide angle end and a telephoto end, respectively. The imaging zoom lens system includes a first lens group (G1) having a positive effective focal length, a second lens group (G2) having a positive effective focal length, a third lens group (G3) having a negative effective focal length, and an optical filter 8. The first to third lens groups (G1-G3) and the optical filter 8 are arranged in sequence from an object side to an image side along an optical axis (I) of the imaging zoom lens system. The optical filter 8 is an infrared cut filter for selectively absorbing infrared light to thereby reduce imperfection of images formed at an image plane 100 of the imaging zoom lens system. In further detail, the object side refers to the side of an object to be photographed, and the image side refers to the side of the image plane 100.

During zooming of the imaging zoom lens system from the wide angle end to the telephoto end, along the optical axis (I), a distance between the first and second lens groups (G1, G2) is increased, a distance between the second and third lens groups (G2, G3) is decreased, and a distance between the third lens group (G3) and the optical filter 8 is increased. Because each of the first, second and third lens groups (G1-G3) is movable along the optical axis (I) during zooming, the movement of the first, second and third lens groups (G1-G3) may be reduced, thereby shortening time for zooming operation.

In this embodiment, the imaging zoom lens system has a close-up photographing distance of 20 cm between a photographed object and the first lens group (G1), a system focal length (ft) of 12.9875 mm at the telephoto end, and a system focal length (fw) of 4.9558 mm at the wide angle end. When the imaging zoom lens system performs focusing, the first and second lens groups (G1, G2) are permitted to move in synchronization with each other (i.e., moving with a constant distance therebetween in a same direction) along the optical axis (I), and the third lens group (G3) is stationary. Specifically, when the imaging zoom lens system performs focusing from infinity to the close-up photographing distance at the telephoto end, a focusing range (ΔT) of travel of the first and second lens groups (G1, G2) along the optical axis (I) is 0.129 mm. When the imaging zoom lens system performs focusing from infinity to the close-up photographing distance at a wide angle end, a focusing range (ΔW) of travel of the first and second lens groups (G1, G2) along the optical axis (I) is 0.079 mm.

The first lens group (G1) has an aperture stop 9 and includes first, second and third lens elements 1-3. The second lens group (G2) includes a fourth lens element 4. The third lens element (G3) includes a fifth lens element 5. The aperture stop 9 and the first to fifth lens elements 1-5 are arranged in sequence from the object side to the image side along the optical axis (I). Each of the first, second, third, fourth and fifth lens elements 1-5 and the optical filter 8 has an object-side surface 11, 21, 31, 41, 51, 81 facing toward the object side, and an image-side surface 12, 22, 32, 42, 52, 82 facing toward the image side. Light entering the imaging zoom lens system travels through the aperture stop 9, the object-side and image-side surfaces 11, 12 of the first lens element 1, the object-side and image-side surfaces 21, 22 of the second lens element 2, the object-side and image-side surfaces 31, 32 of the third lens element 3, the object-side and image-side surfaces 41, 42 of the fourth lens element 4, the object-side and image-side surfaces 51, 52 of the fifth lens element 5, and the object-side and image-side surfaces 81, 82 of the optical filter 8 sequentially to form an image on the image plane 100. Each of the object-side surfaces 11, 21, 31, 41, 51 and the image-side surfaces 12, 22, 32, 42, 52 is aspherical and has a center point coinciding with the optical axis (I).

Each of the lens elements 1-5 is made of a plastic material in order to be lightweight. However, at least one of the lens elements 1-5 may be made of other materials in other embodiments.

The first lens element 1 has a positive refractive power, and the object-side and image-side surfaces 11, 12 of the first lens element 1 are convex surfaces respectively convex relative to the object and image sides. The second lens element 2 has a positive refractive power, and the object-side and image-side surfaces 21, 22 of the second lens element 2 are convex surfaces respectively convex relative to the object and image sides. The third lens element 3 has a negative refractive power, and the object-side and image-side surfaces 31, 32 of the third lens element 3 are concave surfaces respectively concave relative to the object and image sides. The fourth lens element 4 has a positive refractive power. The object-side surface 41 of the fourth lens element 4 is a concave surface concave relative to the object side, and the image-side surface 42 of the fourth lens element 4 is a convex surface convex relative to the image side. The fifth lens element 5 has a negative refractive power, and the object-side and image-side surfaces 51, 52 of the fifth lens element 5 are concave surfaces respectively concave relative to the object and image sides. In this embodiment, the imaging zoom lens system does not include any lens element with a refractive power other than the first lens element 1, the second lens element 2, the third lens element 3, the fourth lens element 4 and the fifth lens element 5.

Shown in FIG. 3 is a table of the first embodiment that lists values of some optical data corresponding to the surfaces 11-51 and 81, 12-52 and 82 of the first to fifth lens elements 1-5 and the optical filter 8 when the imaging zoom lens system is at the wide angle end, an intermediate position between the wide angle and telephoto ends, or the telephoto end.

In this embodiment, each of the object-side surfaces 11-51 and the image-side surfaces 12-52 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} A_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $A_{2i}$ represents a $2i^{th}$ aspherical coefficient.

Shown in FIG. 4 is a table that lists values of some conic constants and aspherical coefficients of the aforementioned relationship (1) corresponding to the first embodiment.

FIGS. 5(A) to 5(D) show simulation results of the imaging zoom lens system at the wide angle end respectively corresponding to longitudinal spherical aberration, sagittal astigmatism aberration, tangential astigmatism aberration, and distortion aberration of the first embodiment. FIGS. 5(E) to 5(H) show simulation results of the imaging zoom lens system at the intermediate position respectively corresponding to longitudinal spherical aberration, sagittal astigmatism aberration, tangential astigmatism aberration, and distortion aberration of the first embodiment. FIGS. 5(I) to 5(L) show simulation results of the imaging zoom lens system at the telephoto end respectively corresponding to longitudinal spherical aberration, sagittal astigmatism aberration, tangential astigmatism aberration, and distortion aberration of the first embodiment. FIGS. 6(A) to 6(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the first embodiment. FIGS. 6(E) to 6(H) show simulation results of the imaging zoom lens system focusing at focusing at a distance of 20 cm at the telephoto end, respectively corresponding to longitudinal spherical aberration, sagittal astigmatism aberration, tangential astigmatism aberration, and distortion aberration of the first embodiment. It can be understood from FIGS. 5(A), 5(E), 5(I), 6(A) and 6(E) that, since variation of each of spherical curves falls within the range of ±0.25 mm, the first embodiment is able to achieve a relatively low spherical aberration at different wavelengths. Furthermore, since the curves at each of wavelengths of 486 nm, 587 nm, and 656 nm are close to each other, the first embodiment has a relatively low chromatic aberration.

It can be understood from FIGS. 5(B), 5(C), 5(F), 5(G), 5(J), 5(K) 6(B), 6(C), 6(F), and 6(G) that, since each of astigmatic field curves falls within the range of ±0.5 mm, the first embodiment has relatively low sagittal and tangential astigmatism aberrations.

Moreover, as shown in FIGS. 5(D), 5(H), 5(L), 6(D) and 6(H), since each of distortion curves falls within the range of ±2%, the first embodiment is able to meet requirements in imaging quality of most optical systems.

Figure 7:
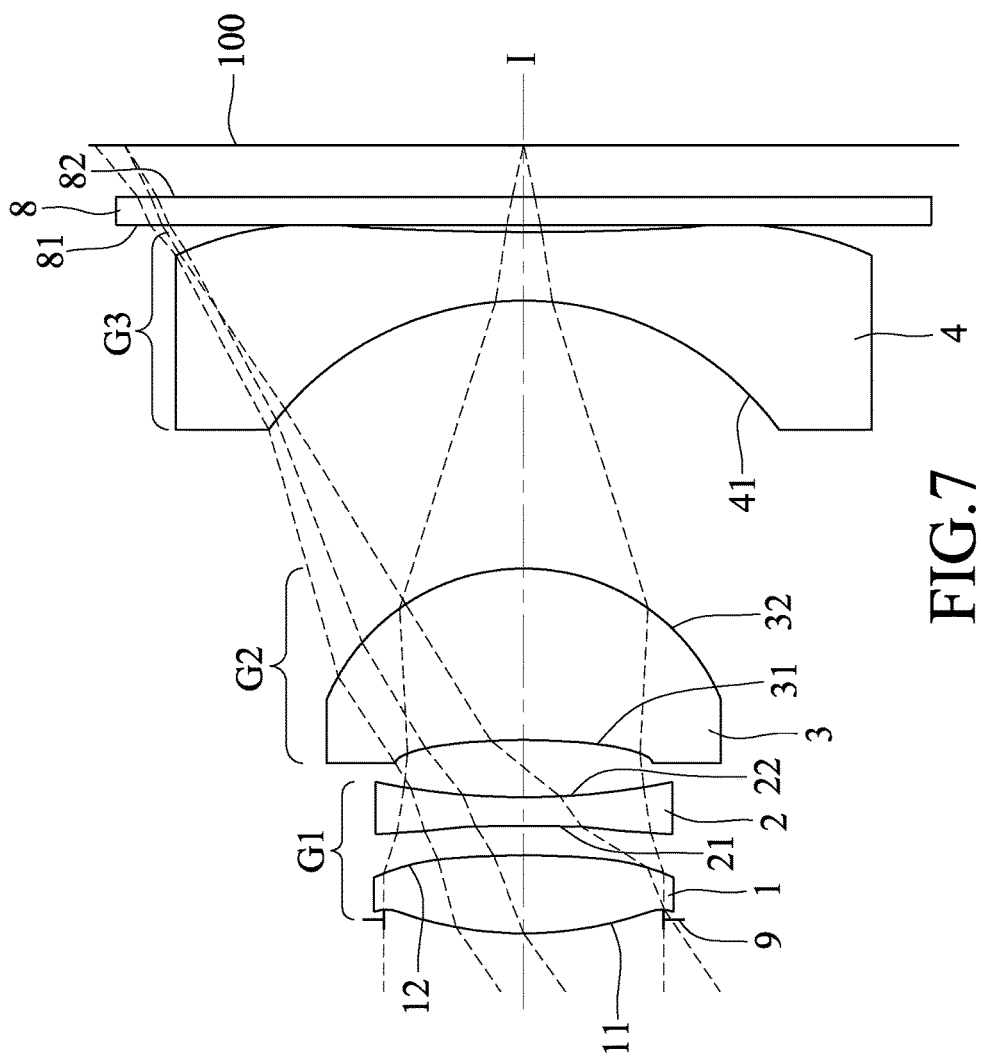
FIG. 7 is a schematic diagram that illustrates an imaging zoom lens system of a second embodiment according to the disclosure at a wide angle end.
Figure 8:
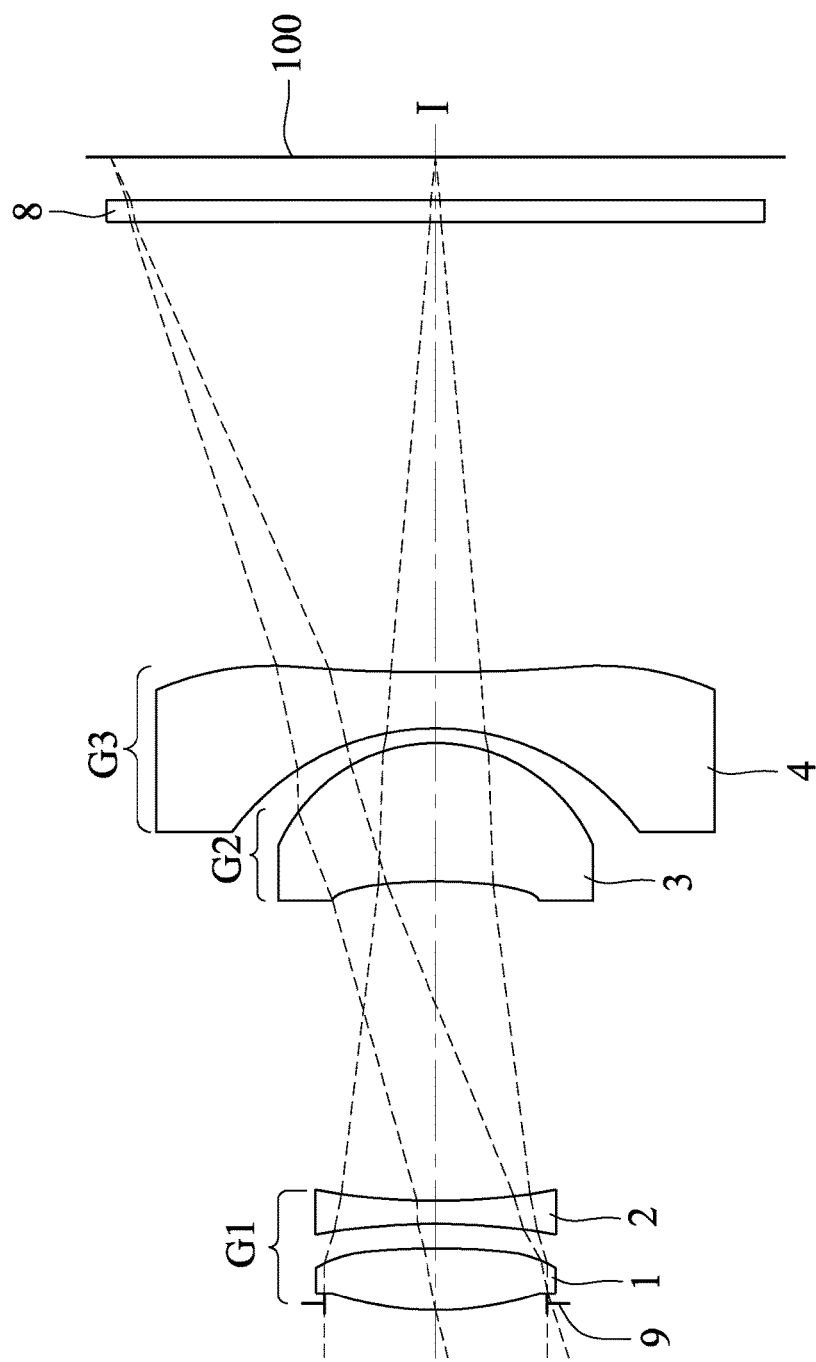
FIG. 8 is a schematic diagram that illustrates the imaging zoom lens system of the second embodiment at a telephoto end.
Figures 11E, 11F, 11G, 11H:
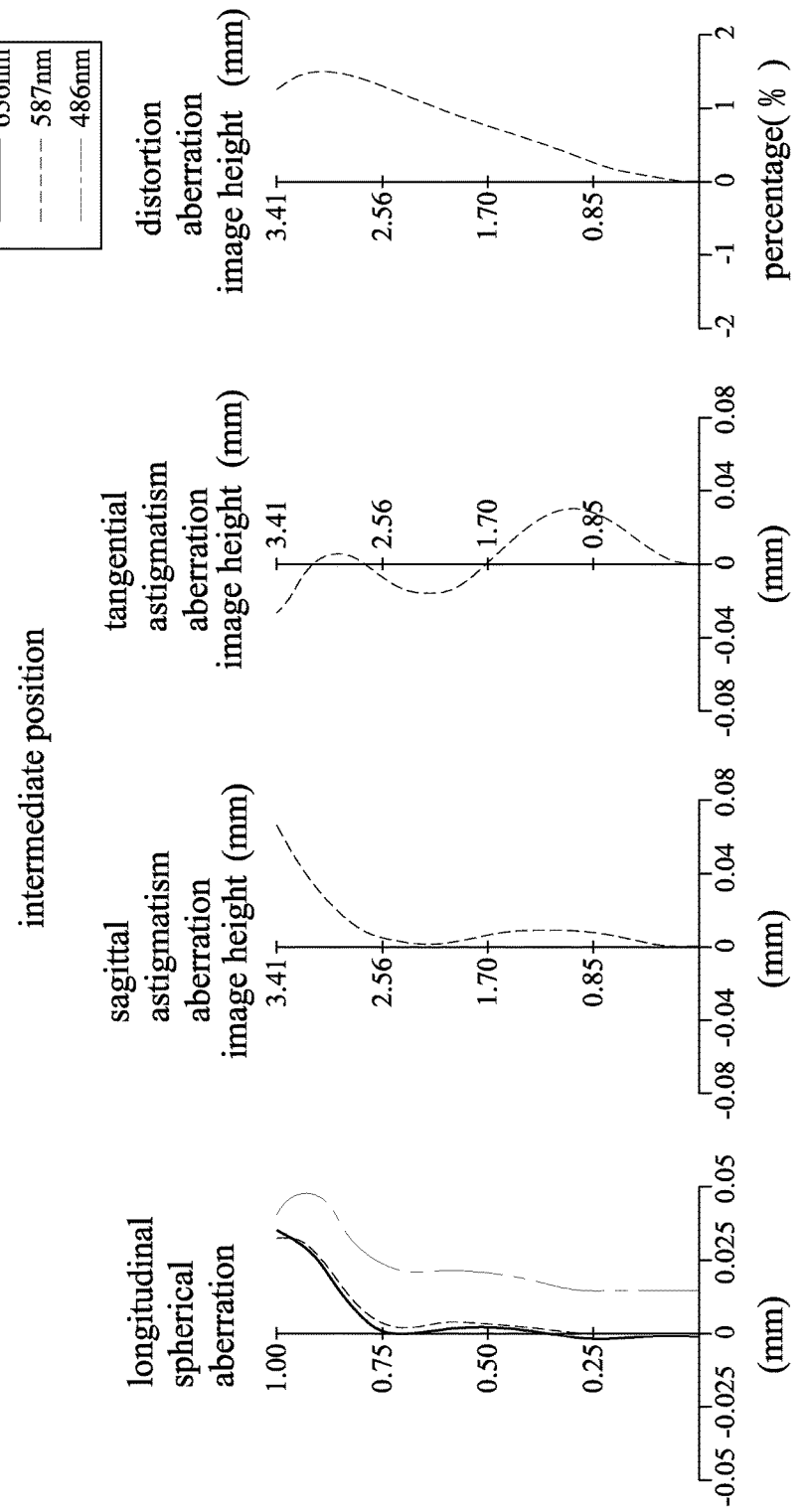
FIGS. 11(E) to 11(H) show different optical characteristics of the imaging zoom lens system of the second embodiment at an intermediate position between the wide angle and telephoto ends.

FIGS. 7 and 8 illustrate an imaging zoom lens system of a second embodiment according to the present disclosure at a wide angle end and a telephoto end, respectively. The second embodiment has a configuration similar to that of the first embodiment, but differs from the first embodiment in some of the quantity, the optical data, the aspherical coefficients and the lens parameters of the lens elements of the lens groups (G1-G3). Furthermore, in the second embodiment, the imaging zoom lens system has a system focal length (ft) of 13.0122 mm at the telephoto end, and a system focal length (fw) of 4.9883 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.142 mm. When the imaging zoom lens system performs focusing from infinity to the close-up photographing distance at the wide angle end, a focusing range (ΔW) of travel of the first and second lens groups (G1, G2) along the optical axis (I) is 0.082 mm. The first lens group (G1) has an aperture stop 9 and includes first and second lens elements 1-2. The second lens group (G2) includes a third lens element 3. The third lens group (G3) includes a fourth lens element 4. The aperture stop 9 and the first to fourth lens elements 1-4 are arranged in sequence from the object side to the image side along the optical axis (I).

The first lens element 1 provides a positive refractive power, and has object-side and image-side surfaces 11, 12 that are convex surfaces respectively convex relative to the object and image sides. The second lens element 2 provides a negative refractive power, and has object-side and image-side surfaces 21, that are concave surfaces respectively concave relative to the object and image sides. The third lens element 3 provides a positive refractive power, and has an object-side surface 31 that is a concave surface concave relative to the object side, and an image-side surface 32 that is a convex surface convex relative to the image side. The fourth lens element 4 provides a negative refractive power, and has object-side and image-side surfaces 41, 42 that are concave surfaces respectively concave relative to the object and image sides. In this embodiment, each of the object-side surfaces 11, 21, 31, 41 and the image-side surfaces 12, 22, 32, 42 is aspherical and has a center point coinciding with the optical axis (I), and the imaging zoom lens system does not include any lens element with a refractive power other than the first lens element 1, the second lens element 2, the third lens element 3 and the fourth lens element 4.

Shown in FIG. 9 is a table of the second embodiment that lists values of some optical data corresponding to the surfaces 11-41 and 81, 12-42 and 82 of the first to fourth lens elements 1-4 and the optical filter 8 when the imaging zoom lens system is at the wide angle end, an intermediate position between the wide angle and telephoto ends, or the telephoto end.

Shown in FIG. 10 is a table that lists values of some conic constants and aspherical coefficients of the aforementioned relationship (1) corresponding to the second embodiment.

FIGS. 11(A) to 11(D) show simulation results of the imaging zoom lens system at the wide angle end respectively corresponding to longitudinal spherical aberration, sagittal astigmatism aberration, tangential astigmatism aberration, and distortion aberration of the second embodiment. FIGS. 11(E) to 11(H) show simulation results of the imaging zoom lens system at the intermediate position respectively corresponding to longitudinal spherical aberration, sagittal astigmatism aberration, tangential astigmatism aberration, and distortion aberration of the second embodiment. FIGS. 11(I) to 11(L) show simulation results of the imaging zoom lens system at the telephoto end respectively corresponding to longitudinal spherical aberration, sagittal astigmatism aberration, tangential astigmatism aberration, and distortion aberration of the second embodiment. FIGS. 12(A) to 12(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the second embodiment. FIGS. 12(E) to 12(H) show simulation results of the imaging zoom lens system focusing at a distance of 20 cm at the telephoto end, respectively corresponding to longitudinal spherical aberration, sagittal astigmatism aberration, tangential astigmatism aberration, and distortion aberration of the second embodiment. It can be understood from FIGS. 11 (A) to 11 (L) and 12(A) to 12(H) that the second embodiment is able to achieve a relatively good optical performance.

Figure 13:
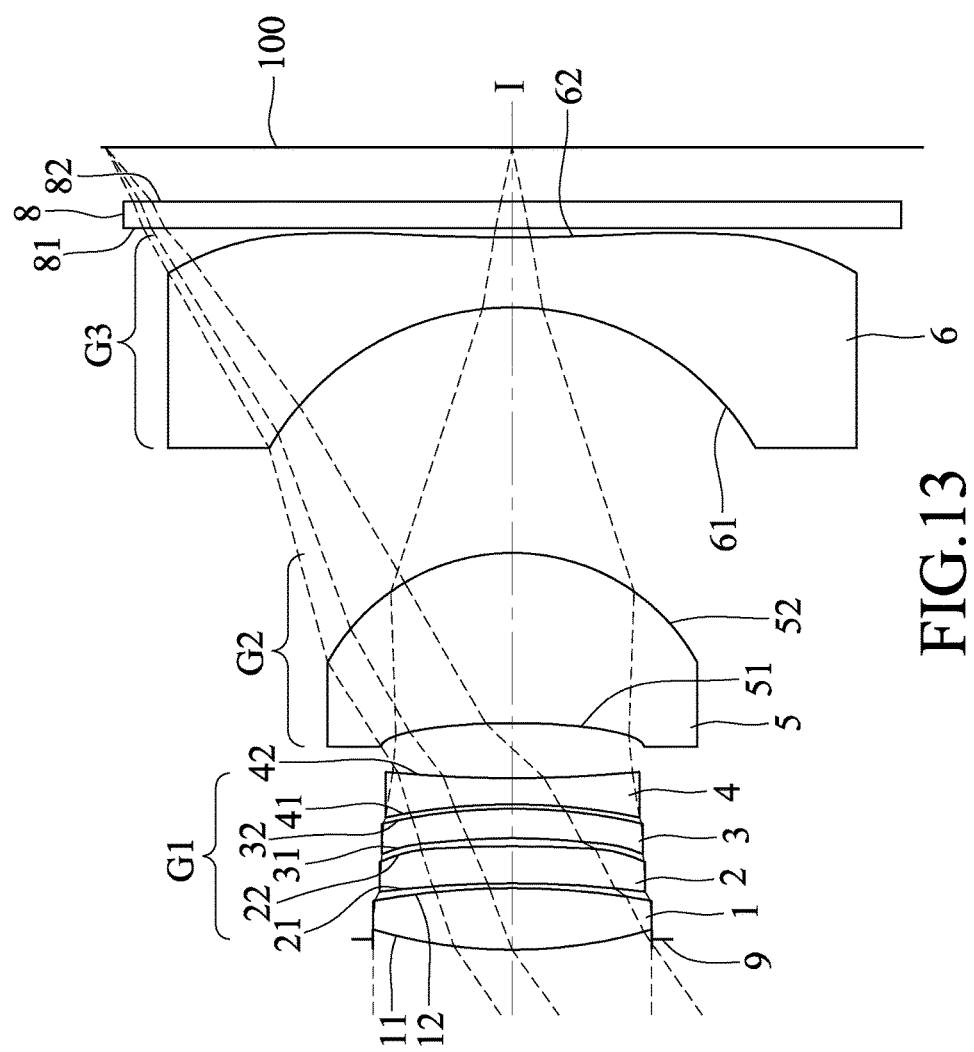
FIG. 13 is a schematic diagram that illustrates an imaging zoom lens system of a third embodiment according to the disclosure at a wide angle end.
Figure 14:
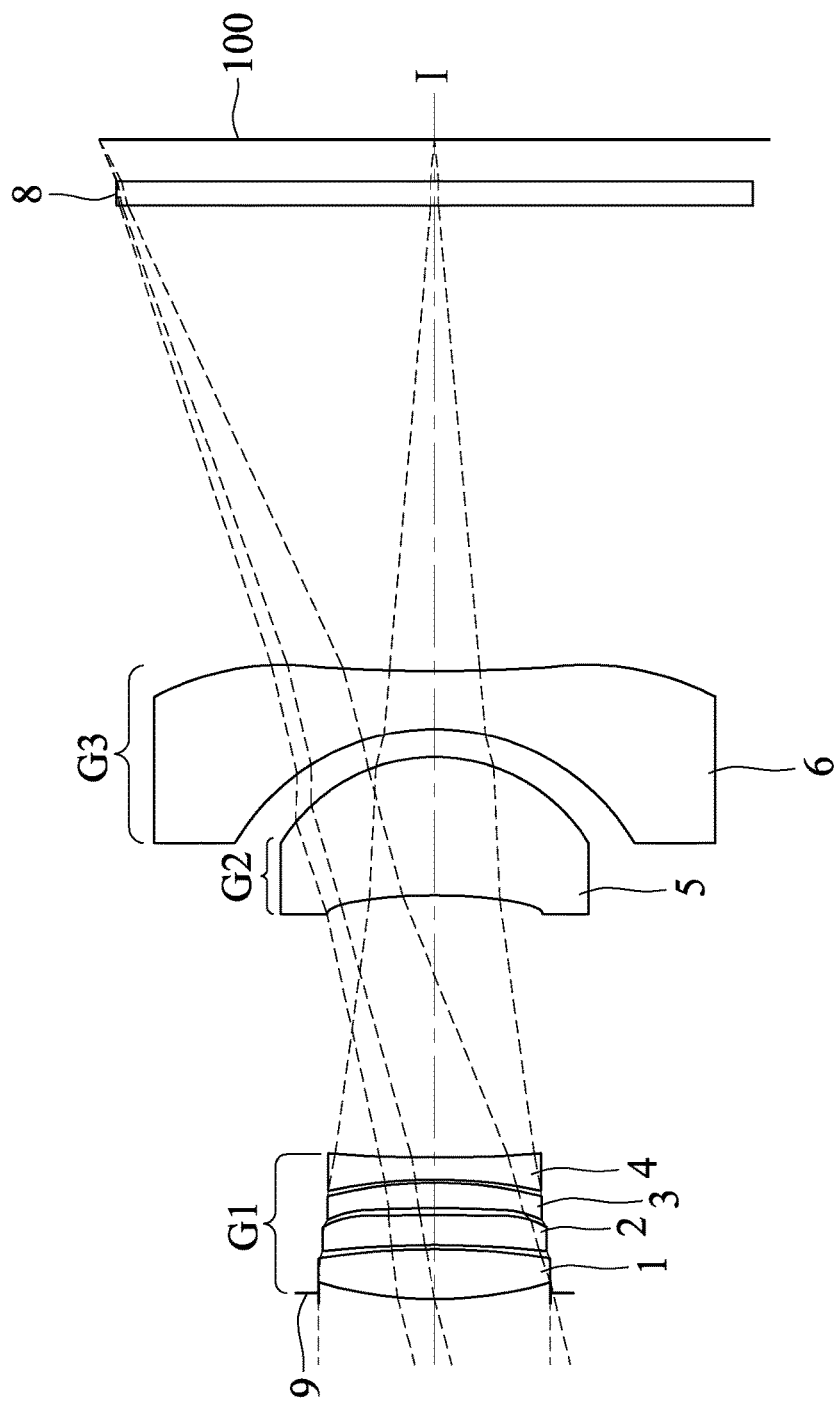
FIG. 14 is a schematic diagram that illustrates the imaging zoom lens system of the third embodiment at a telephoto end.

FIGS. 13 and 14 illustrate an imaging zoom lens system of a third embodiment according to the present disclosure at a wide angle end and a telephoto end, respectively. The third embodiment has a configuration similar to that of the first embodiment, but differs from the first embodiment in some of the quantity, the optical data, the aspherical coefficients and the lens parameters of the lens elements of the lens groups (G1-G3). Furthermore, in the third embodiment, the imaging zoom lens system has a system focal length (ft) of 12.9785 mm at the telephoto end and a system focal length (fw) of 4.9402 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.113 mm. When the imaging zoom lens system performs focusing from infinity to the close-up photographing distance at the wide angle end, a focusing range (ΔW) of travel of the first and second lens groups (G1, G2) along the optical axis (I) is 0.075 mm. The first lens group (G1) has an aperture stop 9 and includes first, second, third and fourth lens elements 1-4. The second lens group (G2) includes a fifth lens element 5. The third lens group (G3) includes a sixth lens element 6. The aperture stop 9 and the first to sixth lens elements 1-6 are arranged in sequence from the object side to the image side along the optical axis (I).

The first lens element 1 provides a positive refractive power, and has object-side and image-side surfaces 11, 12 that are convex surfaces respectively convex relative to the object and image sides. The second lens element 2 provides a negative refractive power, and has object-side and image-side surfaces 21, 22 that are concave surfaces respectively concave relative to the object and image sides. The third lens element 3 provides a positive refractive power, and has object-side and image-side surfaces 31, 32 that are convex surfaces respectively convex relative to the object and image sides. The fourth lens element 4 provides a negative refractive power, and has object-side and image-side surfaces 41, 42 that are concave surfaces respectively concave relative to the object and image sides. The fifth lens element 5 provides a positive refractive power, and has an object-side surface 51 that is a concave surface concave relative to the object side, and an image-side surface 52 that is a convex surface convex relative to the image side. The sixth lens element 6 provides a negative refractive power, and has object-side and image-side surfaces 61, 62 that are concave surfaces respectively concave relative to the object and image sides. In this embodiment, each of the object-side surfaces 11, 21, 31, 41, 51, 61 and the image-side surfaces 12, 22, 32, 42, 52, 62 is aspherical and has a center point coinciding with the optical axis (I), and the imaging zoom lens system does not include any lens element with a refractive power other than the first lens element 1, the second lens element 2, the third lens element 3, the fourth lens element 4, the fifth lens element 5 and the sixth lens element 6.

Shown in FIG. 15 is a table of the third embodiment that lists values of some optical data corresponding to the surfaces 11-61 and 81, 12-62 and 82 of the first to sixth lens elements 1-6 and the optical filter 8 when the imaging zoom lens system is at the wide angle end, an intermediate position between the wide angle and telephoto ends, or the telephoto end.

Shown in FIG. 16 is a table that lists values of some conic constants and aspherical coefficients of the aforementioned relationship (1) corresponding to the third embodiment.

FIGS. 17(A) to 17(D) show simulation results of the imaging zoom lens system at the wide angle end respectively corresponding to longitudinal spherical aberration, sagittal astigmatism aberration, tangential astigmatism aberration, and distortion aberration of the third embodiment. FIGS. 17(E) to 17(H) show simulation results of the imaging zoom lens system at the intermediate position respectively corresponding to longitudinal spherical aberration, sagittal astigmatism aberration, tangential astigmatism aberration, and distortion aberration of the third embodiment. FIGS. 17(I) to 17(L) show simulation results of the imaging zoom lens system at the telephoto end respectively corresponding to longitudinal spherical aberration, sagittal astigmatism aberration, tangential astigmatism aberration, and distortion aberration of the third embodiment. FIGS. 18(A) to 18(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the third embodiment. FIGS. 18(E) to 18(H) show simulation results of the imaging zoom lens system focusing at a distance of 20 cm at the telephoto end, respectively corresponding to longitudinal spherical aberration, sagittal astigmatism aberration, tangential astigmatism aberration, and distortion aberration of the third embodiment. It can be understood from FIGS. 17(A) to 17(L) and 18(A) to 18(H) that the third embodiment is able to achieve a relatively good optical performance.

Figure 19:
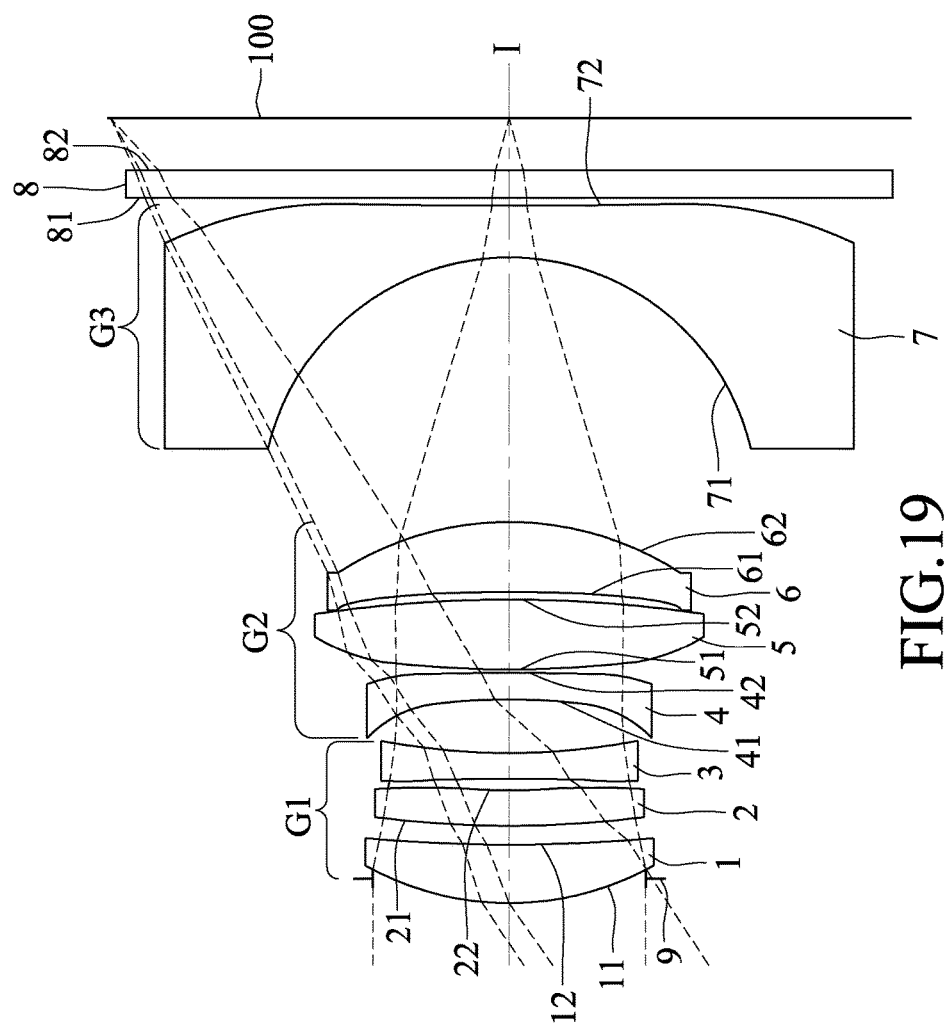
FIG. 19 is a schematic diagram that illustrates an imaging zoom lens system of a fourth embodiment according to the disclosure at a wide angle end.
Figure 20:
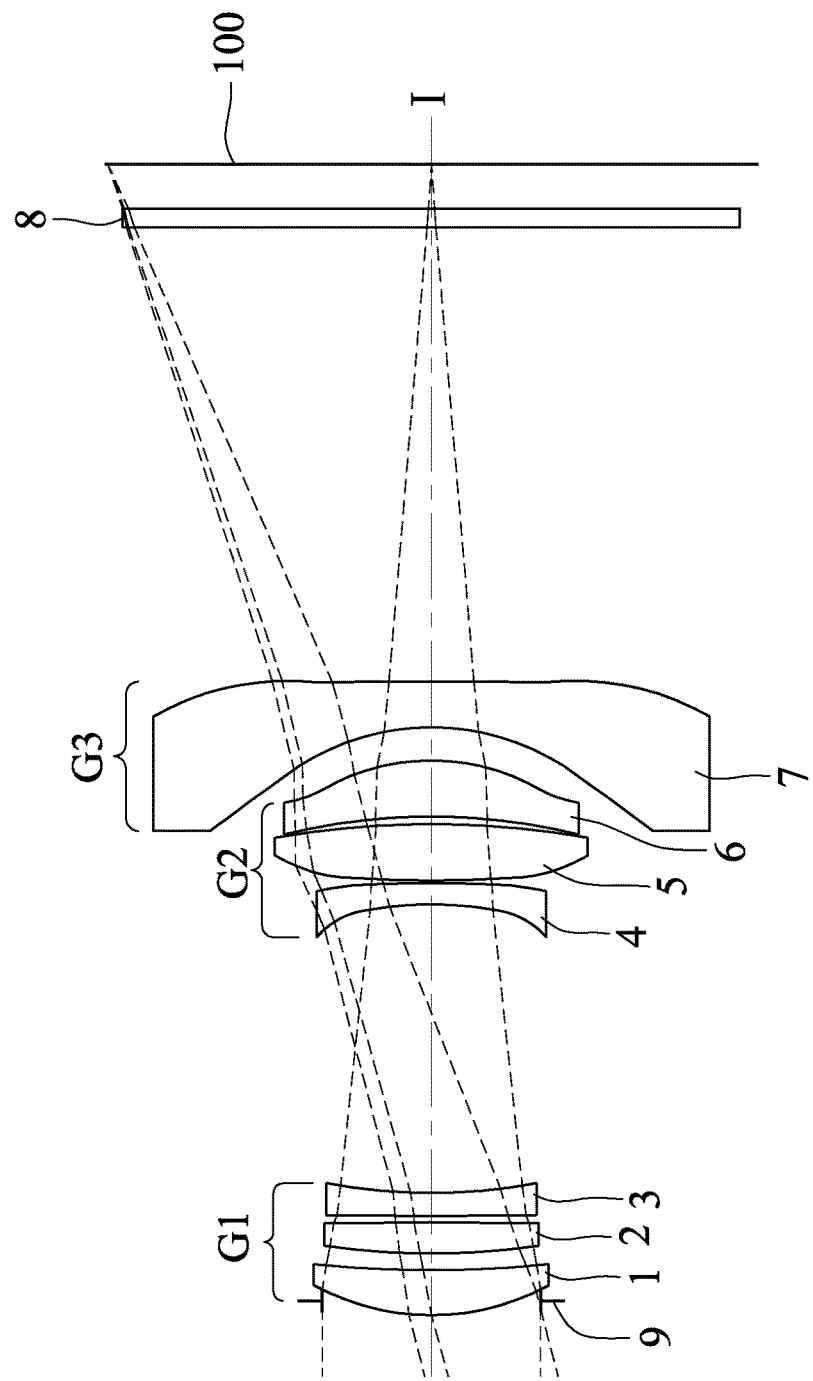
FIG. 20 is a schematic diagram that illustrates the imaging zoom lens system of the fourth embodiment at a telephoto end.

FIGS. 19 and 20 illustrate an imaging zoom lens system of a fourth embodiment according to the present disclosure at a wide angle end and a telephoto end, respectively. The fourth embodiment has a configuration similar to that of the first embodiment, but differs from the first embodiment in some of the quantity, the optical data, the aspherical coefficients and the lens parameters of the lens elements of the lens groups (G1-G3). Furthermore, in the fourth embodiment, the imaging zoom lens system has a system focal length (ft) of 12.5516 mm at the telephoto end and a system focal length (fw) of 4.8969 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.132 mm. When the imaging zoom lens system performs focusing from infinity to the close-up photographing distance at the wide angle end, a focusing range (ΔW) of travel of the first and second lens groups (G1, G2) along the optical axis (I) is 0.082 mm. The first lens group (G1) has an aperture stop 9 and includes first, second and third lens elements 1-3. The second lens group (G2) includes fourth, fifth and sixth lens elements 4-6. The third lens group (G3) includes a seventh lens element 7. The aperture stop 9 and the first to seventh lens elements 1-7 are arranged in sequence from the object side to the image side along the optical axis (I).

The first lens element 1 provides a positive refractive power, and has an object-side surface 11 that is a convex surface convex relative to the object side, and an image-side surface 12 that is a concave surface concave relative to the image side. The second lens element 2 provides a positive refractive power, and has an object-side surface 21 that is a convex surface convex relative to the object side, and an image-side surface 22 that is a concave surface concave relative to the image side. The third lens element 3 provides a negative refractive power, and has object-side and image-side surfaces 31, 32 that are concave surfaces respectively concave relative to the object and image sides. The fourth lens element 4 provides a negative refractive power, and has an object-side surface 41 that is a concave surface concave relative to the object side, and an image-side surface 42 that is a convex surface convex relative to the image side. The fifth lens element 5 provides a positive refractive power, and has object-side and image-side surfaces 51, 52 that are convex surfaces respectively convex relative to the object and image sides. The sixth lens element 6 provides a positive refractive power, and has an object-side surface 61 that is a concave surface concave relative to the object side, and an image-side surface 62 that is a convex surface convex relative to the image side. The seventh lens element 7 provides a negative refractive power, and has object-side and image-side surfaces 71, 72 that are concave surfaces respectively concave relative to the object and image sides. In this embodiment, each of the object-side surfaces 11, 21, 31, 41, 51, 61, 71 and the image-side surfaces 12, 22, 32, 42, 52, 62, 72 is aspherical and has a center point coinciding with the optical axis (I), and the imaging zoom lens system does not include any lens element with a refractive power other than the first lens element 1, the second lens element 2, the third lens element 3, the fourth lens element 4, the fifth lens element 5, the sixth lens element 6 and the seventh lens element 7.

Shown in FIG. 21 is a table of the fourth embodiment that lists values of some optical data corresponding to the surfaces 11-71 and 81, 12-72 and 82 of the first to seventh lens elements 1-7 and the optical filter 8 when the imaging zoom lens system is at the wide angle end, an intermediate position between the wide angle and telephoto ends, or the telephoto end.

Shown in FIG. 22 is a table that lists values of some conic constants and aspherical coefficients of the aforementioned relationship (1) corresponding to the fourth embodiment.

FIGS. 23(A) to 23(D) show simulation results of the imaging zoom lens system at the wide angle end respectively corresponding to longitudinal spherical aberration, sagittal astigmatism aberration, tangential astigmatism aberration, and distortion aberration of the fourth embodiment. FIGS. 23(E) to 23(H) show simulation results of the imaging zoom lens system at the intermediate position respectively corresponding to longitudinal spherical aberration, sagittal astigmatism aberration, tangential astigmatism aberration, and distortion aberration of the fourth embodiment. FIGS. 23(I) to 23(L) show simulation results of the imaging zoom lens system at the telephoto end respectively corresponding to longitudinal spherical aberration, sagittal astigmatism aberration, tangential astigmatism aberration, and distortion aberration of the fourth embodiment. FIGS. 24(A) to 24(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the fourth embodiment. FIGS. 24(E) to 24(H) show simulation results of the imaging zoom lens system focusing at a distance of 20 cm at the telephoto end, respectively corresponding to longitudinal spherical aberration, sagittal astigmatism aberration, tangential astigmatism aberration, and distortion aberration of the fourth embodiment. It can be understood from FIGS. 23 (A) to 23 (L) and 24 (A) to 24(H) that the fourth embodiment is able to achieve a relatively good optical performance.

Figure 25:
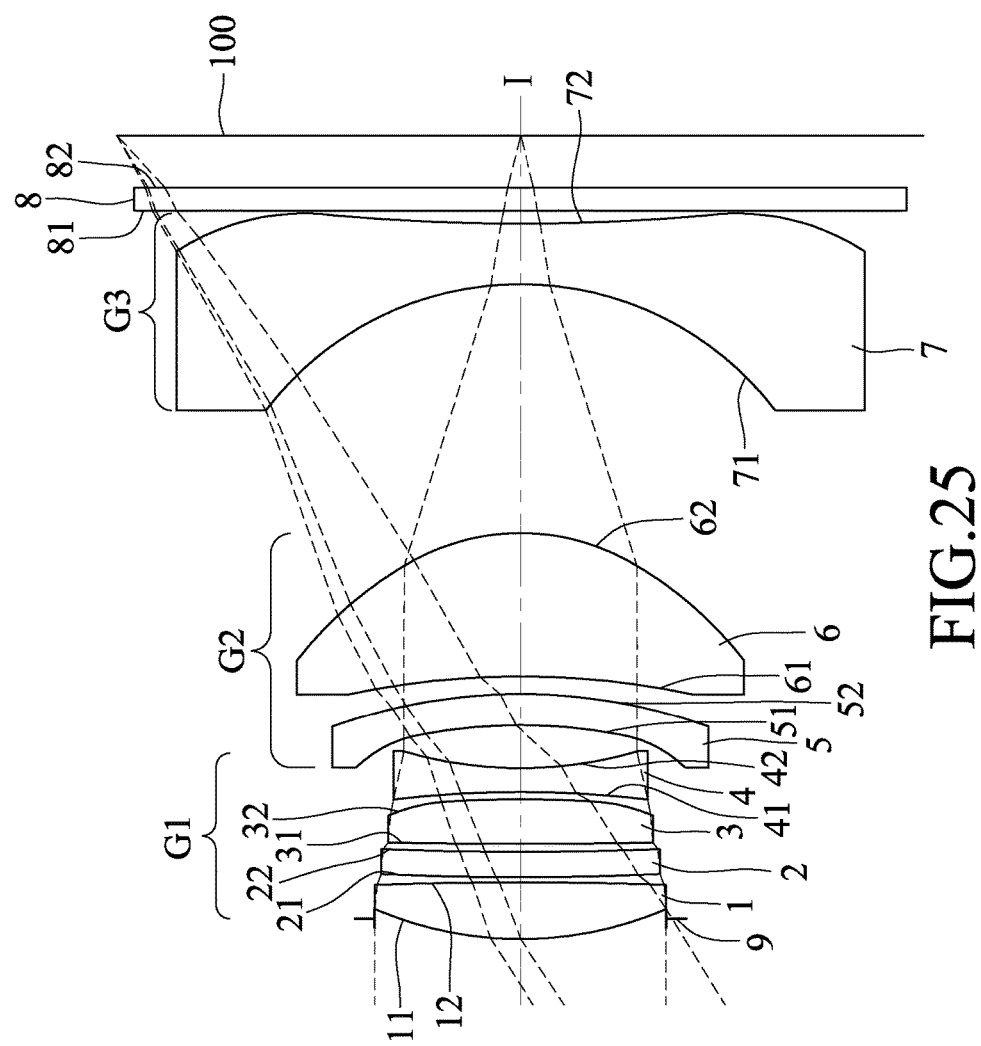
FIG. 25 is a schematic diagram that illustrates an imaging zoom lens system of a fifth embodiment according to the disclosure at a wide angle end.
Figure 26:
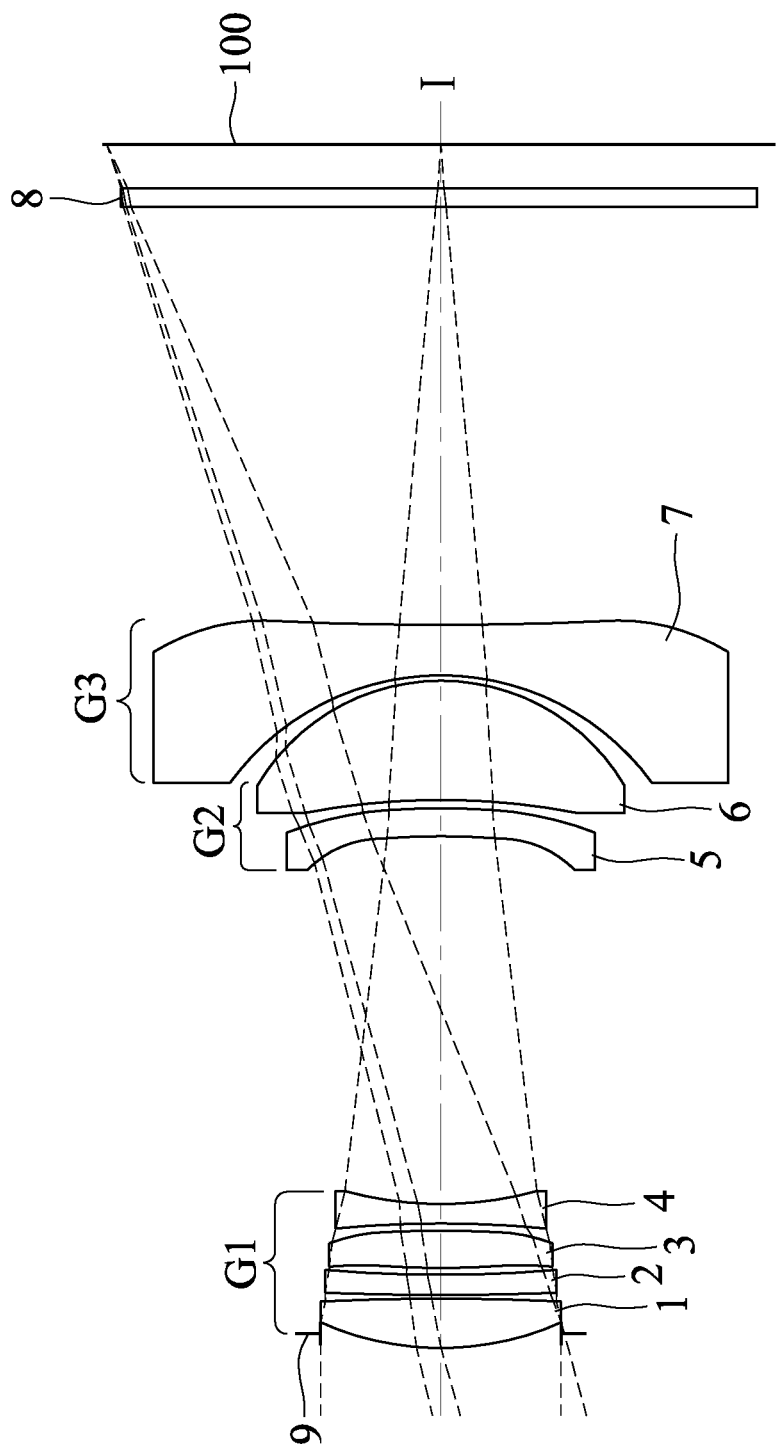
FIG. 26 is a schematic diagram that illustrates the imaging zoom lens system of the fifth embodiment at a telephoto end.

FIGS. 25 and 26 illustrate an imaging zoom lens system of a fifth embodiment according to the present disclosure at a wide angle end and a telephoto end, respectively. The fifth embodiment has a configuration similar to that of the first embodiment, but differs from the first embodiment in some of the quantity, the optical data, the aspherical coefficients and the lens parameters of the lens elements of the lens groups (G1-G3). Furthermore, in the fifth embodiment, the imaging zoom lens system has a system focal length (ft) of 15.7905 mm at the telephoto end and a system focal length (fw) of 5.8311 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.221 mm. When the imaging zoom lens system performs focusing from infinity to the close-up photographing distance at the wide angle end, a focusing range (ΔW) of travel of the first and second lens groups (G1, G2) along the optical axis (I) is 0.115 mm. The first lens group (G1) has an aperture stop 9 and includes first, second, third and fourth lens elements 1-4. The second lens group (G2) includes fifth and sixth lens elements 5, 6. The third lens group (G3) includes a seventh lens element 7. The aperture stop 9 and the first to seventh lens elements 1-7 are arranged in sequence from the object side to the image side along the optical axis (I).

The first lens element 1 provides a positive refractive power, and has object-side and image-side surfaces 11, 12 that are convex surfaces respectively convex relative to the object and image sides. The second lens element 2 provides a negative refractive power, and has object-side and image-side surfaces 21, that are concave surfaces respectively concave relative to the object and image sides. The third lens element 3 provides a positive refractive power, and has object-side and image-side surfaces 31, 32 that are convex surfaces respectively convex relative to the object and image sides. The fourth lens element 4 provides a negative refractive power, and has object-side and image surfaces 41, 42 that are concave surfaces respectively concave relative to the object and image sides. The fifth lens element 5 provides a positive refractive power, and has an object-side surface 51 that is a concave surface concave relative to the object side, and an image-side surface 52 that is a convex surface convex relative to the image side. The sixth lens element 6 provides a positive refractive power, and has an object-side surface 61 that is a concave surface concave relative to the object side, and an image-side surface 62 that is a convex surface convex relative to the image side. The seventh lens element 7 provides a negative refractive power, and has object-side and image-side surfaces 71, 72 that are concave surfaces respectively concave relative to the object and image sides. In this embodiment, each of the object-side surfaces 11, 21, 31, 41, 51, 61, 71 and the image-side surfaces 12, 22, 32, 42, 52, 62, 72 is aspherical and has a center point coinciding with the optical axis (I), and the imaging zoom lens system does not include any lens element with a refractive power other than the first lens element 1, the second lens element 2, the third lens element 3, the fourth lens element 4, the fifth lens element 5, the sixth lens element 6 and the seventh lens element 7.

Shown in FIG. 27 is a table of the fifth embodiment that lists values of some optical data corresponding to the surfaces 11-71 and 81, 12-72 and 82 of the first to seventh lens elements 1-7 and the optical filter 8 when the imaging zoom lens system is at the wide angle end, an intermediate position between the wide angle and telephoto ends, or the telephoto end.

Shown in FIG. 28 is a table that lists values of some conic constants and aspherical coefficients of the aforementioned relationship (1) corresponding to the fifth embodiment.

FIGS. 29(A) to 29(D) show simulation results of the imaging zoom lens system at the wide angle end respectively corresponding to longitudinal spherical aberration, sagittal astigmatism aberration, tangential astigmatism aberration, and distortion aberration of the fifth embodiment. FIGS. 29(E) to 29(H) show simulation results of the imaging zoom lens system at the intermediate position respectively corresponding to longitudinal spherical aberration, sagittal astigmatism aberration, tangential astigmatism aberration, and distortion aberration of the fifth embodiment. FIGS. 29(I) to 29(L) show simulation results of the imaging zoom lens system at the telephoto end respectively corresponding to longitudinal spherical aberration, sagittal astigmatism aberration, tangential astigmatism aberration, and distortion aberration of the fifth embodiment. FIGS. 30(A) to 30(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the fifth embodiment. FIGS. 30(E) to 30(H) show simulation results of the imaging zoom lens system focusing at a distance of 20 cm at the telephoto end, respectively corresponding to longitudinal spherical aberration, sagittal astigmatism aberration, tangential astigmatism aberration, and distortion aberration of the fifth embodiment. It can be understood from FIGS. 29(A) to 29(L) and 30(A) to 30(H) that the fifth embodiment is able to achieve a relatively good optical performance.

Figure 31:
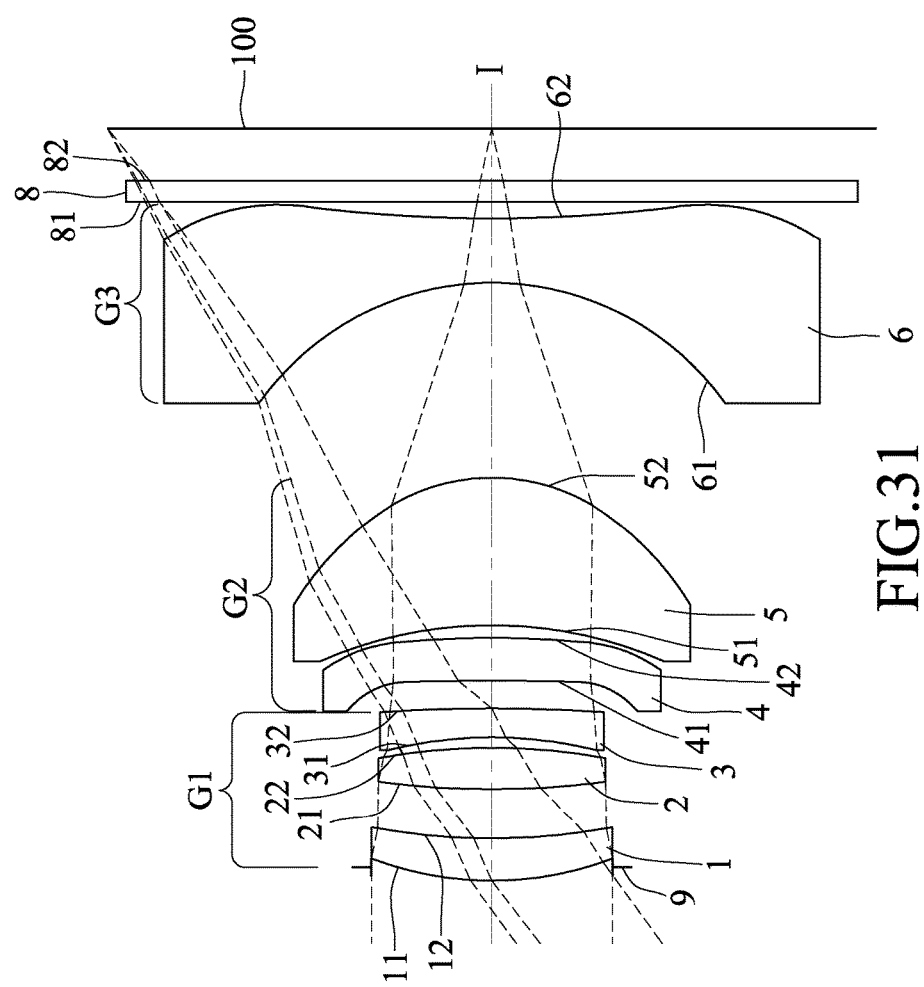
FIG. 31 is a schematic diagram that illustrates an imaging zoom lens system of a sixth embodiment according to the disclosure at a wide angle end.
Figure 32:
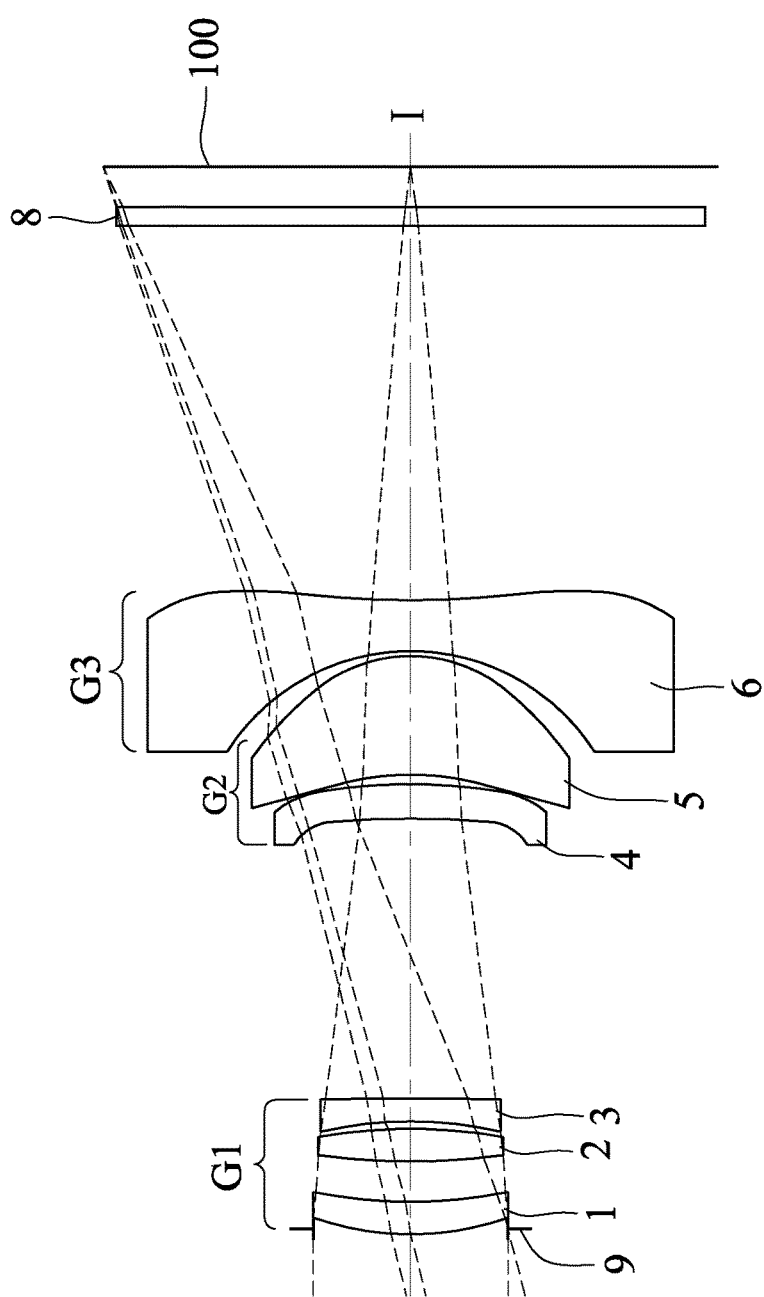
FIG. 32 is a schematic diagram that illustrates the imaging zoom lens system of the sixth embodiment at a telephoto end.
Figures 36E, 36F, 36G, 36H:
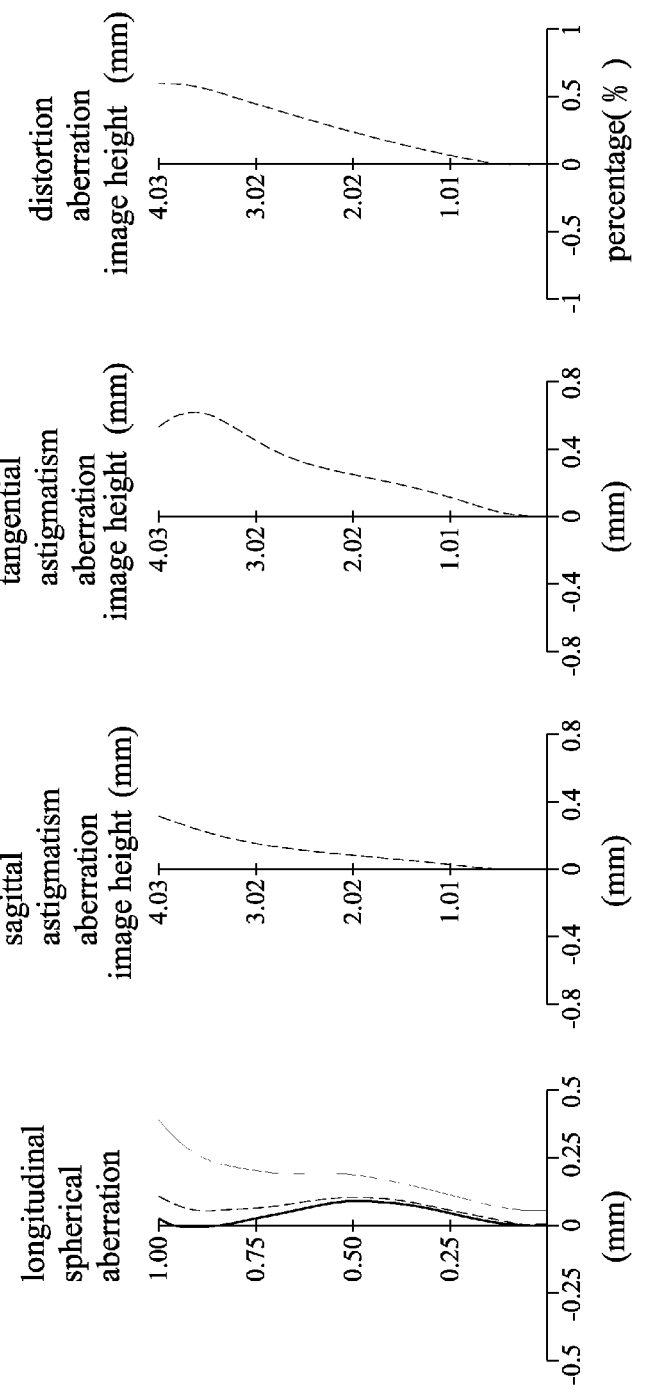
FIGS. 36(E) to 36(H) show different optical characteristics of the imaging zoom lens system of the sixth embodiment focusing at a distance of 20 cm at the telephoto end.

FIGS. 31 and 32 illustrate an imaging zoom lens system of a sixth embodiment according to the present disclosure at a wide angle end and a telephoto end, respectively. The sixth embodiment has a configuration similar to that of the first embodiment, but differs from the first embodiment in some of the quantity, the optical data, the aspherical coefficients and the lens parameters of the lens elements of the lens groups (G1-G3). Furthermore, in the sixth embodiment, the imaging zoom lens system has a system focal length (ft) of 13.7548 mm at the telephoto end and a system focal length (fw) of 5.0085 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.147 mm. When the imaging zoom lens system performs focusing from infinity to the close-up photographing distance at the wide angle end, a focusing range (ΔW) of travel of the first and second lens groups (G1, G2) along the optical axis (I) is 0.093 mm. The first lens group (G1) has an aperture stop 9 and includes first, second and third lens elements 1-3. The second lens group (G2) includes fourth and fifth lens elements 4, 5. The third lens group (G3) includes a sixth lens element 6. The aperture stop 9 and the first to sixth lens elements 1-6 are arranged in sequence from the object side to the image side along the optical axis (I).

The first lens element 1 provides a positive refractive power, and has an object-side surface 11 that is a convex surface convex relative to the object side, and an image-side surface 12 that is a concave surface concave relative to the image side. The second lens element 2 provides a positive refractive power, and has object-side and image-side surfaces 21, 22 that are convex surfaces respectively convex relative to the object and image sides. The third lens element 3 provides a negative refractive power, and has object-side and image-side surfaces 31, 32 that are concave surfaces respectively concave relative to the object and image sides. The fourth lens element 4 provides a positive refractive power, and has object-side and image surfaces 41, 42 that are convex surfaces respectively convex relative to the object and image sides. The fifth lens element 5 provides a positive refractive power, and has an object-side surface 51 that is a concave surface concave relative to the object side, and an image-side surface 52 that is a convex surface convex relative to the image side. The sixth lens element 6 provides a negative refractive power, and has object-side and image-side surfaces 61, that are concave surfaces respectively concave relative to the object and image sides. In this embodiment, each of the object-side surfaces 11, 21, 31, 41, 51, 61 and the image-side surfaces 12, 22, 32, 42, 52, 62 is aspherical and has a center point coinciding with the optical axis (I), and the imaging zoom lens system does not include any lens element with a refractive power other than the first lens element 1, the second lens element 2, the third lens element 3, the fourth lens element 4, the fifth lens element 5 and the sixth lens element 6.

Shown in FIG. 33 is a table of the sixth embodiment that lists values of some optical data corresponding to the surfaces 11-61 and 81, 12-62 and 82 of the first to sixth lens elements 1-6 and the optical filter 8 when the imaging zoom lens system is at the wide angle end, an intermediate position between the wide angle and telephoto ends, or the telephoto end.

Shown in FIG. 34 is a table that lists values of some conic constants and aspherical coefficients of the aforementioned relationship (1) corresponding to the sixth embodiment.

FIGS. 35(A) to 35(D) show simulation results of the imaging zoom lens system at the wide angle end respectively corresponding to longitudinal spherical aberration, sagittal astigmatism aberration, tangential astigmatism aberration, and distortion aberration of the sixth embodiment. FIGS. 35(E) to 35(H) show simulation results of the imaging zoom lens system at the intermediate position respectively corresponding to longitudinal spherical aberration, sagittal astigmatism aberration, tangential astigmatism aberration, and distortion aberration of the sixth embodiment. FIGS. 35(I) to 35(L) show simulation results of the imaging zoom lens system at the telephoto end respectively corresponding to longitudinal spherical aberration, sagittal astigmatism aberration, tangential astigmatism aberration, and distortion aberration of the sixth embodiment. FIGS. 36(A) to 36(D) show simulation results of the imaging zoom lens system focusing at a distance of 20 cm at the wide angle end, respectively corresponding to longitudinal spherical aberration, astigmatism aberration, and distortion aberration of the sixth embodiment. FIGS. 36(E) to 36(H) show results of the imaging zoom lens system focusing at a distance of 20 cm at the telephoto end, respectively corresponding to longitudinal spherical aberration, sagittal astigmatism aberration, tangential astigmatism aberration, and distortion aberration of the sixth embodiment. It can be understood from FIGS. 35(A) to 35(L) and 36(A) to 36(H) that the sixth embodiment is able to achieve a relatively good optical performance.

Figure 37:
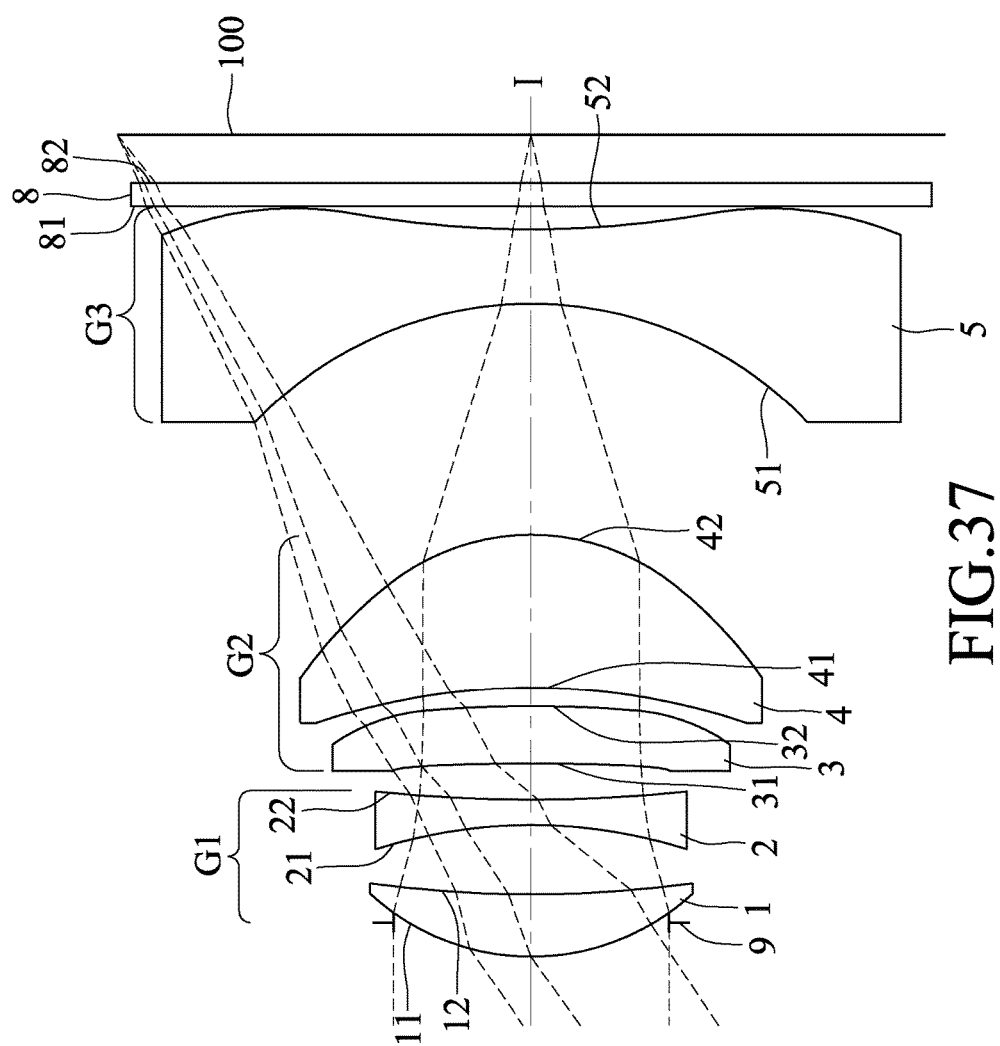
FIG. 37 is a schematic diagram that illustrates an imaging zoom lens system of a seventh embodiment according to the disclosure at a wide angle end.
Figure 38:
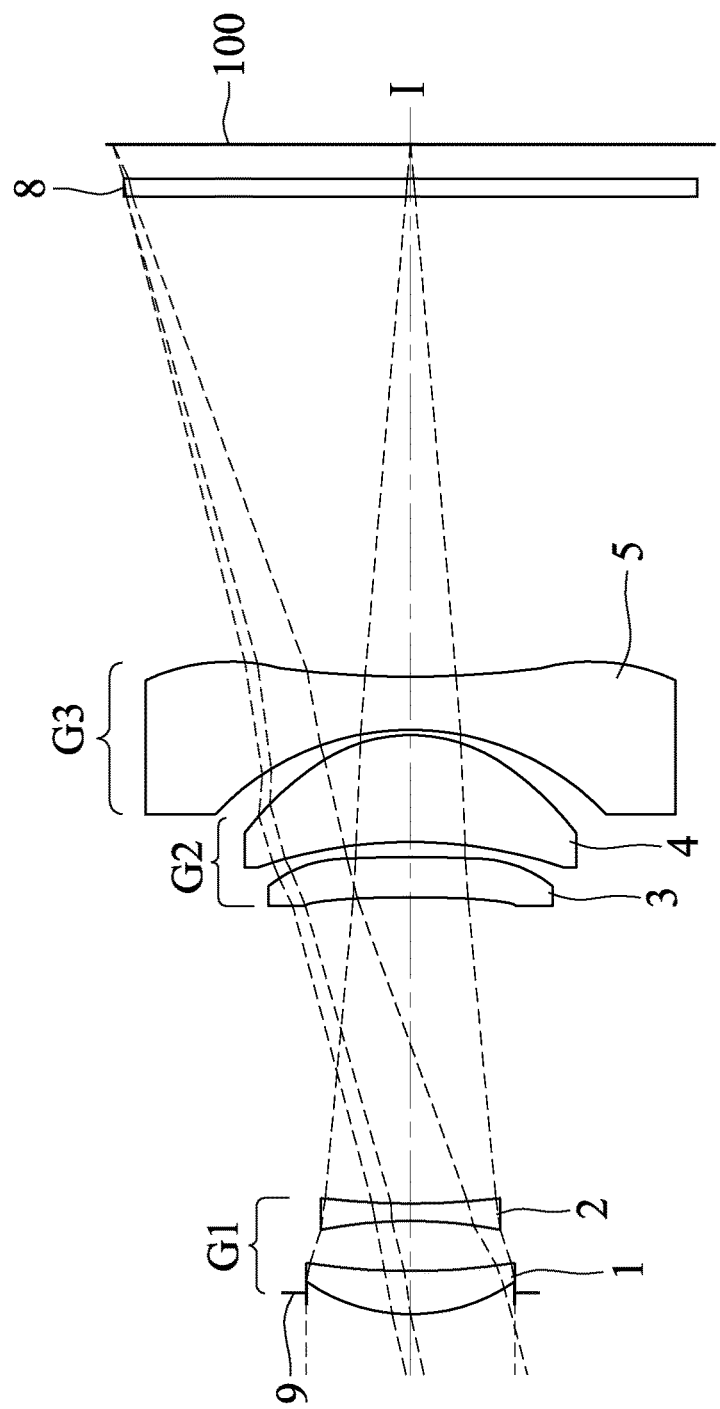
FIG. 38 is a schematic diagram that illustrates the imaging zoom lens system of the seventh embodiment at a telephoto end.

FIGS. 37 and 38 illustrate an imaging zoom lens system of a seventh embodiment according to the present disclosure at a wide angle end and a telephoto end, respectively. The seventh embodiment has a configuration similar to that of the first embodiment, but differs from the first embodiment in some of the quantity, the optical data, the aspherical coefficients and the lens parameters of the lens elements of the lens groups (G1-G3). Furthermore, in the seventh embodiment, the imaging zoom lens system has a system focal length (ft) of 15.3659 mm at the telephoto end and a system focal length (fw) of 5.6314 mm at the wide angle end. When the imaging zoom lens system performs focusing from infinity to the close-up photographing distance at the telephoto end, a focusing range (ΔT) of travel of the first and second lens groups (G1, G2) along the optical axis (I) is 0.175 mm. When the imaging zoom lens system performs focusing from infinity to the close-up photographing distance at the wide angle end, a focusing range (ΔW) of travel of the first and second lens groups (G1, G2) along the optical axis (I) is 0.109 mm. The first lens group (G1) has an aperture stop 9 and includes first and second lens elements 1, 2. The second lens group (G2) includes third and fourth lens elements 3, 4. The third lens group (G3) includes a fifth lens element 5. The aperture stop 9 and the first to fifth lens elements 1-5 are arranged in sequence from the object side to the image side along the optical axis (I).

The first lens element 1 provides a positive refractive power, and has an object-side surface 11 that is a convex surface convex relative to the object side, and an image-side surface 12 that is a concave surface concave relative to the image side. The second lens element 2 provides a negative refractive power, and has object-side and image-side surfaces 21, 22 that are concave surfaces respectively concave relative to the object and image sides. The third lens element 3 provides a positive refractive power, and has object-side and image-side surfaces 31, 32 that are convex surfaces respectively convex relative to the object and image sides. The fourth lens element 4 provides a positive refractive power, and has an object-side surface 41 that is a concave surface concave relative to the object side, and an image surface 42 that is a convex surface convex relative to the image side. The fifth lens element 5 provides a negative refractive power, and has object-side and image-side surfaces 51, 52 that are concave surfaces respectively concave relative to the object and image sides. In this embodiment, each of the object-side surfaces 11, 21, 31, 41, 51 and the image-side surfaces 12, 22, 32, 42, 52 is aspherical and has a center point coinciding with the optical axis (I), and the imaging zoom lens system does not include any lens element with a refractive power other than the first lens element 1, the second lens element 2, the third lens element 3, the fourth lens element 4 and the fifth lens element 5.

Shown in FIG. 39 is a table of the seventh embodiment that lists values of some optical data corresponding to the surfaces 11-51 and 81, 12-52 and 82 of the first to fifth lens elements 1-5 and the optical filter 8 when the imaging zoom lens system is at the wide angle end, an intermediate position between the wide angle and telephoto ends, or the telephoto end.

Shown in FIG. 40 is a table that lists values of some conic constants and aspherical coefficients of the aforementioned relationship (1) corresponding to the seventh embodiment.

FIGS. 41(A) to 41(D) show simulation results of the imaging zoom lens system at the wide angle end respectively corresponding to longitudinal spherical aberration, sagittal astigmatism aberration, tangential astigmatism aberration, and distortion aberration of the seventh embodiment. FIGS. 41(E) to 41(H) show simulation results of the imaging zoom lens system at the intermediate position respectively corresponding to longitudinal spherical aberration, sagittal astigmatism aberration, tangential astigmatism aberration, and distortion aberration of the seventh embodiment. FIGS. 41(I) to 41(L) of the imaging zoom lens system show simulation results at the telephoto end respectively corresponding to longitudinal spherical aberration, sagittal astigmatism aberration, tangential astigmatism aberration, and distortion aberration of the seventh embodiment. FIGS. 42(A) to 42(D) show simulation results of the imaging zoom lens system focusing at a distance of 20 cm at the wide angle end, respectively corresponding to longitudinal spherical aberration, sagittal astigmatism aberration, tangential astigmatism aberration, and distortion aberration of the seventh embodiment. FIGS. 42(E) to 42(H) show simulation results of the imaging zoom lens system focusing at a distance of 20 cm at the telephoto end, respectively corresponding to longitudinal spherical aberration, sagittal astigmatism aberration, tangential astigmatism aberration, and distortion aberration of the seventh embodiment. It can be understood from FIGS. 41(A) to 41(L) and 42(A) to 42(H) that the seventh embodiment is able to achieve a relatively good optical performance.

Shown in FIG. 43 is the table that lists the aforementioned lens parameters corresponding to the seven embodiments for comparison. When each of the lens parameters of the imaging zoom lens system according to this disclosure satisfies the following optical relationships, the optical performance is still relatively good:

(1) A greater ft/fw refers to a greater zoom magnification ratio of the imaging zoom lens system, and leads to greater movements of the lens groups (G1-G3) along the optical axis (I) and a larger F-number, resulting in a lower light collection efficiency. If the imaging zoom lens system satisfies 1.50<ft/fw<5.00, the imaging zoom lens system may have an appropriate zoom magnification ratio while maintaining a proper F-number, thereby achieving a relatively good light collection efficiency. In some embodiments, the imaging zoom lens system may further satisfy 2.30<ft/fw<3.00 to achieve better effects.

(2) Since the third lens group (G3) that provides the negative refractive power is stationary during focusing operation, the focusing operation is completed by synchronized movements of only the first and second lens group (G1, G2) that provide the positive refractive powers and that have relatively shorter effective focal lengths. Shorter effective focal lengths of the lens groups that perform the focusing operation lead to a smaller focusing range of travel of the first and second lens groups (G1, G2) along the optical axis (I), thereby increasing the focusing speed. If the imaging zoom lens system satisfies 1.01<ΔT/ΔW<3.00, the focusing range of travel of the first and second lens groups (G1, G2) may be effectively reduced under the imaging zoom lens system having the appropriate zoom magnification ratio, such that the focusing speed at the telephoto end may increase to approach the focusing speed at the wide angle end. In some embodiments, the imaging zoom lens system may further satisfy 1.10<ΔT/ΔW<2.50 to achieve better effects.

Other surface designs for one or more lens elements of the imaging zoom lens system, such as different arrangements/combinations of concave/convex surfaces, may be applied to other embodiments of this disclosure in order to enhance control of optical performance of the imaging zoom lens system. However, these additional surface designs should be selectively combined with each other without violation of the abovementioned relationships in those embodiments of this disclosure.

To sum up, because the effective focal length of each of the first and second lens groups (G1, G2) is positive and relatively small, the movement of the first and second lens groups (G1, G2) during zooming can effectively change the system focal length of the imaging zoom lens system, thereby increasing the zoom magnification ratio of the imaging zoom lens system. Further, by virtue of the synchronized movement of the first and second lens groups (G1, G2) in cooperation with the stationary of the third lens group (G3) during focusing, the focusing range of travel of the first and second lens groups (G1, G2) along the optical axis (I) may be effectively reduced under an appropriate zoom magnification ratio, thereby increasing the focusing speed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An imaging zoom lens system comprising a first lens group, a second lens group and a third lens group in sequence from an object side to an image side along an optical axis of said imaging zoom lens system, wherein:
    said first lens group has a positive effective focal length and an aperture stop;
    said second lens group has a positive effective focal length;
    said third lens group has a negative effective focal length; and
    said first and second lens groups are permitted to move in synchronization with each other along the optical axis when said imaging zoom lens system performs focusing, and
    wherein said imaging zoom lens system satisfies:

$1.01 < \Delta T/\Delta W < 3.00$; and $1.50 < ft/fw < 5.00$, where
    $\Delta T$ represents a focusing range of travel of said first and second lens groups along the optical axis when said imaging zoom lens system performs focusing from infinity to a close-up photographing distance at a telephoto end,
    $\Delta W$ represents a focusing range of travel of said first and second lens groups along the optical axis when said imaging zoom lens system performs focusing from infinity to the close-up photographing distance at a wide angle end,
    ft represents a system focal length of said imaging zoom lens system at the telephoto end, and
    fw represents a system focal length of said imaging zoom lens system at the wide angle end.

2. The imaging zoom lens system as claimed in claim 1, wherein said first lens group includes three lens elements, said second lens group includes one lens element, and said third lens group includes one lens element.

3. The imaging zoom lens system as claimed in claim 1, wherein said first lens group includes two lens elements, said second lens group includes one lens element, and said third lens group includes one lens element.

4. The imaging zoom lens system as claimed in claim 1, wherein said first lens group includes four lens elements, said second lens group includes one lens element, and said third lens group includes one lens element.

5. The imaging zoom lens system as claimed in claim 1, wherein said first lens group includes three lens elements, said second lens group includes three lens elements, and said third lens group includes one lens element.

6. The imaging zoom lens system as claimed in claim 1, wherein said first lens group includes four lens elements, said second lens group includes by two lens elements, and said third lens group includes one lens element.

7. The imaging zoom lens system as claimed in claim 1, wherein said first lens group includes three lens elements, said second lens group includes two lens elements, and said third lens group includes one lens element.

8. The imaging zoom lens system as claimed in claim 1, wherein said first lens group includes two lens elements, said second lens group includes two lens elements, and said third lens group includes one lens element.

9. An imaging zoom lens system comprising a first lens group, a second lens group and a third lens group in sequence from an object side to an image side along an optical axis of said imaging zoom lens system, wherein:
    said first lens group has a positive effective focal length;
    said second lens group has a positive effective focal length;
    said third lens group has a negative effective focal length;
    said first and second lens groups move in synchronization with each other along the optical axis when said imaging zoom lens system performs focusing; and
    said imaging zoom lens system satisfies:

$1.10 < \Delta T/\Delta W < 2.50$; and $2.30 < ft/fw < 3.00$, where
    $\Delta T$ represents a focusing range of travel of said first and second lens groups along the optical axis when said imaging zoom lens system performs focusing from infinity to a close-up photographing distance at a telephoto end,
    $\Delta W$ represents a focusing range of travel of said first and second lens groups along the optical axis when said imaging zoom lens system performs focusing from infinity to the close-up photographing distance at a wide angle end,
    ft represents a system focal length of said imaging zoom lens system at the telephoto end, and
    fw represents a system focal length of said imaging zoom lens system at the wide angle end.

* * * * *